US012764499B1

(12) United States Patent
Meriwether et al.

(10) Patent No.: US 12,764,499 B1
(45) Date of Patent: Oct. 13, 2026

(54) LOGISTIC WITH GPS TRACKING AND STATUS LIFECYCLE MANAGEMENT SYSTEM

(71) Applicant: Government Employees Insurance Company, Fredericksburg, VA (US)

(72) Inventors: Helen Jeanene Meriwether, Macon, GA (US); Nathan Shaw, Columbus, OH (US); Kathryn Mary Leeman, Chicago, IL (US); Hemendrakumar Sudhakarbhai Patil, Ashburn, VA (US); Mehdi Driba, Frederick, MD (US)

(73) Assignee: Government Employees Insurance Company, Fredericksburg, VA (US)

( * ) Notice: Subject to any disclaimer, the term of this patent is extended or adjusted under 35 U.S.C. 154(b) by 0 days.

(21) Appl. No.: 19/460,141

(22) Filed: Jan. 26, 2026

(51) Int. Cl.
*H04W 4/029* (2018.01)
*G06Q 10/0631* (2023.01)
*H04W 4/90* (2018.01)

(52) U.S. Cl.
CPC ...... *H04W 4/029* (2018.02); *G06Q 10/06314* (2013.01); *G06Q 10/06315* (2013.01); *H04W 4/90* (2018.02)

(58) Field of Classification Search
CPC ....... H04W 4/029; H04W 4/90; H04W 4/023; H04W 4/02; H04W 4/021; H04W 4/027; H04W 4/08; H04W 64/00; H04W 4/025; H04W 4/40; H04W 76/50; H04W 64/003; H04W 4/50; H04W 76/15; H04W 4/024; H04W 72/04; H04W 12/121; H04W 12/122; H04W 72/0446; H04W 72/0453; H04W 72/20; H04W 72/51; H04W 4/44; H04W 72/563; H04W 72/044; G06Q 10/06314; G06Q 10/06315; H04L 67/12; H04L 67/02; H04L 1/00; H04L 63/1466; H04L 67/1021; H04L 67/1014; H04L 67/1036; H04L 67/535; H04L 2012/2841; H04L 67/53; H04L 63/1416; H04L 63/1408; H04L 63/123; H04L 12/1895;
(Continued)

(56) References Cited

U.S. PATENT DOCUMENTS 7,860,517 B1 12/2010 Patoskie et al.
8,792,913 B2 7/2014 Bennett, Jr.
(Continued)

*Primary Examiner* — Nimesh Patel
(74) *Attorney, Agent, or Firm* — Sughrue Mion, PLLC

(57) ABSTRACT

A system and method for providing real-time GPS tracking and comprehensive status lifecycle management for emergency roadside service dispatches. The system receives GPS breadcrumbs from service vehicles during the en route to on scene phase, tracks services through comprehensive status states with edge case handling, stores all status changes and GPS events in a unified event status record structure linked to Dispatch records, and integrates with mobile APIs to provide mobile-native status updates on device lock screens. The system implements phase-specific GPS collection, status-GPS correlation logic that ensures proper sequencing and prevents duplicate notifications, conditional mobile API triggering based on event state checking, and unified event storage that enables dispute resolution through correlation analysis. The unified event storage stores all event types in a single indexed table structure.

24 Claims, 27 Drawing Sheets

(58) Field of Classification Search

CPC ............. H04L 2209/84; H04L 25/0212; H04L 25/0254; H04L 9/3271; H04L 9/005; H04L 5/0048; H04L 5/0051; H04L 67/52; H04L 5/0007; H04L 5/0035; H04L 67/1396; G08G 1/20; G08G 1/127; G08G 1/0129; G08G 1/16; G08G 1/123; G08G 1/13; G08G 1/202; G08G 1/162; G08G 1/167; G06N 20/00; G06N 3/08; G06N 3/0464; G06N 7/01; G06N 3/045; G06N 3/09; G06N 3/047; G06N 5/02; G06N 3/0475; G06N 3/042; G06N 3/02; H04M 1/72418; H04M 1/72415; H04M 1/72412; H04M 2250/10; H04M 3/5116; H04M 2242/04; H04M 2242/30; H04M 1/72421; H04M 1/72457; H04M 11/04; H04M 1/6091; H04M 1/72463; G01S 5/0236; G01S 19/42; G01S 5/02; G01S 2205/008; G01S 5/011; G01S 5/0249; G01S 5/0268; G01S 5/0269; G01S 5/14; G01S 19/01; Y02D 30/70; G06F 17/40; G06F 40/40; G06F 30/27; G06F 11/1464; G06F 18/22; G06F 16/02

See application file for complete search history.

(56) References Cited

U.S. PATENT DOCUMENTS

| | | | | |
|---|---|---|---|---|
| 9,445,230 | B1 | 9/2016 | Sipher et al. | |
| 9,691,045 | B1 | 6/2017 | Briggs et al. | |
| 9,749,812 | B1 | 8/2017 | Dulee et al. | |
| 10,453,011 | B1 | 10/2019 | Briggs et al. | |
| 10,553,119 | B1 | 2/2020 | Shah et al. | |
| 10,609,508 | B1 | 3/2020 | Dulee et al. | |
| 10,937,101 | B1 | 3/2021 | Dulee et al. | |
| 11,132,629 | B2 | 9/2021 | Gara et al. | |
| 11,356,821 | B2 | 6/2022 | Dulee et al. | |
| 11,706,594 | B2 | 7/2023 | Dulee et al. | |
| 11,972,688 | B1 | 4/2024 | Barth et al. | |
| 12,518,621 | B2 | 1/2026 | Licona | |
| 2012/0258737 | A1 | 10/2012 | Bennett, Jr. | |
| 2015/0038107 | A1* | 2/2015 | Messerly | H04W 64/00 455/404.2 |
| 2018/0367968 | A1* | 12/2018 | Golichowski | H04W 4/023 |
| 2019/0279266 | A1 | 9/2019 | Hayrabedian | |
| 2020/0346751 | A1* | 11/2020 | Horelik | B64U 10/13 |
| 2022/0201444 | A1 | 6/2022 | Dulee et al. | |
| 2023/0066525 | A1* | 3/2023 | Cabanas | H04W 4/029 |
| 2024/0257146 | A1 | 8/2024 | Valas et al. | |
| 2024/0395133 | A1 | 11/2024 | Debruyn et al. | |

* cited by examiner

LOGISTIC WITH GPS TRACKING AND STATUS LIFECYCLE MANAGEMENT SYSTEM

CROSS-REFERENCE TO RELATED APPLICATION

The present application is related to U.S. application Ser. No. 19/460,127, entitled "REAL-TIME GPS BREADCRUMB TRACKING AND COMPREHENSIVE LIFECYCLE MANAGEMENT SYSTEM", filed Jan. 26, 2026, the entire contents of which is incorporated by reference in its entirety.

BACKGROUND

1. Field

The present disclosure relates generally to emergency roadside service dispatch systems and, more particularly, to systems and methods for providing real-time Global Positioning System (GPS) tracking and comprehensive status lifecycle management that enable customers to track service delivery progress with enhanced visibility and mobile-native status updates.

2. Background of Related Art

Conventional emergency roadside service dispatch systems suffer from specific technical limitations in data storage, query performance, and system integration that prevent real-time GPS tracking and comprehensive status lifecycle management. Traditional systems typically store status updates and location data in separate database structures or tables, requiring complex join operations or application-level correlation logic to correlate status events with GPS events for a single dispatch. These correlation operations result in substantial query latencies for event correlation queries, making real-time tracking infeasible. Additionally, existing systems lack technical mechanisms to synchronize status lifecycle transitions with GPS event collection, resulting in data inconsistencies where GPS events may be stored without corresponding status context, or status changes may occur without GPS validation.

Existing dispatch systems provide basic status updates but lack the technical infrastructure to handle complex state management scenarios. Current systems use simple event broadcasting mechanisms that trigger notifications immediately upon status changes, without checking event history or state dependencies. This results in duplicate notifications and incorrect notification sequencing. Traditional systems store status and GPS data in separate schemas with different timestamp formats (some systems use coordinated universal time (UTC), others use local time), requiring time zone conversion calculations during correlation that add substantial processing overhead per query. Current systems also lack integration with mobile operating system notification frameworks (such as iOS LiveActivity), requiring customers to poll applications or contact support centers, which creates unnecessary network traffic and server load.

The lack of unified event storage architecture creates significant technical challenges for dispute resolution and system troubleshooting. Traditional systems typically store GPS breadcrumbs, status changes, and resource selection events in separate database structures or tables with different schemas, requiring application-level correlation logic that performs comparison operations where the number of comparisons scales with the number of status events multiplied by the number of GPS events for a single dispatch. This correlation approach scales poorly, with query time increasing substantially as event counts grow. For a typical dispatch with multiple status events and GPS breadcrumbs, traditional systems require numerous comparison operations that can take substantial time to complete. Additionally, the absence of a unified event structure means that dispute resolution queries must access multiple database structures sequentially, with each access adding latency, resulting in substantial query times for comprehensive event history retrieval.

Existing systems lack the technical architecture to scale efficiently while maintaining real-time performance. As service volumes increase to millions of events per year, traditional systems experience exponential performance degradation due to unoptimized database schemas and lack of phase-specific filtering. Query performance degrades substantially as dataset sizes increase, making real-time tracking impossible at scale. Additionally, existing systems lack technical mechanisms for status-GPS correlation validation, resulting in data integrity issues where GPS events may be processed without corresponding en route status, leading to incorrect tracking displays and notification errors.

U.S. Pat. No. 12,518,621 B2 (Allstate)—"Roadside assistance platform," issued Jan. 6, 2026 - - - incorporated by reference in its entirety. This patent describes a roadside assistance platform featuring predictive provider selection, automated dispatch coordination, scoring algorithms, and integrated service-delivery orchestration.

U.S. Pat. No. 11,972,688 B2 (Allstate)—"Roadside assistance system," issued Jul. 16, 2024 - - - incorporated by reference in its entirety. This patent provides systems for roadside automation, including improved workflow management, provider engagement logic, and location-based tracking within a coordinated assistance platform.

U.S. Pat. No. 11,706,594 B2 (Dulee et al.)—"Tow and emergency roadside assistance locating and tracking mobile application," issued Jul. 25, 2023 (State Farm) - - - incorporated by reference in its entirety. This patent provides details on consumer-visible en-route tracking, route progress updates, and provider-to-customer communication mechanisms integrated through mobile applications.

U.S. Pat. No. 11,132,629 B2 (Allstate)—"Roadside assistance provider assignment," issued Sep. 28, 2021 - - - incorporated by reference in its entirety. This patent covers algorithms for assigning roadside assistance providers using ranking, capability evaluation, and travel-time considerations.

U.S. Pat. No. 10,553,119 B1 (Shah et al., Allstate)—"Roadside assistance system," issued Feb. 4, 2020 - - - incorporated by reference in its entirety. This patent describes a system that processes assistance requests, performs provider selection, exchanges event data, and orchestrates service-delivery workflows.

U.S. Pat. No. 10,453,011 B2 (Allstate)—"Systems and methods for provider selection using crowdsourced input," issued Oct. 22, 2019 - - - incorporated by reference in its entirety. This patent describes crowdsourced scoring and ranking of service providers, including capability matching and performance-based selection logic.

U.S. Pat. No. 9,691,045 B2 (Allstate)—"Assistance dispatch and feedback modules," issued Jun. 27, 2017 - - - incorporated by reference in its entirety. This patent describes dispatch management, service-provider engagement, and feedback modules for roadside operations.

U.S. Pat. No. 9,445,230 B1 (Pinger Inc.)—"Automated arrival notifications," issued Sep. 13, 2016 - - - incorporated by reference in its entirety. This patent teaches adaptive geofencing and dynamic dwell-time arrival detection capable of generating arrival notifications without pre-defined location anchors.

U.S. Pat. No. 8,792,913 B2 (Bennett, Verizon/HTI)—"Assistance resource progress along a route," issued Jul. 29, 2014 - - - incorporated by reference in its entirety. This patent describes techniques for providing route-progress updates to interested parties and presenting real-time tracking information for assistance resources.

U.S. Pat. No. 7,860,517 B1 (Patoskie et al.)—"Mobile device tracking using mobile agent location breadcrumbs," issued Dec. 28, 2010 - - - incorporated by reference in its entirety. This patent teaches breadcrumb-based location tracking and sharing of movement history among systems and end users.

US 2024/0395133 A1 (Ford Global Technologies LLC)—"Digital geospatial breadcrumbs," published Nov. 28, 2024 - - - incorporated by reference in its entirety. This patent pre-grant publication addresses generation, handling, and downstream use of geospatial breadcrumbs for vehicle-based applications including navigation and roadside operations.

US 2024/0257146 A1 (Allstate)—"Predictive model—based provider selection," published Aug. 8, 2024 - - - incorporated by reference in its entirety. This patent pre-grant publication addresses predictive estimated time of arrival (ETA) modeling and scoring systems to automatically select providers most likely to meet service performance goals.

US 2019/0279266 A1 (Letstow)—"Roadside assistance offers with ETA and customer acceptance," published Sep. 12, 2019 - - - incorporated by reference in its entirety. This patent pre-grant publication describes offer-based roadside assistance provisioning where consumers receive ETA-driven proposals from available providers and choose among them.

US 2012/0258737 A1 (Bennett, Verizon/HTI)—"Providing assistance resource progress information along a route," published Oct. 11, 2012 - - - incorporated by reference in its entirety. This patent pre-grant publication provides systems for sharing progress information for assistance resources and notifying customers as the resource traverses its route to the service location.

SUMMARY

In one embodiment, a system provides real-time GPS tracking and status lifecycle management for emergency roadside service dispatches. The system includes hardware processors and memory configured to implement several subsystems. A GPS tracking system receives GPS breadcrumb data from service vehicles for processing during a phase-specific collection period. This collection period begins when a resource transitions to an en route status and ends when the resource arrives at an on scene status. A status lifecycle management system tracks service delivery through multiple status states including Pending, Assigned, en route, on scene, and service complete. The status lifecycle management system handles edge cases including resource cancellations and dynamic service additions. A unified event storage system stores GPS events and status change events together in a single event status record structure linked to a Dispatch record. Each event status record stores GPS coordinates, status information, resource information, driver information, vehicle information, and timestamps in a single queryable structure. This unified structure enables correlation analysis for dispute resolution. A status-GPS correlation system creates an interdependent relationship between status lifecycle transitions and GPS event collection. The status-GPS correlation system validates that en route status exists before processing GPS events. The system checks for existing GPS events before triggering notifications to prevent duplicate notifications and ensure proper sequencing. A conditional LiveActivity notification system triggers iOS LiveActivity updates based on event state checking. The conditional LiveActivity notification system checks event history before sending notifications to prevent duplicates. The system triggers different notification types based on specific event sequences.

In another embodiment, a method provides real-time GPS tracking and comprehensive status lifecycle management for emergency roadside service dispatches. The method includes receiving GPS breadcrumb data from service vehicles during a phase-specific collection period. This collection period begins when a resource transitions to an en route status and ends when the resource arrives at an on scene status. The method tracks service delivery through multiple status states including Pending, Assigned, en route, on scene, and service complete. The method handles edge cases including resource cancellations and dynamic service additions. The method stores GPS events and status change events together in a single event status record structure linked to a Dispatch record. Each event status record stores GPS coordinates, status information, resource information, driver information, vehicle information, and timestamps in a single queryable structure. This unified structure enables correlation analysis for dispute resolution. The method creates an interdependent relationship between status lifecycle transitions and GPS event collection. The method validates that en route status exists before processing GPS events. The method checks for existing GPS events before triggering notifications to prevent duplicate notifications and ensure proper sequencing. The method triggers iOS LiveActivity updates based on event state checking. Event history is checked before sending notifications to prevent duplicates. Different notification types are triggered based on specific event sequences.

In another embodiment, a non-transitory computer-readable storage medium stores instructions that when executed by hardware processors cause the processors to perform operations. The operations include receiving GPS breadcrumb data from service vehicles during a phase-specific collection period. This collection period begins when a resource transitions to an en route status and ends when the resource arrives at an on scene status. The operations include tracking service delivery through multiple status states including Pending, Assigned, en route, on scene, and service complete. The operations handle edge cases including resource cancellations and dynamic service additions. The operations store GPS events and status change events together in a single event status record structure linked to a Dispatch record. Each event status record stores GPS coordinates, status information, resource information, driver information, vehicle information, and timestamps in a single queryable structure. This unified structure enables correlation analysis for dispute resolution. The operations create an interdependent relationship between status lifecycle transitions and GPS event collection. The operations validate that en route status exists before processing GPS events. The operations check for existing GPS events before triggering notifications to prevent duplicate notifications and ensure proper sequencing. The operations trigger iOS LiveActivity updates based on event state checking. Event history is checked before sending notifications to prevent duplicates. Different notification types are triggered based on specific event sequences.

In another embodiment, a system provides real-time GPS tracking and comprehensive status lifecycle management for emergency roadside service dispatches using means-plus-function elements. The system means for collecting GPS breadcrumb data from service vehicles. The GPS data is collected during a phase-specific collection period that begins when a resource transitions to an en route status. The collection period ends when the resource arrives at an on scene status. The system includes means for correlating GPS events with status events. This correlation creates an inter-dependent relationship between status lifecycle transitions and GPS event collection. The means for correlating validates that en route status exists before processing GPS events. The means for correlating checks for existing GPS events before triggering notifications. This checking prevents duplicate notifications and ensures proper sequencing.

In another embodiment, a system integrates resource selection with real-time GPS tracking and status lifecycle management. This integration enables customers to track service delivery from resource selection through completion. The system includes hardware processors and memory configured to implement several subsystems. A resource selection system automatically selects resources based on location, service type, availability, and estimated time of arrival criteria. The resource selection system creates dispatch offer records that store initial ETA values used in resource selection. A GPS tracking system receives GPS breadcrumb data from service vehicles. The GPS tracking system stores GPS coordinates and timestamps in event status records. A unified event storage system links resource selection events to GPS tracking events. The system links dispatch offer records created during resource selection to event status records created during GPS tracking. Each event status record links to a dispatch offer record via a linking field. This linking enables querying of complete service delivery history from resource selection through service completion through linked data structures. A status lifecycle management system tracks integrated status lifecycle including resource selection stages and service delivery stages. Status transitions from Assigned to en route trigger GPS collection. GPS [collection is triggered by status lifecycle transitions rather than by resource selection directly.]{.mark} An ETA validation feedback system compares initial ETA values used in resource selection with actual GPS-tracked arrival times. This comparison creates a feedback loop that validates resource selection decisions. The feedback loop enables improvement of future selection accuracy.

In another embodiment, a method integrates resource selection with real-time GPS tracking and status lifecycle management. This integration enables customers to track service delivery from resource selection through completion. The method includes automatically selecting resources based on location, service type, availability, and estimated time of arrival criteria. The method creates dispatch offer records that store initial ETA values used in resource selection. The method receives GPS breadcrumb data from service vehicles. The method stores GPS coordinates and timestamps in event status records. The method links resource selection events to GPS tracking events. The method links dispatch offer records created during resource selection to event status records created during GPS tracking. Each event status record links to a dispatch offer record via a linking field. This linking enables querying of complete service delivery history from resource selection through service completion through linked data structures. The method tracks integrated status lifecycle including resource selection stages and service delivery stages. Status transitions from Assigned to en route trigger GPS collection. GPS collection is triggered by status lifecycle transitions rather than by resource selection directly. The method compares initial ETA values used in resource selection with actual GPS-tracked arrival times. This comparison creates a feedback loop that validates resource selection decisions. The feedback loop enables improvement of future selection accuracy.

In another embodiment, a non-transitory computer-readable storage medium stores instructions for integrating resource selection with real-time GPS tracking and status lifecycle management. When executed by hardware processors, the instructions cause the processors to perform operations. The operations include automatically selecting resources based on location, service type, availability, and estimated time of arrival criteria. The operations create dispatch offer records that store initial ETA values used in resource selection. The operations receive GPS breadcrumb data from service vehicles. The operations store GPS coordinates and timestamps in event status records. The operations link resource selection events to GPS tracking events. The operations link dispatch offer records created during resource selection to event status records created during GPS tracking. Each event status record links to a dispatch offer record via a linking field. This linking enables querying of complete service delivery history from resource selection through service completion through linked data structures. The operations track integrated status lifecycle including resource selection stages and service delivery stages. Status transitions from Assigned to en route trigger GPS collection. GPS collection is triggered by status lifecycle transitions rather than by resource selection directly. The operations compare initial ETA values used in resource selection with actual GPS-tracked arrival times. This comparison creates a feedback loop that validates resource selection decisions. The feedback loop enables improvement of future selection accuracy.

In another embodiment, a system integrates resource selection with real-time GPS tracking and status lifecycle management using means-plus-function elements. This integration enables customers to track service delivery from resource selection through completion. The system includes means for automatically selecting resources. The selection is based on location, service type, availability, and estimated time of arrival criteria. The system includes means for creating dispatch offer records that store initial ETA values used in resource selection. The system includes means for linking resource selection events to GPS tracking events. The means for linking connects dispatch offer records created during resource selection to event status records created during GPS tracking. Each event status record links to a dispatch offer record via a linking field. This linking enables querying of complete service delivery history from resource selection through service completion through linked data structures.

DETAILED DESCRIPTION

Figure 1A:
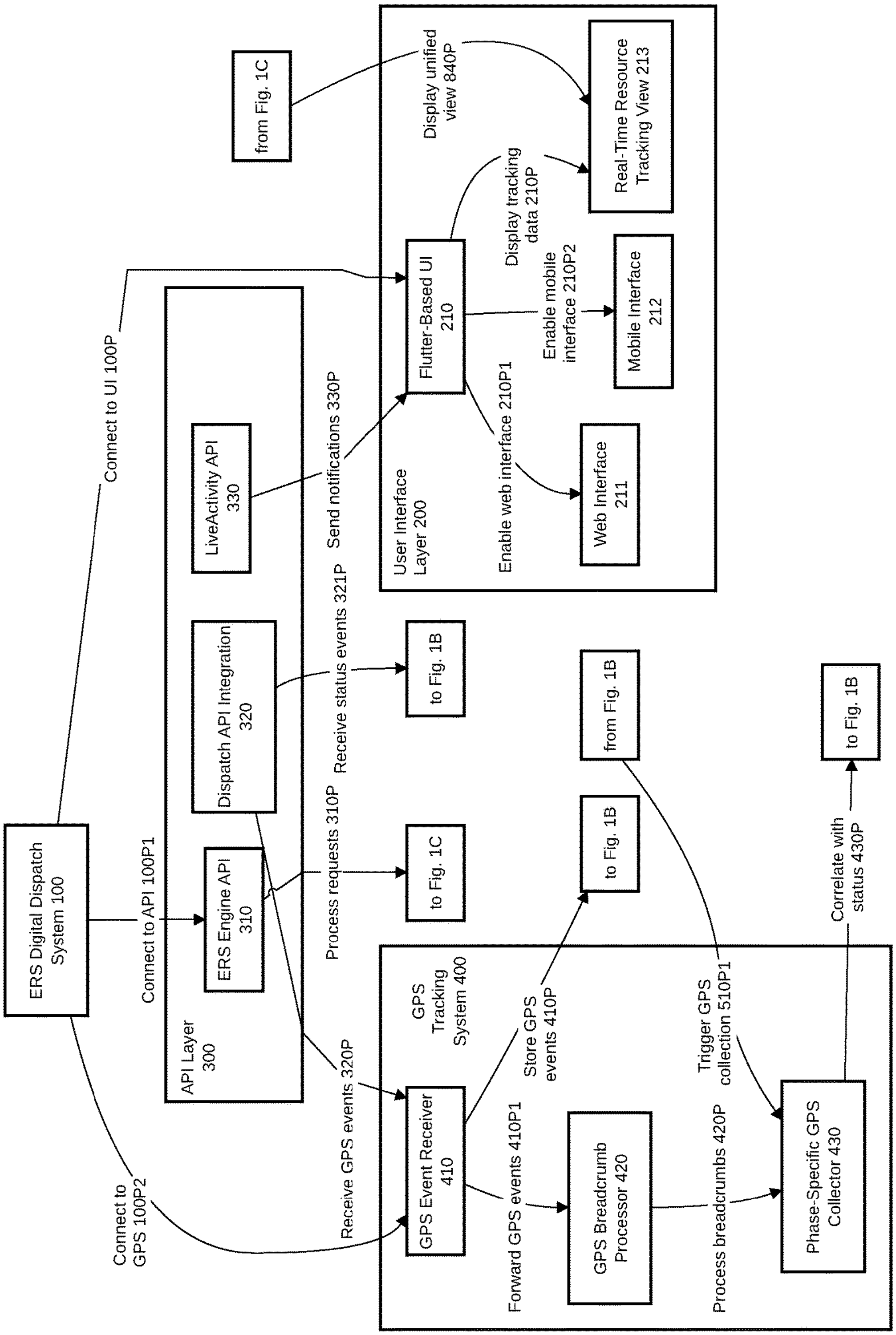
FIG. 1A illustrates a first portion of a system architecture diagram of an emergency roadside service dispatch system (such as ERS Digital Dispatch System) showing major subsystems and their interconnections in accordance with an embodiment.

The following detailed description sets forth various embodiments of a real-time GPS tracking and status lifecycle management system for emergency roadside service. The description provides specific details for a thorough understanding of the embodiments. However, one skilled in the art will understand that the embodiments may be practiced without many of these details. In some instances, well-known structures and functions have not been shown or described in detail to avoid unnecessarily obscuring the description of the embodiments.

The terminology used in the description is intended to be interpreted in its broadest reasonable manner, even though it is being used in conjunction with a detailed description of certain specific embodiments. Certain terms may be emphasized below; any terminology intended to be interpreted in any restricted manner will be overtly and specifically defined in this detailed description section.

Definitions

As used herein, the following terms have the meanings set forth below:

"Resource" refers to entities capable of providing emergency roadside services, including human resources such as service providers (tow truck operators, locksmiths, mechanics, and other service personnel) and/or machine/software-based resources such as automated systems, robotic service vehicles, AI-powered diagnostic tools, or other technology-based service delivery mechanisms.

"Phase-specific GPS collection" relates to GPS breadcrumb data processing, such as collecting, parsing, reporting, or other data processing, that may occur only during a specific service delivery phase, such as from when a resource becomes en route (after completing their previous job and heading to the loss location) until the resource arrives on scene.

"Status-GPS correlation" relates to the interdependent relationship between status lifecycle transitions and GPS event collection, such as where GPS events may be validated against status events may ensure proper sequencing (e.g., GPS events require en route status to exist) and where status transitions may trigger GPS collection (e.g., en route status may trigger GPS collection start).

"Unified event storage" relates to a single record structure (such as Ext_RASDigitalEventStatus records) that may store GPS events and status event types together with comprehensive event data (GPS coordinates, timestamps, resource information, driver information, vehicle information) in a single queryable structure linked to the Dispatch record, and that may link to resource selection records (such as Ext_RASDispatchOffer records) via indexed linking fields may enable querying complete service delivery history.

"Conditional LiveActivity triggering" relates to mobile operating system notification framework updates (such as iOS LiveActivity notification updates) that may be triggered based on event state checking, such as where the system may check for existing events before sending notifications may prevent duplicates and may ensure proper sequencing, and where different notification types (foundProvider, onTheirWay, arrived) may be triggered based on specific event sequences.

"Multi-dispatch cancellation handling" relates to logic that may check for cancelled dispatches with mobile operating system notification framework channels (such as LiveActivity channels) across all dispatches for a claim before sending driver assigned notifications, such as may prevent incorrect notifications when a resource cancels and a new resource is assigned.

System Architecture Overview

Figure 1B:
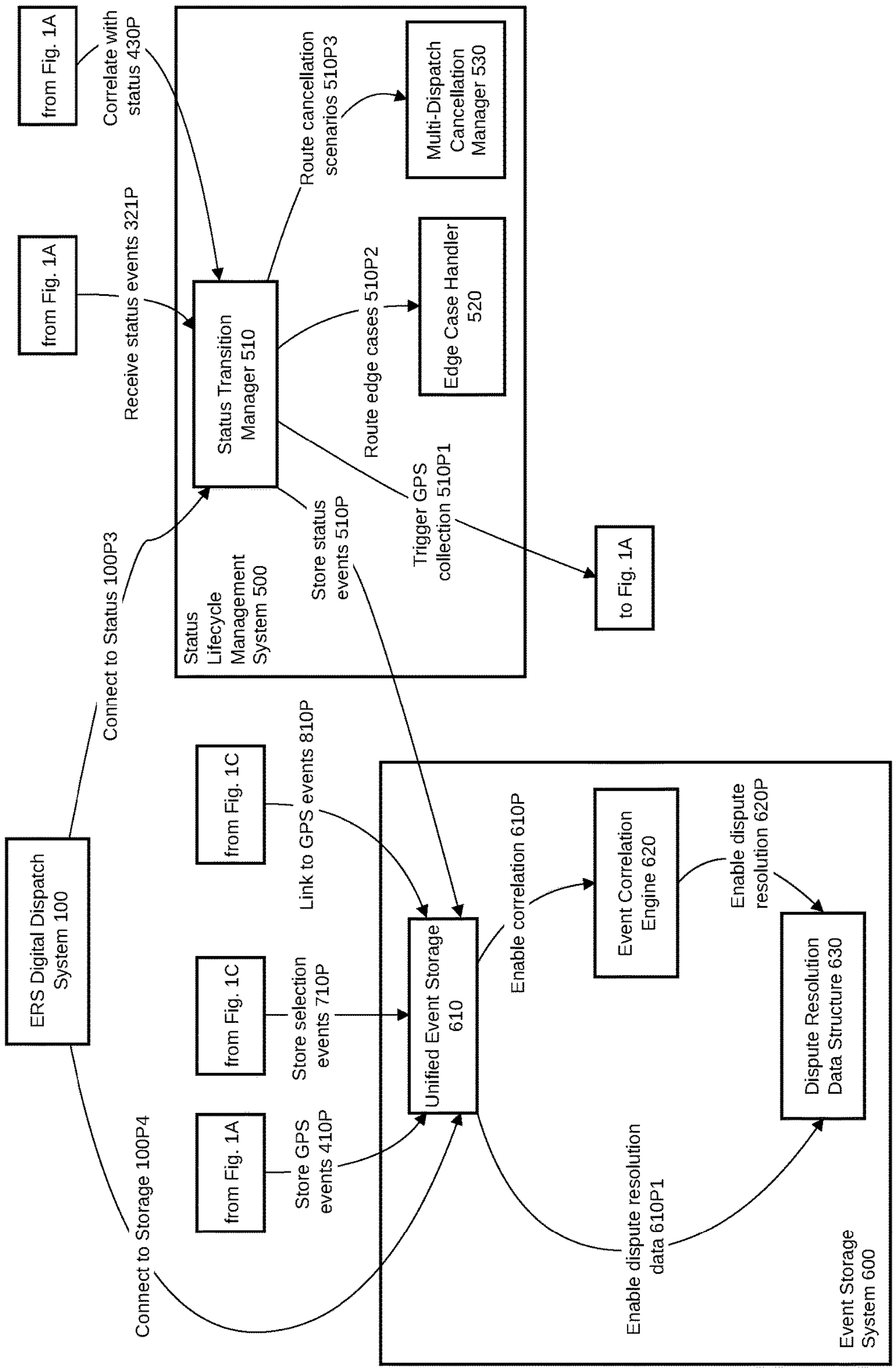
FIG. 1B illustrates a second portion of a system architecture diagram of an emergency roadside service dispatch system (such as ERS Digital Dispatch System) showing major subsystems and their interconnections in accordance with an embodiment.
Figure 1C:
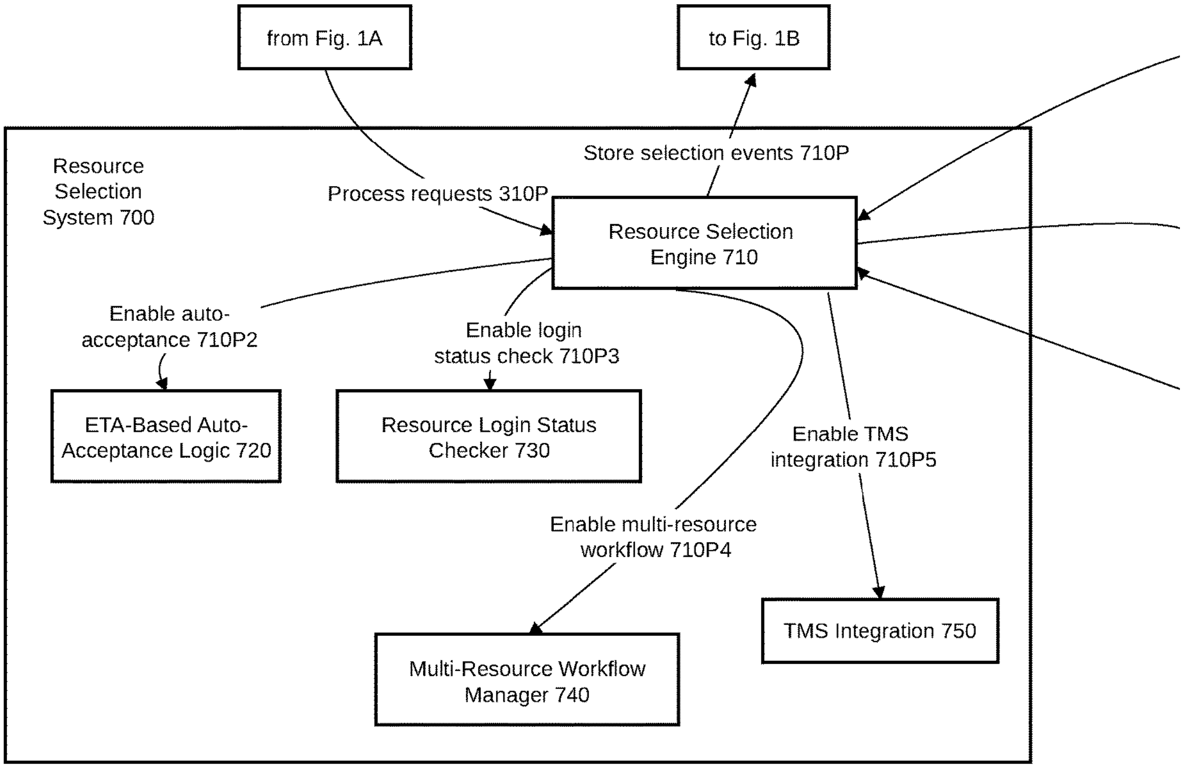
FIG. 1C illustrates a third portion of a system architecture diagram of an emergency roadside service dispatch system (such as ERS Digital Dispatch System) showing major subsystems and their interconnections in accordance with an embodiment.
Figure 1C:
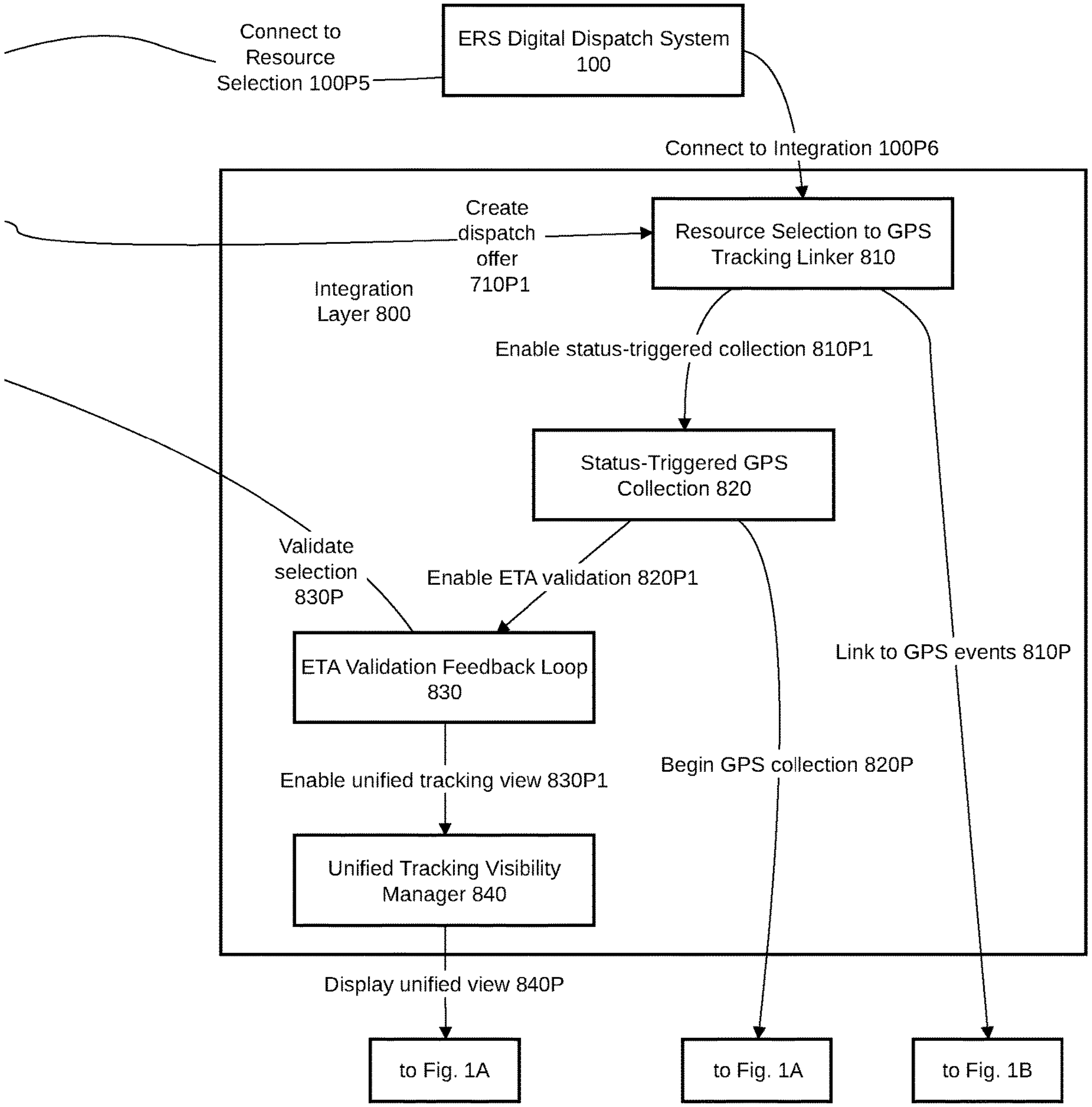

Referring now to FIGS. 1A-C, an emergency roadside service (ERS) dispatch system 100 (such as ERS Digital Dispatch System) is illustrated in accordance with an embodiment. The emergency roadside service dispatch system 100 may be configured to provide real-time GPS tracking and comprehensive status lifecycle management for emergency roadside service dispatches, which may enable customers to track service delivery progress with enhanced visibility and mobile-native status updates.

The emergency roadside service dispatch system 100 may comprise eight major subsystems that operate together to implement comprehensive service delivery tracking and management. These subsystems may include a User Interface Layer 200, an Application Programming Interface (API) Layer 300, a GPS Tracking System 400, a Status Lifecycle Management System 500, an Event Storage System 600, a Resource Selection System 700, and an Integration Layer 800. The emergency roadside service dispatch system 100 may perform "Connect to UI 100P" operations to connect to the User Interface Layer 200, "Connect to API 100P1" operations to connect to the API Layer 300, "Connect to GPS 100P2" operations to connect to the GPS Tracking System 400, "Connect to Status 100P3" operations to connect to the Status Lifecycle Management System 500, "Connect to Storage 100P4" operations to connect to the Event Storage System 600, "Connect to Resource Selection 100P5" operations to connect to the Resource Selection System 700, and "Connect to Integration 100P6" operations to connect to the Integration Layer 800.

The User Interface Layer 200 may be configured to provide cross-platform user interfaces for displaying tracking information and receiving service requests. The User Interface Layer 200 may include a Flutter-Based UI 210 that serves as the foundation for Web Interface 211, Mobile Interface 212, and Real-time Resource Tracking View 213. The Flutter-Based UI 210 may utilize the Flutter framework to provide consistent functionality across web, Android, and iOS platforms. The Real-time Resource Tracking View 213 may display service resource location relative to customer vehicle or loss location in real-time, showing distance and estimated arrival time based on GPS breadcrumbs. The Flutter-Based UI 210 may perform "Display tracking data 210P" operations to render GPS tracking information and status updates in the Tracking View 213, "Enable web interface 210P1" operations to enable the Web Interface 211 for web-based access, and "Enable mobile interface 210P2" operations to enable the Mobile Interface 212 for mobile platform access.

The API Layer 300 may be configured to process service requests and coordinate communication between external systems and internal subsystems. The API Layer 300 may include an emergency roadside service dispatch system Engine API 310 that processes service requests and coordinates resource selection, a dispatch API integration system 320 (such as Dispatch API Integration) that receives GPS events and status updates from the resource network, and a mobile operating system notification framework API 330 (such as LiveActivity API) that sends mobile operating system notification framework updates (such as iOS LiveActivity notifications) to mobile devices. The emergency roadside service dispatch system Engine API 310 may perform "Process requests 310P" operations to handle service requests and route them to appropriate subsystems. The dispatch API integration system 320 may perform "Receive GPS events 320P" operations to receive GPS breadcrumb data from resources, such as service vehicles, and "Receive status events 321P" operations to receive status updates from resources. The mobile operating system notification framework API 330 may perform "Send notifications 330P" operations to deliver mobile operating system notification framework updates (such as iOS LiveActivity updates) to customer devices.

The GPS Tracking System 400 may be configured to receive, process, and store GPS breadcrumb data from service vehicles during specific service delivery phases. The GPS Tracking System 400 may include a GPS Event Receiver 410 that receives GPS events from the dispatch API integration system 320 (such as Dispatch API Integration), a GPS Breadcrumb Processor 420 that validates and processes GPS coordinates and timestamps, and a Phase-Specific GPS Collector 430 that controls GPS collection only during the en route to on scene phase. The GPS Event Receiver 410 may perform "Store GPS events 410P" operations to forward GPS events to the Event Storage System 600 and "Forward GPS events 410P1" operations to forward GPS events to the GPS Breadcrumb Processor 420 for processing. The GPS Breadcrumb Processor 420 may perform "Process breadcrumbs 420P" operations to validate and process GPS coordinates and timestamps before forwarding them to the Phase-Specific GPS Collector 430. The Phase-Specific GPS Collector 430 may perform "Correlate with status 430P" operations to ensure GPS events are properly correlated with status lifecycle transitions.

The Status Lifecycle Management System 500 may be configured to track services through comprehensive status states and handle edge cases. The Status Lifecycle Management System 500 may include a Status Transition Manager 510 that detects and validates status transitions, an Edge Case Handler 520 that processes special scenarios, and a Multi-Dispatch Cancellation Manager 530 that prevents incorrect notifications in multi-dispatch scenarios. The Status Transition Manager 510 may perform "Store status events 510P" operations to forward status changes to the Event Storage System 600, "Trigger GPS collection 510P1" operations to initiate GPS tracking when en route status is detected, "Route edge cases 510P2" operations to route edge case scenarios to the Edge Case Handler 520, and "Route cancellation scenarios 510P3" operations to route cancellation scenarios to the Multi-Dispatch Cancellation Manager 530.

The Event Storage System 600 may be configured to store all events (GPS, status, resource selection) in a unified structure that enables correlation analysis and dispute resolution. The Event Storage System 600 may include a Unified Event Storage 610 that stores all event types in event status records (such as Ext_RASDigitalEventStatus records), an Event Correlation Engine 620 that correlates GPS and status events by timestamp, and a Dispute Resolution Data Structure 630 that enables timeline reconstruction and location verification. The Unified Event Storage 610 may perform "Enable correlation 610P" operations to enable the Event Correlation Engine 620 to correlate GPS and status events and "Enable dispute resolution data 610P1" operations to enable the Dispute Resolution Data Structure 630 to provide timeline reconstruction and location verification. The Event Correlation Engine 620 may perform "Enable dispute resolution 620P" operations to provide correlation analysis capabilities to the Dispute Resolution Data Structure 630.

The Resource Selection System 700 may be configured to automatically select resources based on location, service type, availability, and ETA criteria. The Resource Selection System 700 may include a Resource Selection Engine 710 that searches, evaluates, ranks, and selects resources, an ETA-Based Auto-Acceptance Logic 720 that automatically accepts dispatch offers when ETA is within service-specific thresholds, a Resource Login Status Checker 730 that filters resources based on login status, a Multi-Resource Workflow Manager 740 that manages 90-second rotation sequences and handles rejections/timeouts, and a resource management software integration 750 (such as TMS Integration) that integrates with provider management systems (such as resource Tow Management Software) for auto-acceptance. The Resource Selection Engine 710 may perform "Store selection events 710P" operations to forward resource selection events to the Event Storage System 600, "Create dispatch offer 710P1" operations to create dispatch offer records (such as Ext_RASDispatchOffer records) that link resource selection to GPS tracking, "Enable auto-acceptance 710P2" operations to enable the ETA-Based Auto-Acceptance Logic 720, "Enable login status check 710P3" operations to enable the Resource Login Status Checker 730, "Enable multi-resource workflow 710P4" operations to enable the Multi-Resource Workflow Manager 740, and "Enable TMS integration 710P5" operations to enable the TMS Integration 750.

The Integration Layer 800 may be configured to link resource selection events with GPS tracking events and coordinate status transitions with GPS collection. The Integration Layer 800 may include a Resource Selection to GPS Tracking Linker 810 that links dispatch offer records (such as Ext_RASDispatchOffer records) to event status records (such as Ext_RASDigitalEventStatus records), a Status-Triggered GPS Collection 820 that monitors status transitions and triggers GPS collection when en route is detected, an ETA Validation Feedback Loop 830 that compares initial ETA (from resource selection) with actual GPS-tracked arrival time, and a Unified Tracking Visibility Manager 840 that coordinates resource selection status with GPS tracking for unified customer view. The Resource Selection to GPS Tracking Linker 810 may perform "Link to GPS events 810P" operations to create links between resource selection and GPS tracking events in unified storage and "Enable status-triggered collection 810P1" operations to enable the Status-Triggered GPS Collection 820. The Status-Triggered GPS Collection 820 may perform "Begin GPS collection 820P" operations to initiate GPS tracking when en route status is detected and "Enable ETA validation 820P1" operations to enable the ETA Validation Feedback Loop 830. The ETA Validation Feedback Loop 830 may perform "Validate selection 830P" operations to provide feedback on resource selection accuracy and "Enable unified tracking view 830P1" operations to enable the Unified Tracking Visibility Manager 840. The Unified Tracking Visibility Manager 840 may perform "Display unified view 840P" operations to render seamless tracking from resource selection through completion in the Tracking View 213.

The eight-subsystem architecture (emergency roadside service dispatch system 100) separates concerns into distinct functional subsystems (GPS Tracking System 400, Status Lifecycle Management System 500, Event Storage System 600, Resource Selection System 700, Integration Layer 800) while maintaining clear data flows, which may enable independent scaling and updating of each subsystem. The Integration Layer 800 uses indexed linking structures (dispatch offer records linked to event status records) that may enable O(1) navigation between related events, compared to O(n) sequential scans in conventional systems, and may reduce system deployment time compared to monolithic systems.

In operation, the emergency roadside service dispatch system (such as ERS Digital Dispatch System 100) implements a comprehensive service delivery tracking workflow. Service requests flow from the Flutter-Based UI 210 to the emergency roadside service dispatch system Engine API 310 (such as ERS Engine API), which coordinates resource selection through the Resource Selection Engine 710. Resource selection creates dispatch offer records (such as Ext_RASDispatchOffer records) via "Create dispatch offer 710P1" operations. When a resource is selected and becomes en route, the Status Transition Manager 510 detects the en route status transition and triggers GPS collection via "Trigger GPS collection 510P1" operations to the Phase-Specific GPS Collector 430. GPS breadcrumbs flow from service vehicles through the dispatch API integration system 320 (such as Dispatch API Integration) to the GPS Event Receiver 410, which stores GPS events in the Unified Event Storage 610 via "Store GPS events 410P" operations. Status changes are stored via "Store status events 510P" operations. The Resource Selection to GPS Tracking Linker 810 creates links between dispatch offer records and event status records via "Link to GPS events 810P" operations, enabling unified querying of complete service delivery history through linked data structures. The Unified Tracking Visibility Manager 840 coordinates status and GPS tracking to display unified view via "Display unified view 840P" operations in the Tracking View 213.

GPS Tracking System

Figure 2A:
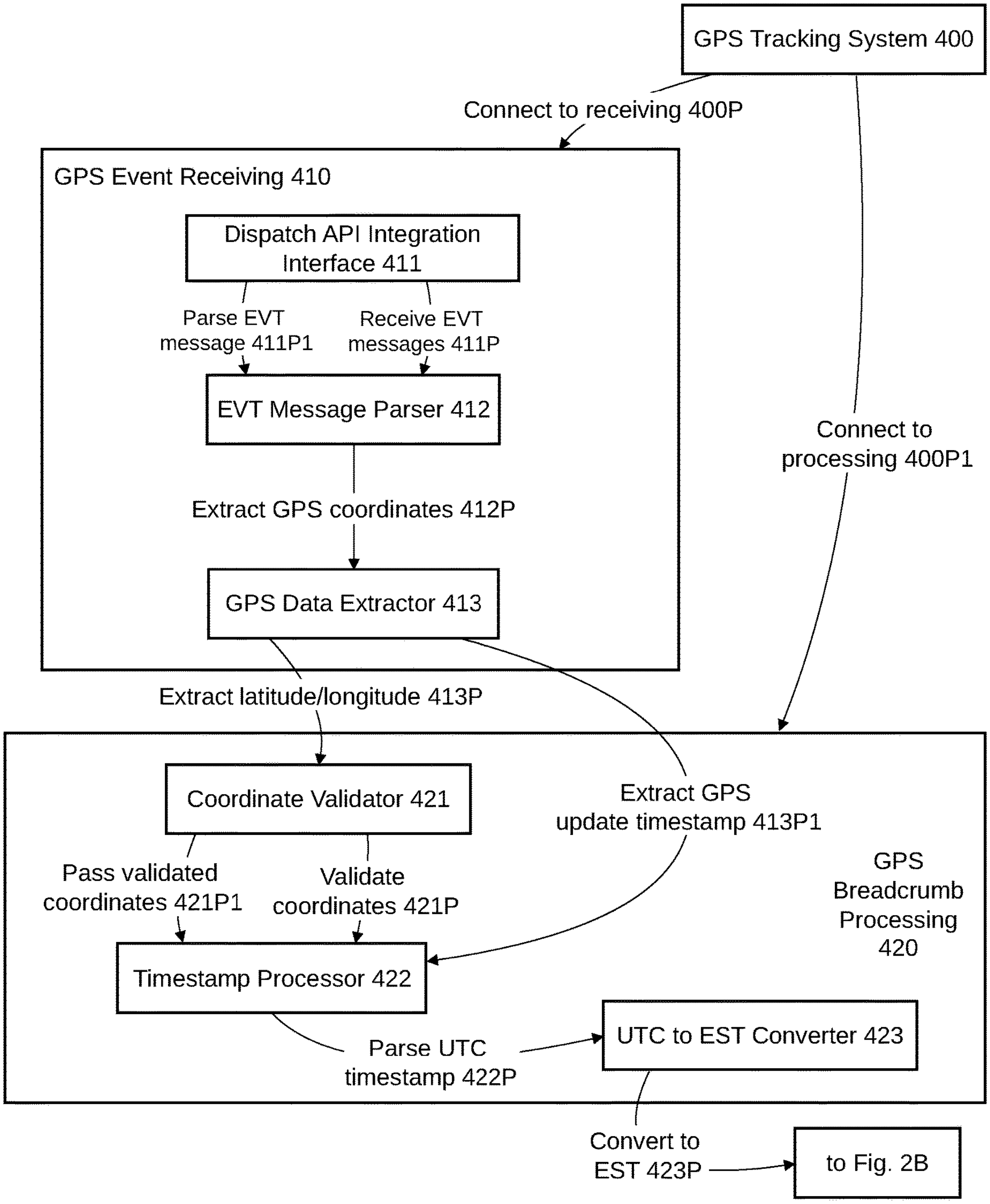
FIG. 2A illustrates a first portion of a detailed block diagram of a GPS Tracking System showing GPS event receiving and GPS breadcrumb processing components in accordance with an embodiment.
Figure 2B:
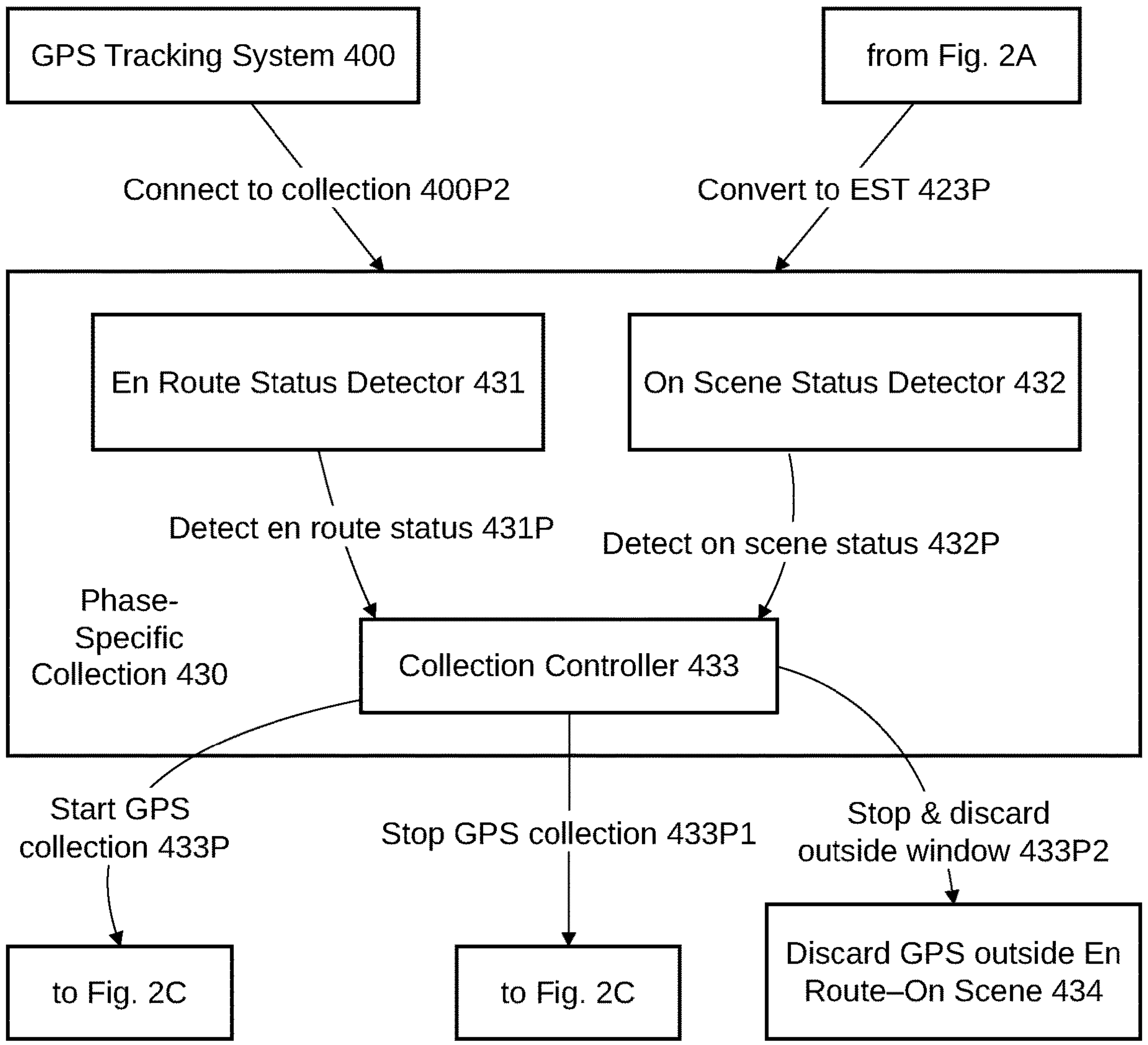
FIG. 2B illustrates a second portion of a detailed block diagram of a GPS Tracking System showing phase-specific collection components in accordance with an embodiment.
Figure 2C:
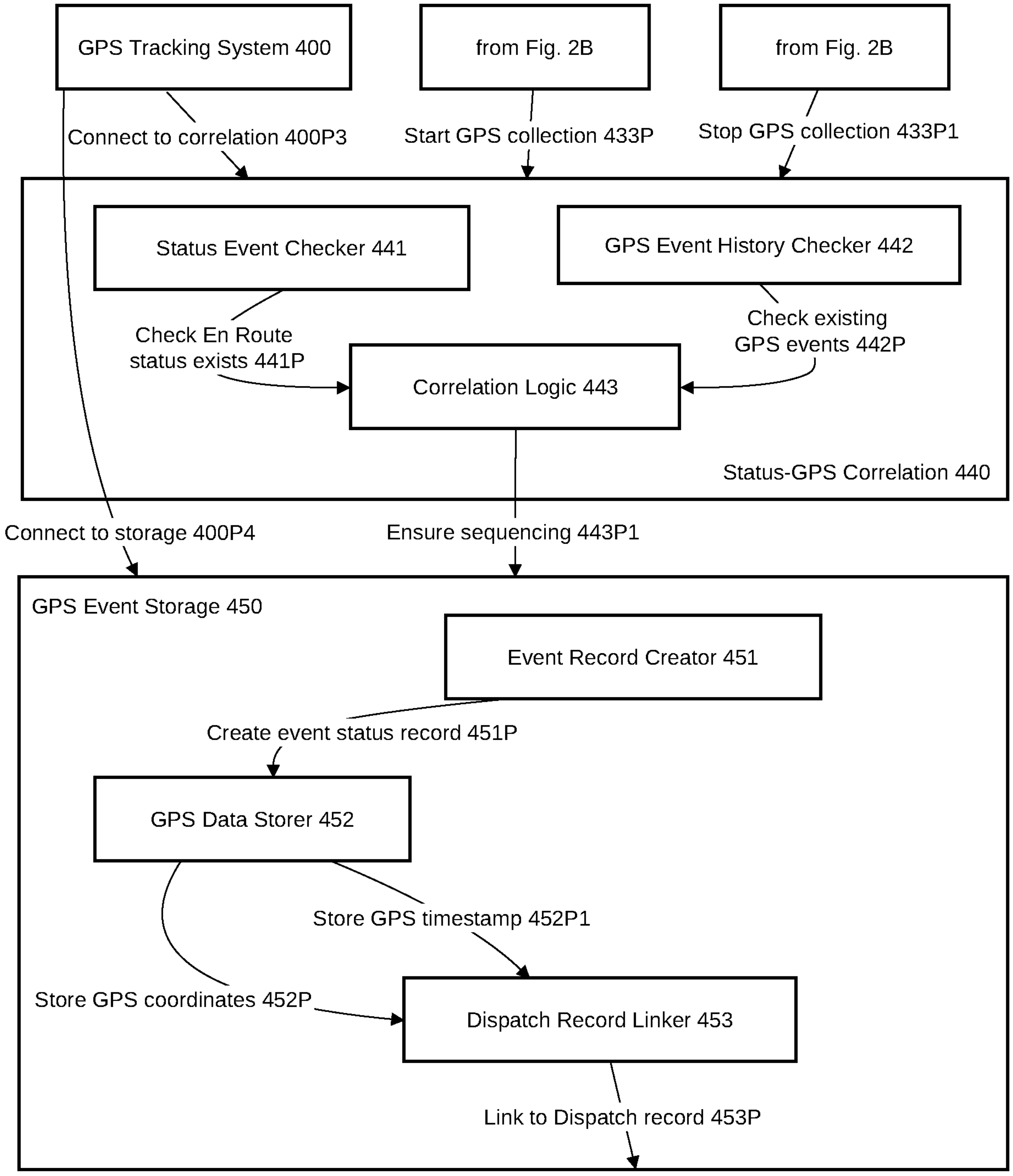
FIG. 2C illustrates a third portion of a detailed block diagram of a GPS Tracking System showing status-GPS correlation and GPS event storage components in accordance with an embodiment.

Referring now to FIGS. 2A-C, the GPS Tracking System 400 is illustrated in greater detail in accordance with an embodiment. The GPS Tracking System 400 may be configured to receive, process, validate, and store GPS breadcrumb data from service vehicles during the en route to on scene phase of service delivery. The GPS Tracking System 400 may perform "Connect to receiving 400P" operations to connect to the GPS Event Receiving 410 subsystem, "Connect to processing 400P1" operations to connect to the GPS Breadcrumb Processing 420 subsystem, "Connect to collection 400P2" operations to connect to the Phase-Specific Collection 430 subsystem, "Connect to correlation 400P3" operations to connect to the Status-GPS Correlation 440 subsystem, and "Connect to storage 400P4" operations to connect to the GPS Event Storage 450 subsystem.

The GPS Tracking System 400 may comprise five functional subsystems: GPS Event Receiving 410, GPS Breadcrumb Processing 420, Phase-Specific Collection 430, Status-GPS Correlation 440, and GPS Event Storage 450.

The GPS Event Receiving 410 subsystem may be configured to receive and parse structured GPS data messages (such as EVT (event) messages) containing GPS coordinates from a dispatch API integration system (such as Dispatch API integration system). The GPS Event Receiving 410 may include a dispatch API integration interface 411 (such as Dispatch API Integration Interface) that receives structured GPS data messages (such as EVT messages) via REST API endpoints, a structured GPS data message parser 412 (such as EVT Message Parser) that parses XML-formatted structured GPS data messages (such as EVT messages) according to a message schema (such as EVT.xsd schema), and a GPS Data Extractor 413 that extracts GPS coordinates (latitude and longitude) and timestamp data from parsed structured GPS data messages. The dispatch API integration interface 411 may perform "Receive structured GPS data messages 411P" operations to receive incoming structured GPS data messages (such as EVT messages) from the dispatch API integration system 320 (such as Dispatch API Integration) and "Parse EVT message 411P1" operations to forward parsed messages to the structured GPS data message parser 412. The structured GPS data message parser 412 may perform "Extract GPS coordinates 412P" operations to parse structured GPS data message structure and extract GPS-related data fields. The GPS Data Extractor 413 may perform "Extract latitude/longitude 413P" operations to extract latitude and longitude values from structured GPS data messages and "Extract timestamp data 413P1" operations to extract coordinated universal time timestamp data.

The GPS Breadcrumb Processing 420 subsystem may be configured to validate GPS coordinates, process timestamps, and convert coordinated universal time timestamps to a standardized time zone for consistent storage. The GPS Breadcrumb Processing 420 may include a Coordinate Validator 421 that validates latitude and longitude values are within valid ranges (latitude: −90 to 90 degrees, longitude: −180 to 180 degrees), a Timestamp Processor 422 that parses coordinated universal time timestamp strings in "yyyy-MM-dd HH:mm:ss" format, and a timezone converter 423 (such as UTC to EST Converter) that converts coordinated universal time timestamps to a standardized time zone (such as Eastern Standard Time (EST)) using timezone conversion functions (such as Java ZonedDateTime and ZoneId classes). The Coordinate Validator 421 may perform "Validate coordinates 421P" operations to ensure GPS coordinates are valid before processing and "Pass validated coordinates 421P1" operations to forward validated coordinates to the Timestamp Processor 422. The Timestamp Processor 422 may perform "Parse coordinated universal time timestamp 422P" operations to parse coordinated universal time timestamp strings from structured GPS data messages (such as EVT messages). The timezone converter 423 may perform "Convert to standardized time zone 423P" operations using a timezone-aware date-time converter (such as Java ZonedDateTime class) that parses coordinated universal time timestamps and converts them to a standardized time zone (such as EST) using timezone conversion functions, ensuring all event timestamps are stored in a standardized time zone for consistent correlation analysis.

The Phase-Specific Collection 430 subsystem may be configured to store GPS coordinates only when received in structured GPS data messages (such as EVT messages) during the en route to on scene phase. The Phase-Specific Collection 430 may include an en route Status Detector 431 that detects when en route status (such as TC_ENROUTE) is received in structured GPS data messages (such as EVT messages), an on scene Status Detector 432 that detects when on scene status (such as TC_ONSCENE) is received in structured GPS data messages (such as EVT messages), a Collection Controller 433 that stores GPS coordinates when present in structured GPS data messages (such as EVT messages) during the en route to on scene phase, and a Discard GPS outside En Route-On Scene 434 that discards GPS data received outside the en route to on scene phase window. The en route Status Detector 431 may perform "Detect en route status 431P" operations to identify when a resource transitions to en route status based on StatusType field in structured GPS data messages (such as EVT messages). The on scene Status Detector 432 may perform "Detect on scene status 432P" operations to identify when a resource arrives on scene based on StatusType field in structured GPS data messages (such as EVT messages). The Collection Controller 433 may perform "Store GPS when present 433P" operations to store GPS coordinates and timestamps when present in structured GPS data messages (such as EVT messages) received during the en route to on scene phase, wherein GPS coordinates are stored only when received in structured GPS data messages during this phase, "Start GPS collection 433P" operations to initiate GPS data collection when en route status is detected, "Stop GPS collection 433P1" operations to terminate GPS data collection when on scene status is detected, and "Stop & discard outside window 433P2" operations to stop collection and discard GPS data that falls outside the en route to on scene phase window. The Discard GPS outside En Route-On Scene 434 may be configured to discard GPS coordinates and timestamps that are received outside the defined en route to on scene phase window, ensuring that only relevant GPS data during the active service phase is stored.

Outside the en route—to—on scene collection window, any GPS breadcrumbs received may be discarded and not persisted in the unified event storage. This may ensure that only phase-relevant GPS data is stored for a dispatch. It is understood that other embodiments are not limited thereto, and may similarly be applied to one or more phases other than or in addition to the en route to on scene phase. For example, according to another embodiment, the phase-specific GPS collection may store GPS data for both of the en route to on scene phase, as well as the destination phase, and/or during any phase when GPS data is received.

The Status-GPS Correlation 440 subsystem may be configured to ensure GPS events correlate with status events and prevent duplicate events. The Status-GPS Correlation 440 may include a Status Event Checker 441 that checks for existing en route status events before triggering GPS-based notifications, a GPS Event History Checker 442 that checks for existing GPS events to prevent duplicates, and a Correlation Logic 443 that implements correlation rules to ensure proper sequencing. The Status Event Checker 441 may perform "Check en route status exists 441P" operations to query existing event status records for en route status events (such as ext_RASDigitalEventType equal to TC_ENROUTE) before triggering GPS-based mobile operating system notification framework notifications (such as LiveActivity notifications). The GPS Event History Checker 442 may perform "Check existing GPS events 442P" operations to query existing event status records (such as Ext_RASDigitalEventStatus records) for GPS events with event type equal to GPS event type (such as ext_RASDigitalEventType equal to TC_GPS) to prevent duplicate notifications. The Correlation Logic 443 may perform "Prevent duplicates 443P" operations by checking that no existing GPS events are found before triggering mobile operating system notification framework updates (such as LiveActivity updates) and "Ensure sequencing 443P1" operations by ensuring en route status events exist before GPS-based notifications are triggered, ensuring GPS events are only meaningful in the context of en route status.

The Status-GPS correlation system (Status-GPS Correlation 440) creates an interdependent relationship between status lifecycle transitions and GPS event collection. The correlation logic (Status Event Checker 441, GPS Event History Checker 442, Correlation Logic 443) uses indexed queries on event type fields to validate en route status existence and check for existing GPS events before triggering notifications, performing O(1) lookups that may reduce correlation check time compared to conventional systems. This indexed correlation approach may reduce notification inconsistency errors and duplicate notification rates by ensuring proper sequencing where en route status events must exist before GPS-based notifications are triggered.

The GPS Event Storage 450 subsystem may be configured to create and store event status records (such as Ext_RASDigitalEventStatus records) containing GPS data linked to Dispatch records. The GPS Event Storage 450 may include an Event Record Creator 451 that creates new event status records, a GPS Data Storer 452 that stores GPS coordinates (such as ext_DigitalGPSLatitude for latitude and ext_DigitalGPSLongitude for longitude) and GPS timestamps (such as ext_GPSLastUpdateTime), and a Dispatch Record Linker 453 that links GPS events to Dispatch records via dispatch identifier (such as ext_DispatchNumber). The Event Record Creator 451 may perform "Create event status record 451P" operations to instantiate new event records. The GPS Data Storer 452 may perform "Store GPS coordinates 452P" operations to store latitude and longitude values and "Store GPS timestamp 452P1" operations to store standardized time zone-converted timestamps (such as EST-converted timestamps). The Dispatch Record Linker 453 may perform "Link to Dispatch record 453P" operations to establish the relationship between GPS events and Dispatch records.

To implement the GPS Tracking System 400, one may utilize a digital provider service implementation that processes structured GPS data messages (such as EVT messages) containing GPS coordinates. The system receives structured GPS data messages (such as EVT messages) via REST API endpoints from a dispatch API integration system (such as Dispatch API integration system), parses XML-formatted messages according to a message schema (such as EVT.xsd schema), extracts latitude and longitude coordinates and coordinated universal time timestamp fields when present in structured GPS data messages (such as EVT messages), validates coordinates are within valid ranges, converts coordinated universal time timestamps to a standardized time zone (such as EST) using a timezone conversion function, and stores GPS data in event status records (such as Ext_RASDigitalEventStatus records) linked to Dispatch records. The system implements phase-specific collection by storing GPS coordinates when received in structured GPS data messages (such as EVT messages) during the en route to on scene phase, and implements correlation logic by checking for existing en route status events and existing GPS events before triggering GPS-based mobile operating system notification framework notifications (such as LiveActivity notifications).

Alternative implementations may utilize different GPS data formats (JSON instead of XML), different timezone conversion libraries (such as Joda-Time instead of Java ZonedDateTime), or different coordinate validation approaches (geohash validation instead of range checking). These alternatives may achieve comparable functionality for GPS tracking and storage.

The GPS Tracking System 400 provides measurable technical improvements in data storage efficiency and query performance. The status-GPS correlation logic uses indexed queries that may reduce correlation validation time compared to conventional systems, representing an improvement in correlation performance. The unified event storage structure may eliminate join operations or correlation logic, may reduce query latency for GPS-status correlation queries. These improvements may enable real-time GPS tracking at enterprise scale, which is not achievable with conventional architectures that experience exponential performance degradation as event counts grow.

Status Lifecycle Management System

Figure 3A:
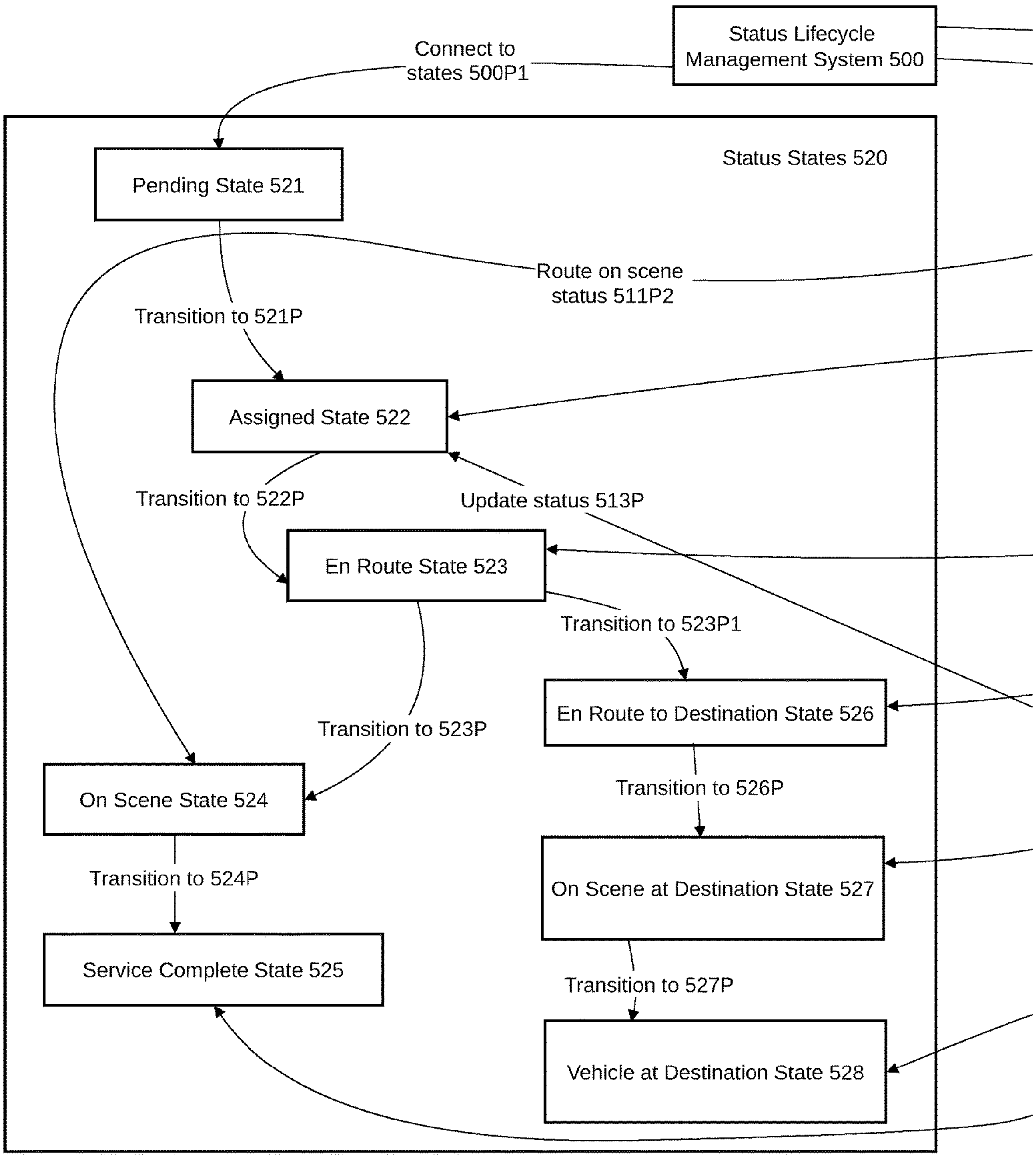
FIG. 3A illustrates a first portion of a detailed block diagram of a Status Lifecycle Management System showing status transition management and status states in accordance with an embodiment.
Figure 3A:
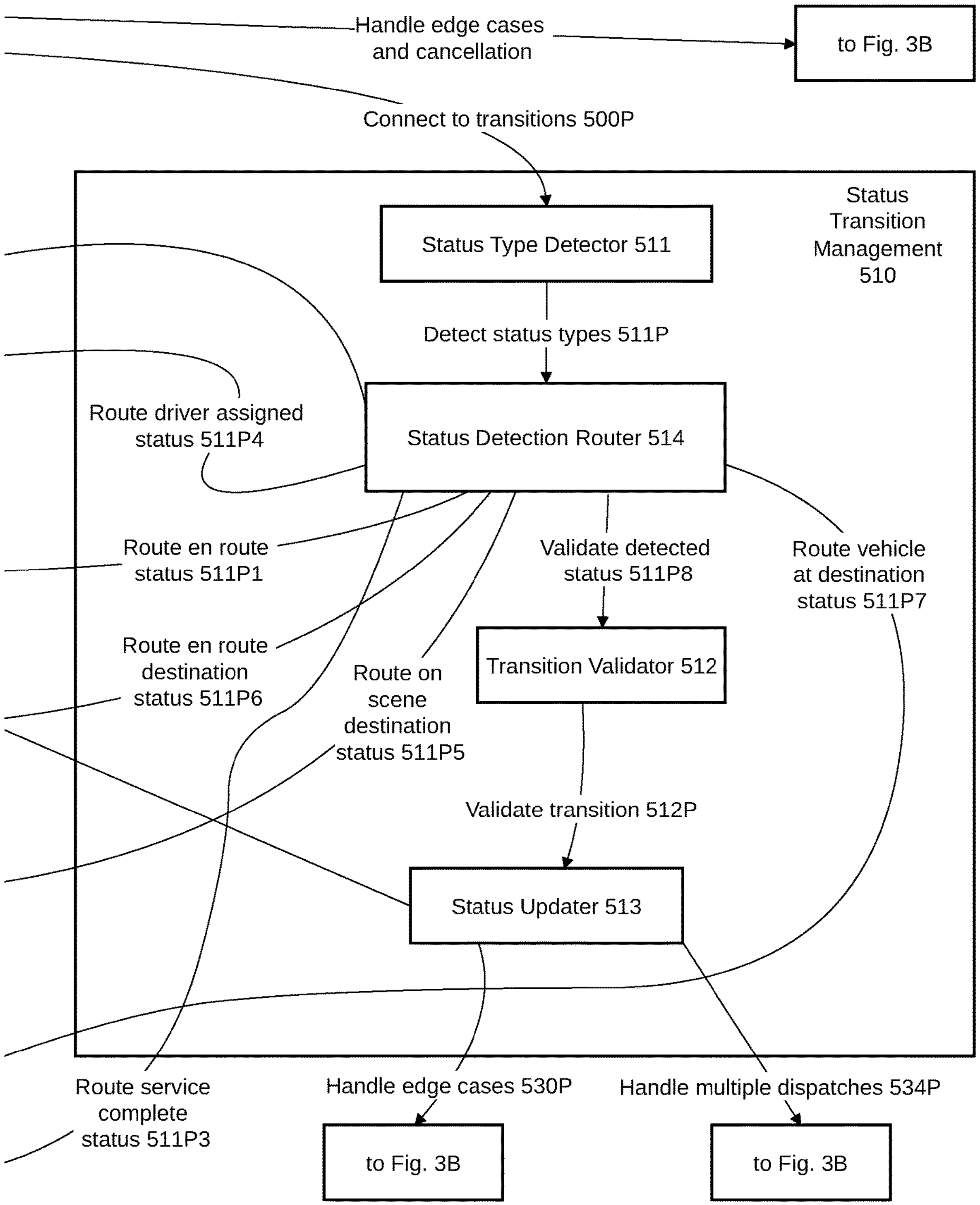
Figure 3B:
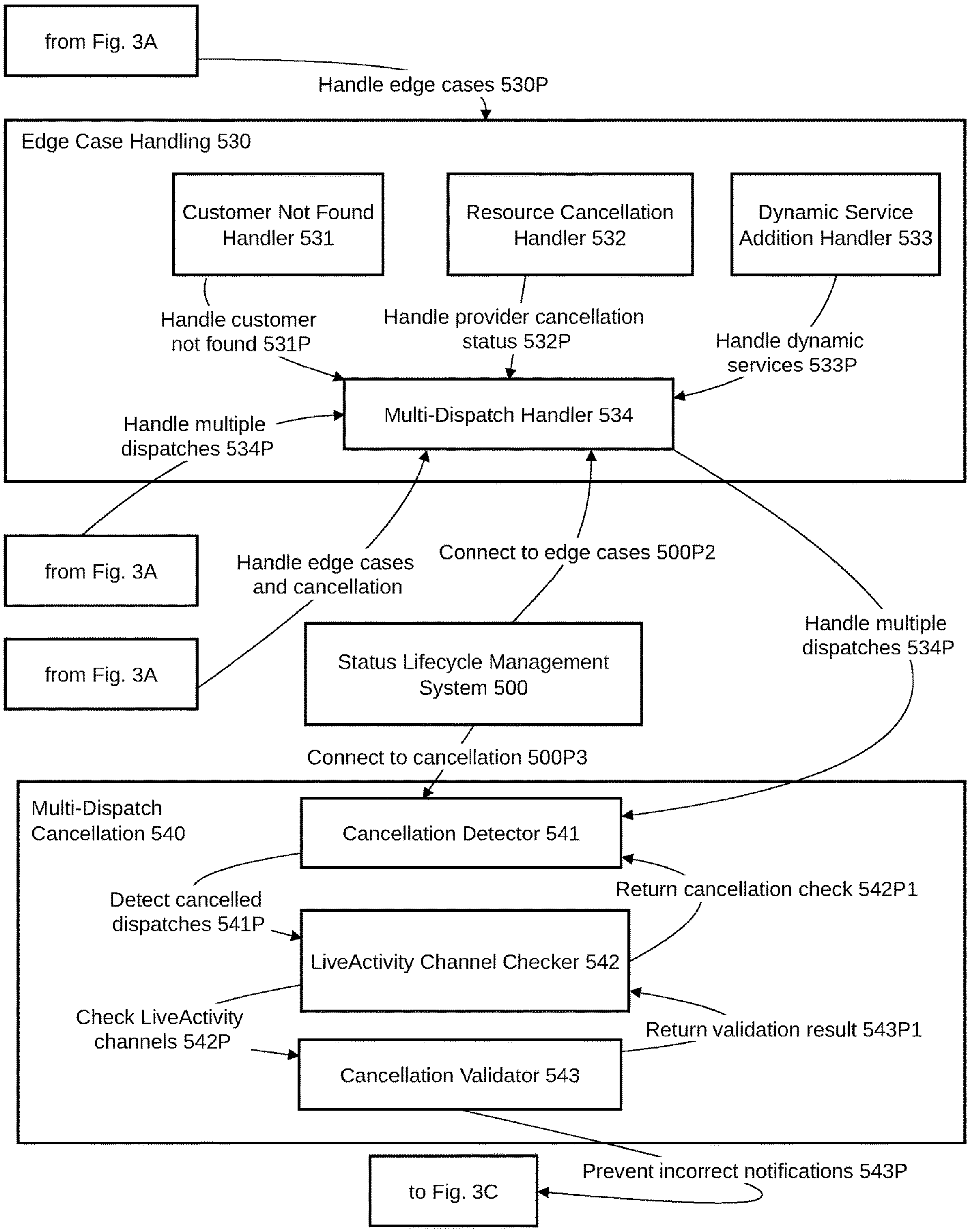
FIG. 3B illustrates a second portion of a detailed block diagram of a Status Lifecycle Management System showing edge case handling and multi-dispatch cancellation management in accordance with an embodiment.
Figure 3C:
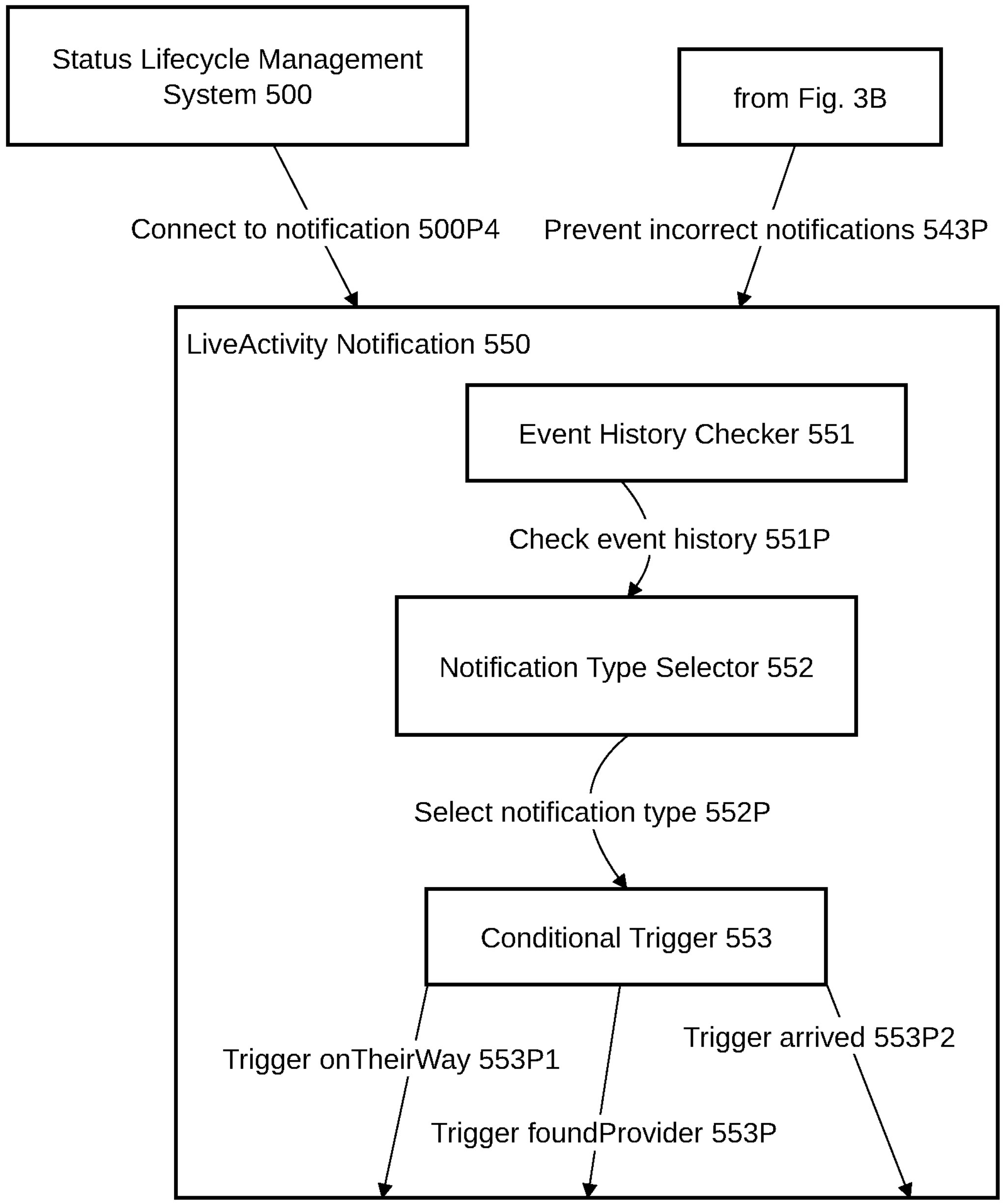
FIG. 3C illustrates a third portion of a detailed block diagram of a Status Lifecycle Management System showing mobile operating system notification framework notification components (such as LiveActivity notification components) in accordance with an embodiment.

Referring now to FIGS. 3A-C, the Status Lifecycle Management System 500 is illustrated in greater detail in accordance with an embodiment. The Status Lifecycle Management System 500 may be configured to track services through comprehensive status states, handle edge cases, manage multi-dispatch cancellation scenarios, and trigger conditional mobile operating system notification framework notifications (such as LiveActivity notifications). The Status Lifecycle Management System 500 may perform "Connect to transitions 500P" operations to connect to the Status Transition Management 510 subsystem, "Connect to states 500P1" operations to connect to the Status States 520 subsystem, "Connect to edge cases 500P2" operations to connect to the Edge Case Handling 530 subsystem, "Connect to cancellation 500P3" operations to connect to the Multi-Dispatch Cancellation 540 subsystem, and "Connect to notification 500P4" operations to connect to the mobile operating system notification framework notification 550 (such as LiveActivity Notification) subsystem.

The Status Lifecycle Management System 500 may comprise five functional subsystems: Status Transition Management 510, Status States 520, Edge Case Handling 530, Multi-Dispatch Cancellation 540, and mobile operating system notification framework notification 550 (such as LiveActivity Notification).

The Status Transition Management 510 subsystem may be configured to detect status types from incoming messages, validate status transitions, and update status states. The Status Transition Management 510 may include a Status Type Detector 511 that identifies status types from structured GPS data messages (such as messages from dispatch API integration systems such as dispatch API messages) including en route status (such as TC_ENROUTE), on scene status (such as TC_ONSCENE), service complete status (such as TC_SERVICECOMPLETE), driver assigned status (such as TC_DRIVERASSIGNED), on scene at destination status (such as TC_ONSCENEDESTINATION), en route to destination status (such as TC_ENROUTEDEST), and vehicle at destination location status (such as TC_VEHICLEAT-DESTINATIONLOCATION), a Status Detection Router 514 that routes detected status types to appropriate state transitions, a Transition Validator 512 that ensures valid state transitions before updating status, and a Status Updater 513 that updates status states and processes status events. The Status Type Detector 511 may perform "Detect status types 511P" operations to identify status types from structured GPS data messages. The Status Detection Router 514 may perform "Route en route status 511P1" operations to route en route status detections, "Route on scene status 511P2" operations to route on scene status detections, "Route service complete status 511P3" operations to route service complete status detections, "Route driver assigned status 511P4" operations to route Driver Assigned status detections, "Route on scene at destination status 511P5" operations to route on scene at Destination status detections, "Route en route to destination status 511P6" operations to route en route to Destination status detections, "Route vehicle at destination location status 511P7" operations to route Vehicle at Destination Location status detections, and "Validate detected status 511P8" operations to forward detected status types to the Transition Validator 512. The Transition Validator 512 may perform "Validate transition 512P" operations to ensure status transitions follow valid state sequences. The Status Updater 513 may perform "Update status 513P" operations to update status states and process status events from structured GPS data messages (such as EVT messages).

The Status States 520 subsystem may be configured to represent the comprehensive status lifecycle states that services progress through. The Status States 520 may include a Pending State 521 (service requested but not yet assigned to a resource), an Assigned State 522 (resource selected and assigned to the dispatch), an en route State 523 (resource traveling to the service location), an on scene State 524 (resource arrived at the service location), a service complete State 525 (service finished), an en route to Destination State 526 (resource traveling to destination if applicable), an on scene at Destination State 527 (resource arrived at destination), and a Vehicle at Destination State 528 (vehicle delivered to destination). Status transitions flow from Pending State 521 to Assigned State 522 via "Transition to 521P" operations, from Assigned State 522 to en route State 523 via "Transition to 522P" operations, from en route State 523 to on scene State 524 via "Transition to 523P" operations, from on scene State 524 to service complete State 525 via "Transition to 524P" operations, from en route State 523 to en route to Destination State 526 via "Transition to 523P1" operations (for towing scenarios), from en route to Destination State 526 to on scene at Destination State 527 via "Transition to 526P" operations, and from on scene at Destination State 527 to Vehicle at Destination State 528 via "Transition to 527P" operations.

The Edge Case Handling 530 subsystem may be configured to process special scenarios that occur during service delivery. The Edge Case Handling 530 may include a Customer Not Found Handler 531 that processes scenarios where customers are not found at the service location, a Resource Cancellation Handler 532 that processes provider cancellation reason type (such as TC_PROVCANCEL) when resources cancel due to conflicts, a Dynamic Service Addition Handler 533 that processes situations requiring additional services (such as a jump start that also needs a flat tire fixed, or a winch situation requiring a tow), and a Multi-Dispatch Handler 534 that processes scenarios where multiple dispatches exist for the same claim. The Edge Case Handling 530 may perform "Handle edge cases 530P" operations to route edge case scenarios to appropriate handlers. The Customer Not Found Handler 531 may perform "Handle customer not found 531P" operations to update status when customers cannot be located. The Resource Cancellation Handler 532 may perform "Handle provider cancellation 532P" operations to process resource cancellations and trigger resource reselection. The Dynamic Service Addition Handler 533 may perform "Handle dynamic services 533P" operations to add additional services during service delivery. The Multi-Dispatch Handler 534 may perform "Handle multiple dispatches 534P" operations to coordinate status updates across multiple dispatches for the same claim.

The Multi-Dispatch Cancellation 540 subsystem may be configured to prevent incorrect mobile operating system notification framework notifications (such as LiveActivity notifications) when dispatches are cancelled in multi-dispatch scenarios. The Multi-Dispatch Cancellation 540 may include a Cancellation Detector 541 that identifies cancelled dispatches with mobile operating system notification framework channels (such as LiveActivity channels), a mobile operating system notification framework channel checker 542 (such as LiveActivity Channel Checker) that checks for active mobile operating system notification framework channels (such as LiveActivity channels) on cancelled dispatches, and a Cancellation Validator 543 that validates cancellation state before allowing notifications. The Cancellation Detector 541 may perform "Detect cancelled dispatches 541P" operations to query all dispatches for a claim to find cancelled dispatches with cancelled status (such as ext_DispatchStatus equal to TC_CANCELLED) with mobile operating system notification framework channels (such as LiveActivity channels, such as ext_LiveActivity-ChannelId not null). The mobile operating system notification framework channel checker 542 may perform "Check mobile operating system notification framework channels 542P" operations to verify cancelled dispatches have active mobile operating system notification framework channels (such as LiveActivity channels) and "Return cancellation check 542P1" operations to return cancellation check results to the Cancellation Detector 541 when validation fails or re-check is needed. The Cancellation Validator 543 may perform "Prevent incorrect notifications 543P" operations to prevent driver assigned notifications when previous dispatches were cancelled with active mobile operating system notification framework channels (such as LiveActivity channels) and "Return validation result 543P1" operations to return validation results to the mobile operating system notification framework channel checker 542 when re-check is needed.

The multi-dispatch cancellation handler (Multi-Dispatch Cancellation 540) uses indexed queries on dispatch status and mobile operating system notification framework channel fields to check for cancelled dispatches with active channels across all dispatches for a claim before sending driver assigned notifications. This checking algorithm (Cancellation Detector 541, mobile operating system notification framework channel checker 542, Cancellation Validator 543) performs O(1) indexed queries enabling rapid cancellation checks, compared to sequential scans in conventional systems. The indexed query approach scales linearly and may reduce incorrect notification rates by ensuring driver assigned notifications are only sent when no previous cancelled dispatches with active channels exist for the claim.

The mobile operating system notification framework notification 550 (such as LiveActivity Notification) subsystem may be configured to conditionally trigger mobile operating system notification framework notifications (such as iOS LiveActivity notifications) based on event history and state checking. The mobile operating system notification framework notification 550 may include an Event History Checker 551 that checks for existing events before triggering notifications, a Notification Type Selector 552 that selects appropriate notification types (foundProvider, onTheirWay, arrived) based on event sequences, and a Conditional Trigger 553 that triggers notifications only when appropriate conditions are met. The Event History Checker 551 may perform "Check event history 551P" operations to query existing event status records (such as Ext_RASDigitalEventStatus records) to determine if notifications should be triggered. The Notification Type Selector 552 may perform "Select notification type 552P" operations to choose appropriate notification types based on event sequences. The Conditional Trigger 553 may perform "Trigger foundProvider 553P" operations when driver assigned events occur and no previous driver assigned events exist, "Trigger onTheirWay 553P1" operations when en route or GPS events occur and no previous GPS or en route events exist, and "Trigger arrived 553P2" operations when on scene or service complete events occur and no previous arrival events exist.

The conditional mobile operating system notification framework notification system (mobile operating system notification framework notification 550) uses indexed queries on event type fields to check event history before triggering notifications, performing O(1) indexed lookups via event type and dispatch identifier query keys. The conditional triggering logic (Event History Checker 551, Notification Type Selector 552, Conditional Trigger 553) enables rapid event history checks even for dispatches with multiple events, compared to sequential scans in conventional systems, adding only minimal overhead per notification check. This indexed query approach may reduce duplicate notification rates as compared to conventional event broadcasting systems. The indexed query approach may also reduce mobile device network usage by preventing duplicate API calls.

To implement the Status Lifecycle Management System 500, one may utilize a digital provider service implementation that processes status updates from structured GPS data messages (such as messages from dispatch API integration systems such as dispatch API messages). The system detects status types from status type fields, validates status transitions, creates event status records (such as Ext_RASDigitalEventStatus records) for each status change, handles edge cases including customer not found, resource cancellations with provider cancellation reason type (such as TC_PROVCANCEL), and dynamic service additions, implements multi-dispatch cancellation checking, and conditionally triggers mobile operating system notification framework notifications (such as LiveActivity notifications) based on event history. The mobile operating system notification framework event function (such as LiveActivity event function) implements conditional logic that checks for existing events before triggering notifications, ensuring proper sequencing and preventing duplicates.

Alternative implementations may utilize different status enumeration types, different edge case handling approaches, or different notification triggering logic. These alternatives may achieve comparable functionality for status lifecycle management and notification delivery.

The Status Lifecycle Management System 500 provides significant technical improvements in notification accuracy and system reliability. The conditional mobile operating system notification framework triggering mechanism (such as conditional LiveActivity triggering) may reduce duplicate notification rates as compared to conventional event broadcasting systems, representing an improvement in notification accuracy. The state-aware notification system uses indexed queries that enable rapid event history checks, compared to sequential scans in conventional systems, may reduce notification processing overhead. The multi-dispatch cancellation handling prevents incorrect notifications in multi-dispatch scenarios, may reduce notification errors through indexed cancellation checks. These improvements eliminate unnecessary network traffic by preventing duplicate API calls, may reduce mobile device network usage compared to systems that broadcast notifications without state checking.

Event Storage System

Figure 4A:
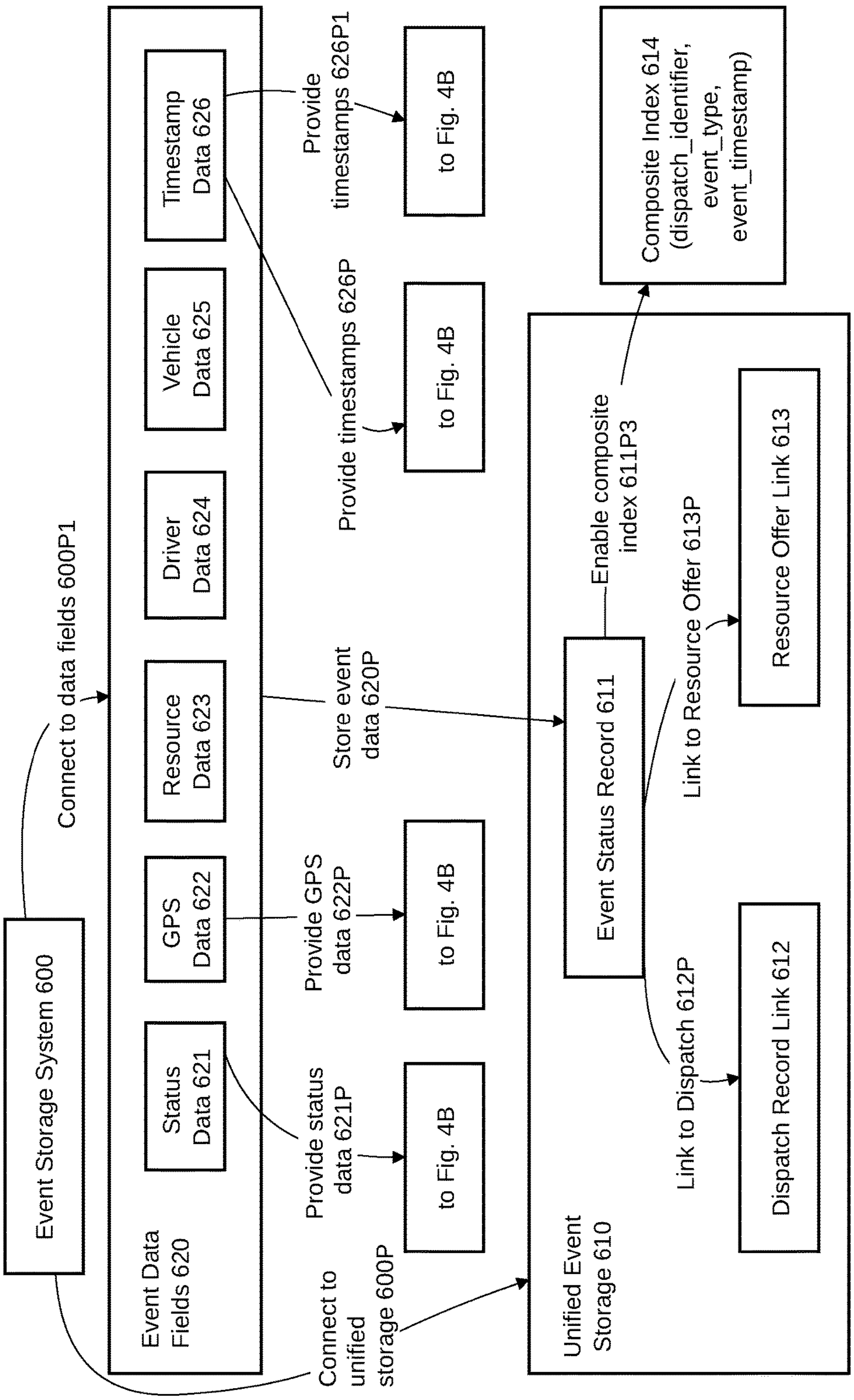
FIG. 4A illustrates a first portion of a detailed block diagram of an Event Storage System showing unified event storage and event data fields in accordance with an embodiment.
Figure 4B:
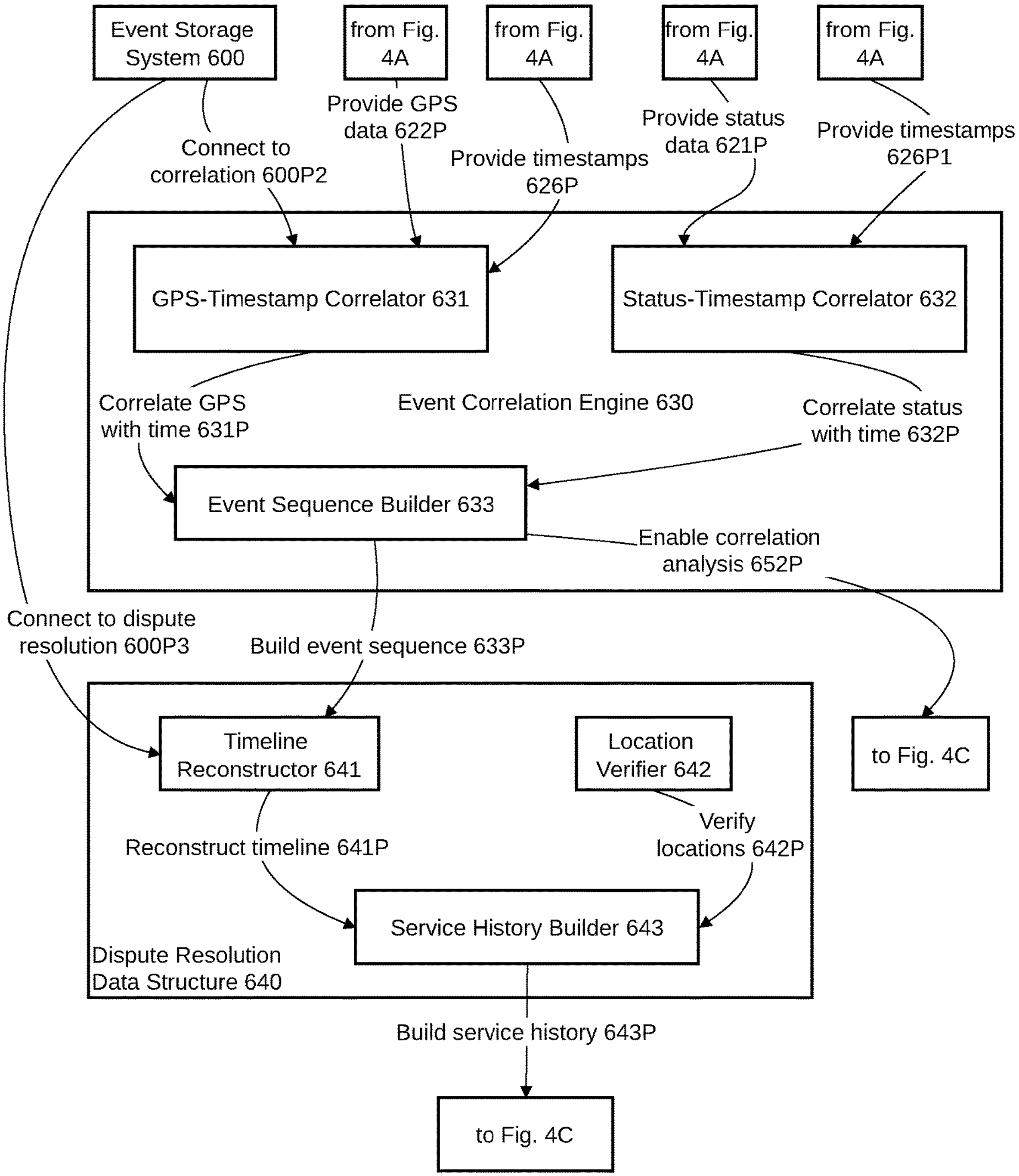
FIG. 4B illustrates a second portion of a detailed block diagram of an Event Storage System showing event correlation engine and dispute resolution data structure in accordance with an embodiment.
Figure 4C:
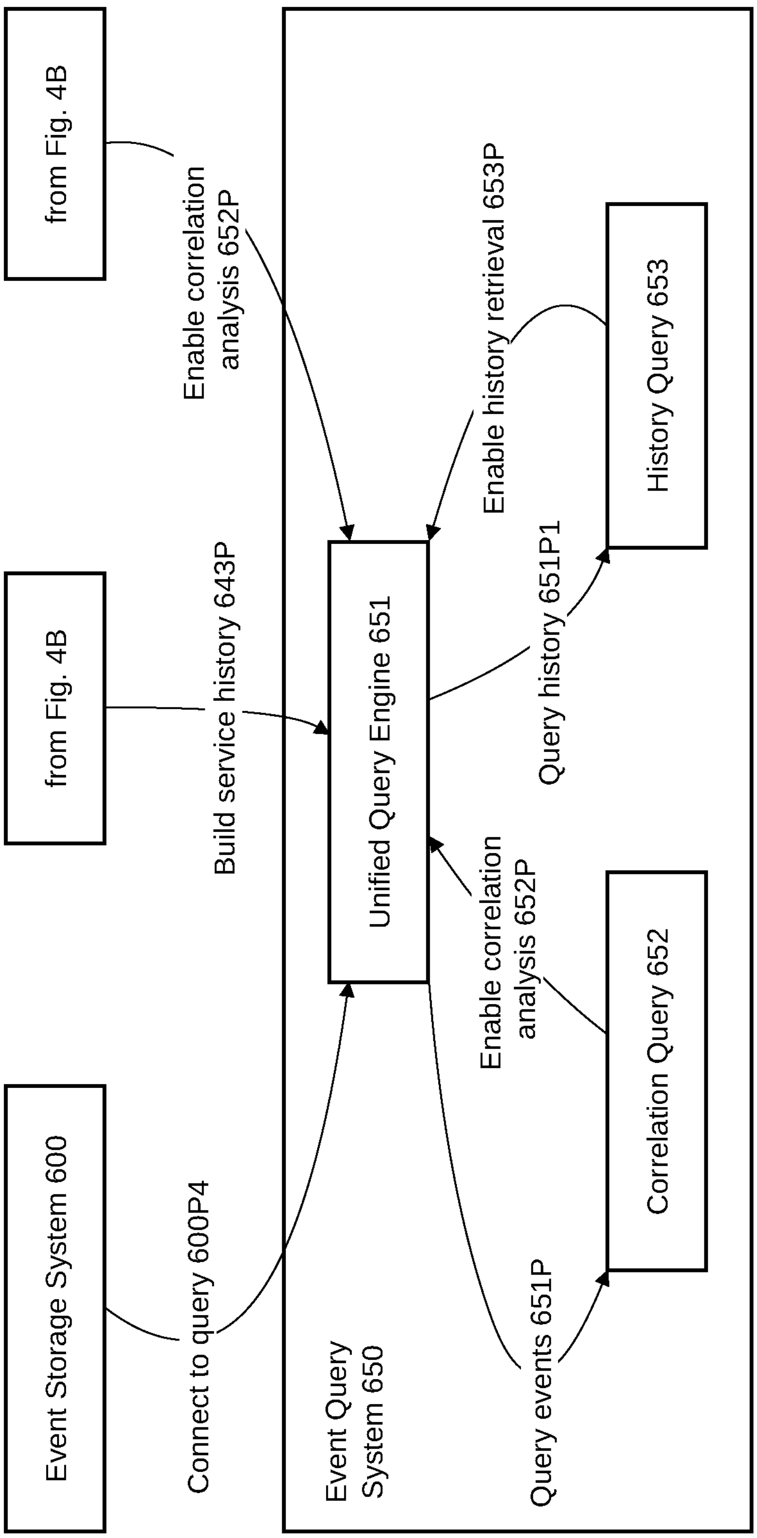
FIG. 4C illustrates a third portion of a detailed block diagram of an Event Storage System showing event query system components in accordance with an embodiment.

Referring now to FIGS. 4A-C, the Event Storage System 600 is illustrated in greater detail in accordance with an embodiment. The Event Storage System 600 may be configured to store GPS and status events in a unified structure and link to resource selection records, enabling correlation analysis, timeline reconstruction, and dispute resolution. The Event Storage System 600 may perform "Connect to unified storage 600P" operations to connect to the Unified Event Storage 610 subsystem, "Connect to data fields 600P1" operations to connect to the Event Data Fields 620 subsystem, "Connect to correlation 600P2" operations to connect to the Event Correlation Engine 630 subsystem, "Connect to dispute resolution 600P3" operations to connect to the Dispute Resolution Data Structure 640 subsystem, and "Connect to query 600P4" operations to connect to the Event Query System 650 subsystem.

The Event Storage System 600 may comprise five functional subsystems: Unified Event Storage 610, Event Data Fields 620, Event Correlation Engine 630, Dispute Resolution Data Structure 640, and Event Query System 650.

The Unified Event Storage 610 subsystem may be configured to store all event types in a single event status record structure (such as Ext_RASDigitalEventStatus record structure) linked to Dispatch records and Resource Offer records. The Unified Event Storage 610 may include an Event Status Record 611 (such as Ext_RASDigitalEventStatus Record) that serves as the unified record structure storing all event types, a Dispatch Record Link 612 that links events to Dispatch records via dispatch identifier (such as ext_DispatchNumber), a Resource Offer Link 613 that links events to dispatch offer records (such as Ext_RASDispatchOffer records) via resource offer link field (such as ext_RASDispatchOffer), and a Composite Index 614 that provides a composite index key comprising (dispatch_identifier, event_type, event_timestamp) for efficient querying and pre-notification integrity checks. The Event Status Record 611 may perform "Create dispatch link 611P1" operations to create dispatch record links, "Create resource offer link 611P2" operations to create resource offer links, and "Enable composite index 611P3" operations to enable the Composite Index 614 for efficient querying and pre-notification integrity checks. The Event Data Fields 620 may perform "Store event data 620P" operations to store comprehensive event data in the Event Status Record 611, wherein the "Store event data 620P" operations may include storing event type (such as ext_RASDigitalEventType), storing GPS data (such as ext_DigitalGPSLatitude, ext_DigitalGPSLongitude, ext_GPSLastUpdateTime), storing resource information (such as ext_ProviderName, ext_ProviderPhone), storing driver details (such as ext_DriverName, ext_DriverPhotoURL), storing vehicle information (such as ext_TowTruckId, ext_TowTruckMake, ext_TowTruckModel, ext_TowTruckYear, ext_TowTruckColor), and storing timestamps (such as ext_ProviderEventDate, ext_ProviderMessageSentDate). The Dispatch Record Link 612 may perform "Link to Dispatch 612P" operations to establish relationships between events and Dispatch records. The Resource Offer Link 613 may perform "Link to Resource Offer 613P" operations to establish relationships between events and dispatch offer records (such as Ext_RASDispatchOffer records), enabling unified querying of resource selection and GPS tracking events together.

The unified event storage system (Unified Event Storage 610) may store all event types (status changes, GPS events) together with comprehensive event data in a single event status record structure (Event Status Record 611), and may link these records to resource selection records (dispatch offer records) via indexed linking fields (Resource Offer Link 613). This unified architecture may eliminate complex join operations or application-level correlation logic, using indexed queries on dispatch identifier fields that may enable direct event lookups rather than sequential scans across multiple structures. The indexed query approach may reduce query latency compared to conventional systems, and may eliminate correlation operations that scale with the number of status events multiplied by the number of GPS events, replacing them with direct queries on a single indexed structure. The unified structure may store all timestamps in a consistent timezone during initial storage, which may eliminate timezone conversion overhead during correlation.

The event status record structure may be keyed by the Composite Index 614 which may comprise (dispatch_identifier, event_type, event_timestamp). Pre-notification integrity checks (e.g., confirming the existence of an en route status event and the absence of a prior GPS event) may be executed by index lookups on the Composite Index 614, which may eliminate full scans and multi-table joins. The Event Data Fields 620 subgraph may be configured to store comprehensive event data in structured fields. The Event Data Fields 620 may include Status Data 621 that stores event type information (ext_RASDigitalEventType), GPS Data 622 that stores GPS coordinates and timestamps (ext_DigitalGPSLatitude, ext_DigitalGPSLongitude, ext_GPSLastUpdateTime), Resource Data 623 that stores resource information (ext_ProviderName, ext_ProviderPhone), Driver Data 624 that stores driver details (ext_DriverName, ext_DriverPhotoURL), Vehicle Data 625 that stores vehicle information (ext_TowTruckId, ext_TowTruckMake, ext_TowTruckModel, ext_TowTruckYear, ext_TowTruckColor), and Timestamp Data 626 that stores event and message timestamps (ext_ProviderEventDate, ext_ProviderMessageSentDate). The Status Data 621 may perform "Provide status data 621P" operations to supply status information to correlation engines. The GPS Data 622 may perform "Provide GPS data 622P" operations to supply GPS coordinates and timestamps to correlation engines. The Timestamp Data 626 may perform "Provide timestamps 626P" operations to supply timestamps to GPS correlation and "Provide timestamps 626P1" operations to supply timestamps to status correlation.

The Event Correlation Engine 630 subsystem may be configured to correlate GPS events and status events by timestamp to build event sequences. The Event Correlation Engine 630 may include a GPS-Timestamp Correlator 631 that correlates GPS events with timestamps, a Status-Timestamp Correlator 632 that correlates status events with timestamps, and an Event Sequence Builder 633 that builds chronological event sequences from correlated data. The GPS-Timestamp Correlator 631 may perform "Correlate GPS with time 631P" operations to match GPS coordinates with timestamps for timeline reconstruction. The Status-Timestamp Correlator 632 may perform "Correlate status with time 632P" operations to match status changes with timestamps for timeline reconstruction. The Event Sequence Builder 633 may perform "Build event sequence 633P" operations to create chronological sequences of GPS and status events for dispute resolution.

The Dispute Resolution Data Structure 640 subgraph may be configured to enable timeline reconstruction, location verification, and service history building for dispute resolution. The Dispute Resolution Data Structure 640 may include a Timeline Reconstructor 641 that reconstructs complete service delivery timelines from correlated events, a Location Verifier 642 that verifies GPS locations against service locations, and a Service History Builder 643 that builds comprehensive service histories. The Timeline Reconstructor 641 may perform "Reconstruct timeline 641P" operations to build complete service delivery timelines from GPS and status events. The Location Verifier 642 may perform "Verify locations 642P" operations to validate GPS locations against claimed service locations. The Service History Builder 643 may perform "Build service history 643P" operations to create comprehensive service delivery histories for dispute resolution queries.

The Event Query System 650 subsystem may be configured to enable unified querying of correlated events and history retrieval. The Event Query System 650 may include a Unified Query Engine 651 that provides query capabilities for all event types, a Correlation Query 652 that enables correlation analysis queries, and a History Query 653 that enables history retrieval queries. The Unified Query Engine 651 may perform "Query events 651P" operations to query all event types in unified storage and "Query history 651P1" operations to retrieve complete event histories. The Correlation Query 652 may perform "Enable correlation analysis 652P" operations to support GPS-status correlation queries for dispute resolution. The History Query 653 may perform "Enable history retrieval 653P" operations to retrieve complete service delivery histories.

To implement the Event Storage System 600, one may utilize the Ext_RASDigitalEventStatus record structure that stores GPS and status event types together. The system creates Ext_RASDigitalEventStatus records for each status change and GPS event, storing event type (ext_RASDigitalEventType), GPS coordinates (ext_DigitalGPSLatitude, ext_DigitalGPSLongitude, ext_GPSLastUpdateTime), resource information (ext_ProviderName, ext_ProviderPhone), driver details (ext_DriverName, ext_DriverPhotoURL), vehicle information (ext_TowTruckId, ext_TowTruckMake, ext_TowTruckModel, ext_TowTruckYear, ext_TowTruckColor), and timestamps (ext_ProviderEventDate, ext_ProviderMessageSentDate) together in a single record linked to Dispatch records. Each Ext_RASDigitalEventStatus record links to a dispatch offer record (Ext_RASDispatchOffer) via the ext_RASDispatchOffer field, enabling querying complete service delivery history from resource selection through GPS tracking through linked data structures, enabling dispute resolution, system troubleshooting, and audit compliance.

Alternative implementations may utilize different record structures (separate tables for GPS and status), different correlation approaches (separate correlation tables), or different query mechanisms (separate query engines). The unified structure may provide superior query performance and dispute resolution capabilities compared to separated storage approaches.

The Event Storage System 600 provides technical improvements in database query performance and system scalability. The unified event storage architecture may eliminate complex join operations or application-level correlation logic, may reduce query latency for event correlation queries. The unified structure may eliminate correlation operations that scale with the number of status events multiplied by the number of GPS events, replacing them with direct queries on a single indexed structure that may perform efficiently regardless of event count. For a typical dispatch with multiple status events and GPS breadcrumbs, the claimed system may perform a single indexed query, compared to numerous comparison operations in conventional systems. The unified structure also may eliminate timezone conversion overhead during correlation by storing all timestamps in a consistent timezone during initial storage. These improvements may reduce database load for event correlation queries and may enable the system to maintain consistent query performance even for datasets with millions of events, which is not achievable with conventional multi-table architectures.

Resource Selection System

Figure 5A:
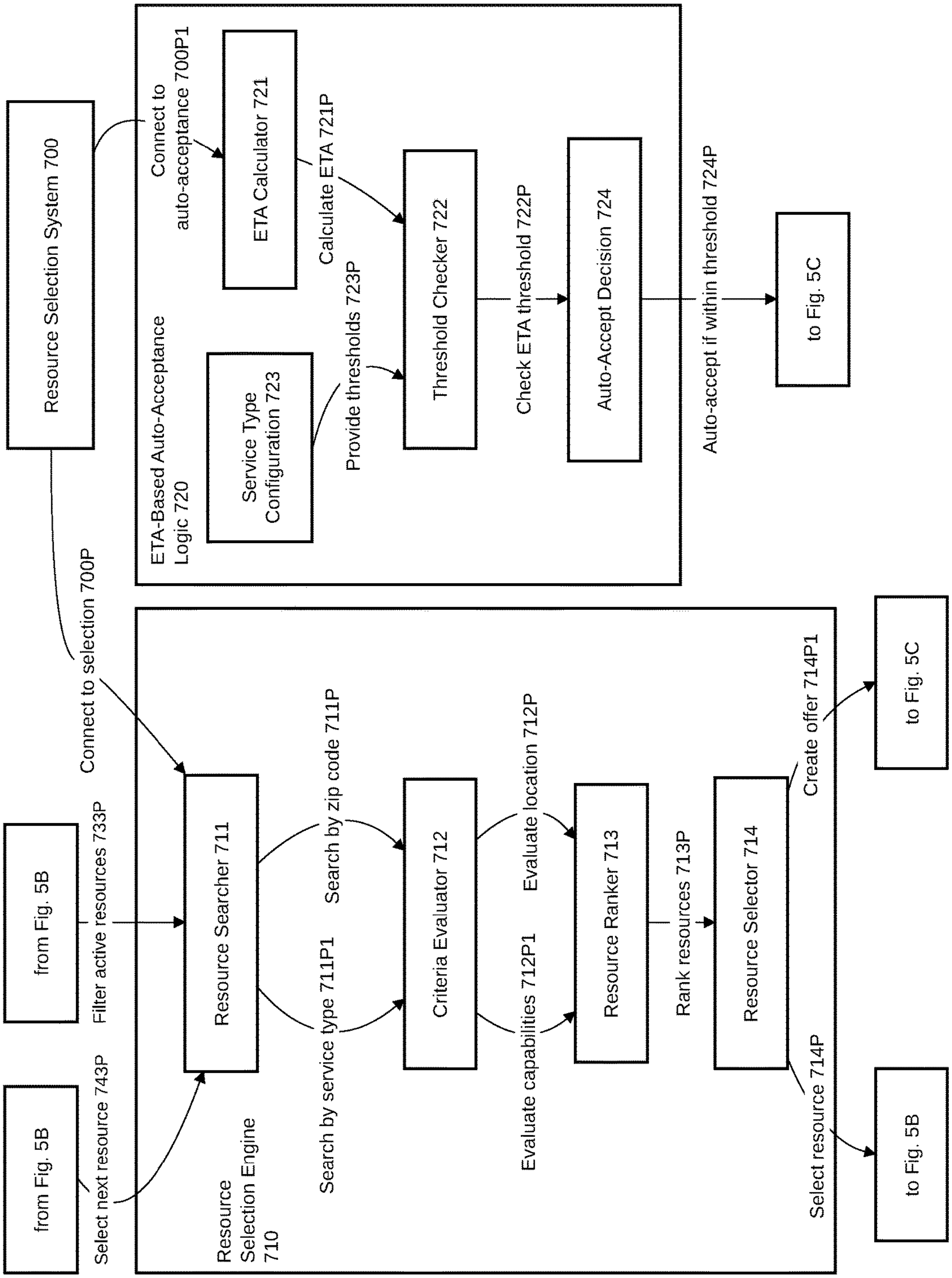
FIG. 5A illustrates a first portion of a detailed block diagram of a Resource Selection System showing resource selection engine and ETA-based auto-acceptance logic in accordance with an embodiment.
Figure 5B:
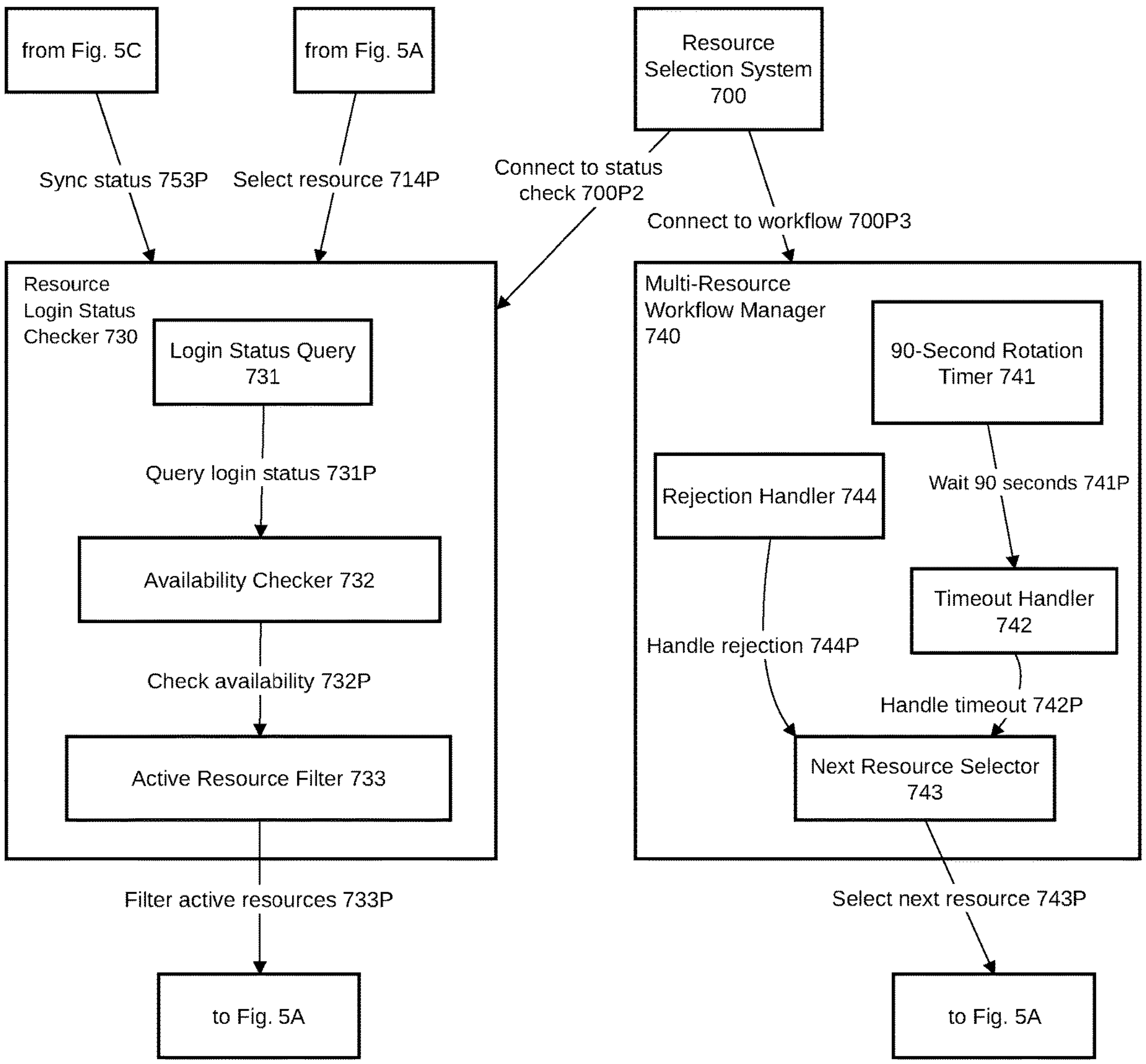
FIG. 5B illustrates a second portion of a detailed block diagram of a Resource Selection System showing resource login status checking and multi-resource workflow management in accordance with an embodiment.
Figure 5C:
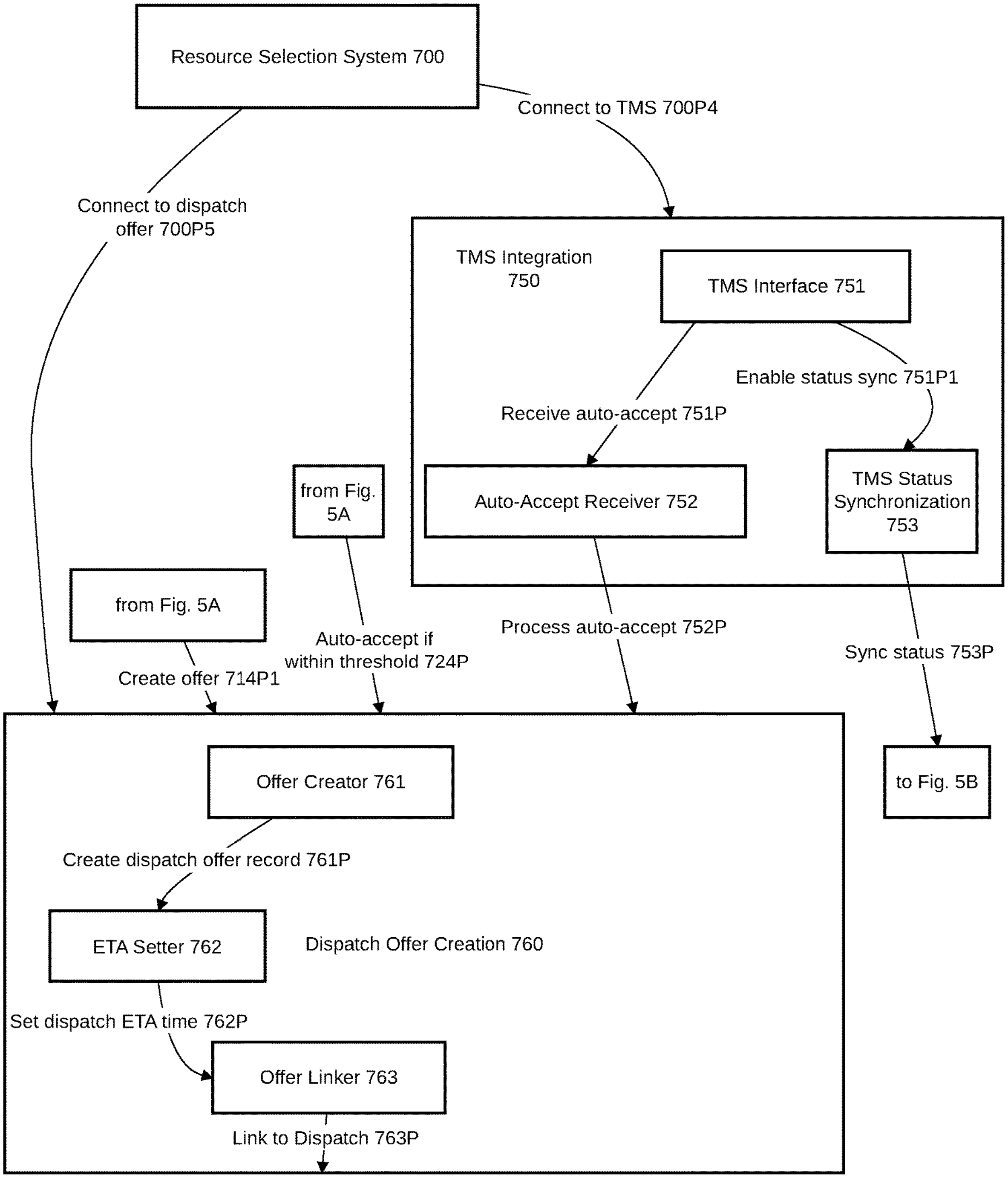
FIG. 5C illustrates a third portion of a detailed block diagram of a Resource Selection System showing resource management software integration (such as TMS integration) and dispatch offer creation components in accordance with an embodiment.

Referring now to FIGS. 5A-C, the Resource Selection System 700 is illustrated in greater detail in accordance with an embodiment. The Resource Selection System 700 may be configured to automatically select resources based on location, service type, availability, ETA criteria, and login status, with support for multi-resource workflows and resource management software integration (such as TMS integration). The Resource Selection System 700 may perform "Connect to selection 700P" operations to connect to the Resource Selection Engine 710 subsystem, "Connect to auto-acceptance 700P1" operations to connect to the ETA-Based Auto-Acceptance Logic 720 subsystem, "Connect to status check 700P2" operations to connect to the Resource Login Status Checker 730 subsystem, "Connect to workflow 700P3" operations to connect to the Multi-Resource Workflow Manager 740 subsystem, "Connect to TMS 700P4" operations to connect to the resource management software integration 750 (such as TMS Integration) subsystem, and "Connect to dispatch offer 700P5" operations to connect to the Dispatch Offer Creation 760 subsystem.

The Resource Selection System 700 may comprise six functional subsystems: Resource Selection Engine 710, ETA-Based Auto-Acceptance Logic 720, Resource Login Status Checker 730, Multi-Resource Workflow Manager 740, resource management software integration 750 (such as TMS Integration), and Dispatch Offer Creation 760.

The Resource Selection Engine 710 subsystem may be configured to search, evaluate, rank, and select resources based on multiple criteria. The Resource Selection Engine 710 may include a Resource Searcher 711 that searches resources by zip code and service type, a Criteria Evaluator 712 that evaluates location proximity and service capabilities, a Resource Ranker 713 that ranks resources based on evaluation criteria, and a Resource Selector 714 that selects the highest-ranked resource. The Resource Searcher 711 may perform "Search by zip code 711P" operations to identify resources in the service area and "Search by service type 711P1" operations to filter resources by required service capabilities. The Criteria Evaluator 712 may perform "Evaluate location 712P" operations to assess location proximity and "Evaluate capabilities 712P1" operations to assess service capabilities. The Resource Ranker 713 may perform "Rank resources 713P" operations to rank resources based on location, capabilities, and other criteria. The Resource Selector 714 may perform "Select resource 714P" operations to select the highest-ranked resource and "Create offer 714P1" operations to create dispatch offers for selected resources.

The ETA-Based Auto-Acceptance Logic 720 subsystem may be configured to automatically accept dispatch offers when ETA is within service-specific thresholds. The ETA-Based Auto-Acceptance Logic 720 may include an ETA Calculator 721 that calculates estimated time of arrival, a Threshold Checker 722 that compares ETA against service-specific thresholds, a Service Type Configuration 723 that provides ETA thresholds for different service types (e.g., 30 minutes for towing), and an Auto-Accept Decision 724 that automatically accepts offers when ETA is within threshold. The ETA Calculator 721 may perform "Calculate ETA 721P" operations to compute estimated arrival time based on resource location and service location. The Service Type Configuration 723 may perform "Provide thresholds 723P" operations to supply service-specific ETA thresholds. The Threshold Checker 722 may perform "Check ETA threshold 722P" operations to compare calculated ETA against service-specific thresholds. The Auto-Accept Decision 724 may perform "Auto-accept if within threshold 724P" operations to automatically accept dispatch offers when ETA meets threshold criteria.

The Resource Login Status Checker 730 subgraph may be configured to filter resources based on login status and availability. The Resource Login Status Checker 730 may include a Login Status Query 731 that queries resource login status, an Availability Checker 732 that checks resource availability, and an Active Resource Filter 733 that filters to only active/logged-in resources. The Login Status Query 731 may perform "Query login status 731P" operations to query resource login status from provider management systems. The Availability Checker 732 may perform "Check availability 732P" operations to check resource availability status. The Active Resource Filter 733 may perform "Filter active resources 733P" operations to ensure only active/logged-in resources are considered for selection.

The Multi-Resource Workflow Manager 740 subsystem may be configured to manage 90-second rotation sequences and handle rejections and timeouts. The Multi-Resource Workflow Manager 740 may include a 90-Second Rotation Timer 741 that waits 90 seconds for resource response, a Timeout Handler 742 that processes timeout scenarios, a Next Resource Selector 743 that selects the next resource in rotation, and a Rejection Handler 744 that processes resource rejections. The 90-Second Rotation Timer 741 may perform "Wait 90 seconds 741P" operations to provide rapid resource selection with 90-second response windows. The Timeout Handler 742 may perform "Handle timeout 742P" operations to process timeout scenarios and trigger next resource selection. The Rejection Handler 744 may perform "Handle rejection 744P" operations to process resource rejections and trigger next resource selection. The Next Resource Selector 743 may perform "Select next resource 743P" operations to select the next resource in rotation when timeout or rejection occurs.

The resource management software integration 750 (such as TMS Integration) subsystem may be configured to integrate with provider management systems (such as resource Tow Management Software) for two-way automation. The resource management software integration 750 may include a provider management system interface 751 (such as TMS Interface) that receives auto-accept responses from provider management systems (such as provider TMS systems), an Auto-Accept Receiver 752 that processes auto-accept responses from provider management systems, and a status synchronization 753 (such as TMS Status Synchronization) that synchronizes status between systems. The provider management system interface 751 may perform "Receive auto-accept 751P" operations to receive auto-accept responses from provider management systems (such as provider TMS) and "Enable status sync 751P1" operations to enable status synchronization between systems. The Auto-Accept Receiver 752 may perform "Process auto-accept 752P" operations to process auto-accept responses from provider management systems. The status synchronization 753 may perform "Sync status 753P" operations to synchronize status between the emergency roadside service dispatch system and provider management systems (such as provider TMS).

The Dispatch Offer Creation 760 subsystem may be configured to create dispatch offer records (such as Ext_RASDispatchOffer records) with ETA information that link resource selection to GPS tracking. The Dispatch Offer Creation 760 may include an Offer Creator 761 that creates dispatch offer records, an ETA Setter 762 that sets dispatch ETA time (such as ext_DispatchETATime) in offer records, and an Offer Linker 763 that links offers to Dispatch records. The Offer Creator 761 may perform "Create dispatch offer record 761P" operations to instantiate new dispatch offer records. The ETA Setter 762 may perform "Set dispatch ETA time 762P" operations to store initial ETA used in resource selection for later validation. The Offer Linker 763 may perform "Link to Dispatch 763P" operations to establish relationships between dispatch offers and Dispatch records.

To implement the Resource Selection System 700, one may utilize resource selection logic that searches resources by zip code and service type, evaluates location and capabilities, ranks resources, filters to active/logged-in resources, implements 90-second rotation sequences, handles rejections and timeouts, integrates with provider management systems (such as TMS) for auto-acceptance, and creates dispatch offer records (such as Ext_RASDispatchOffer records) with dispatch ETA time (such as ext_DispatchETATime) for ETA validation. The system uses service-specific ETA thresholds (e.g., 30 minutes for towing) for auto-acceptance logic and implements distributed work queues for asynchronous processing of high-volume resource selection requests.

Alternative implementations may utilize different resource selection algorithms, different ETA calculation methods, different rotation timing (e.g., 60 seconds or 120 seconds), or different resource management software integration approaches (such as different TMS integration approaches). These alternatives may achieve comparable functionality for resource selection and dispatch offer creation.

The Resource Selection System 700 may provide technical improvements in resource selection efficiency and ETA validation accuracy. The ETA validation feedback loop may enable continuous improvement in resource selection algorithms based on actual GPS-tracked performance data, which may improve resource selection accuracy over time compared to static selection algorithms in conventional systems. The indexed linking structure between dispatch offer records and event status records may enable direct navigation from resource selection events to GPS events, and may reduce query time for complete service delivery history compared to conventional systems. The unified storage structure that links resource selection to GPS tracking may eliminate the need for separate queries and application-level correlation, and may reduce database load for service delivery history queries. These improvements may enable real-time validation of resource selection decisions using actual GPS-tracked arrival data, which is not achievable with conventional systems that store resource selection and GPS tracking in separate, unlinked tables.

Integration Layer

Figure 6A:
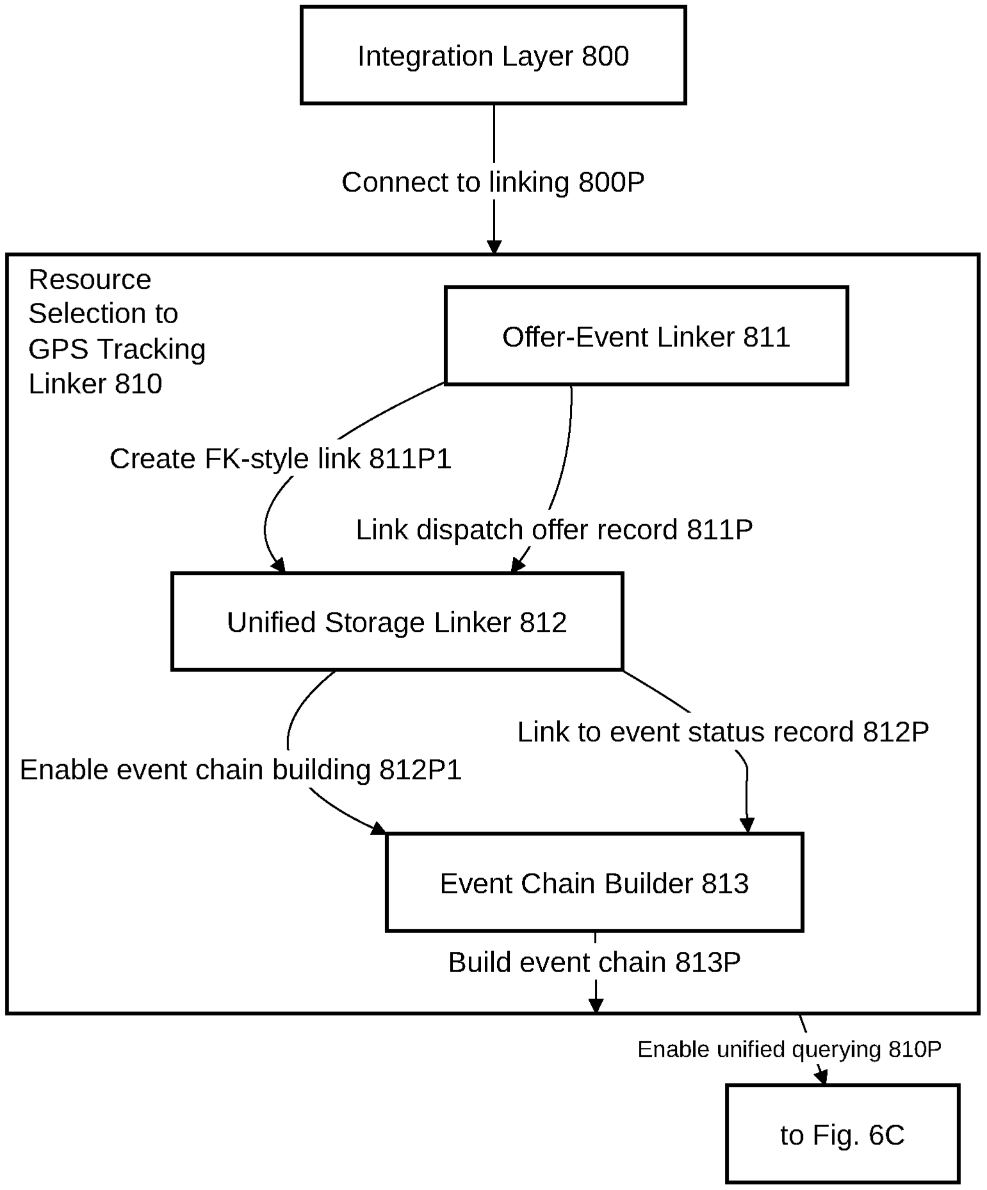
FIG. 6A illustrates a first portion of a detailed block diagram of an Integration Layer showing resource selection to GPS tracking linking components in accordance with an embodiment.
Figure 6B:
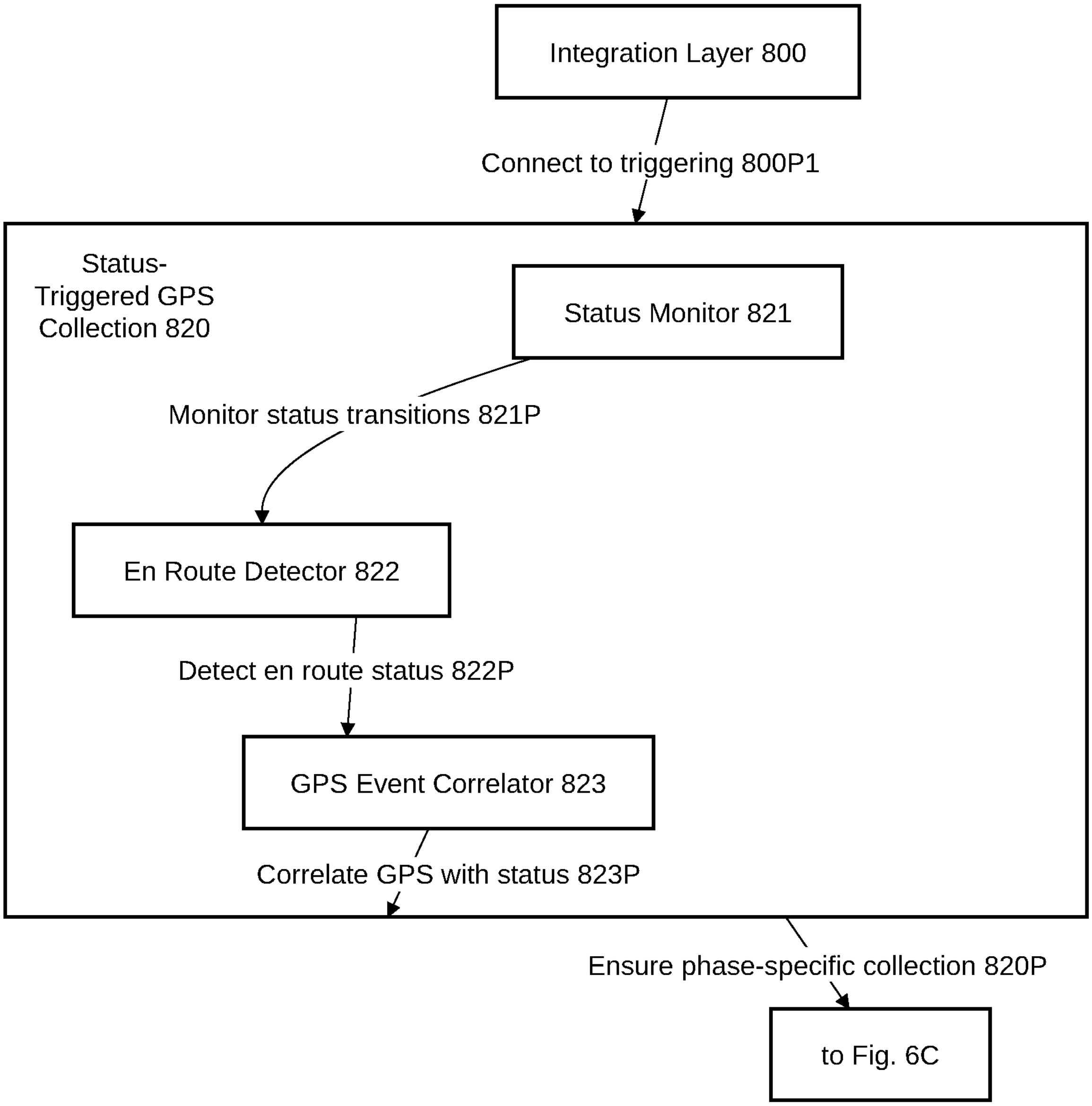
FIG. 6B illustrates a second portion of a detailed block diagram of an Integration Layer showing status-triggered GPS collection components in accordance with an embodiment.
Figure 6C:
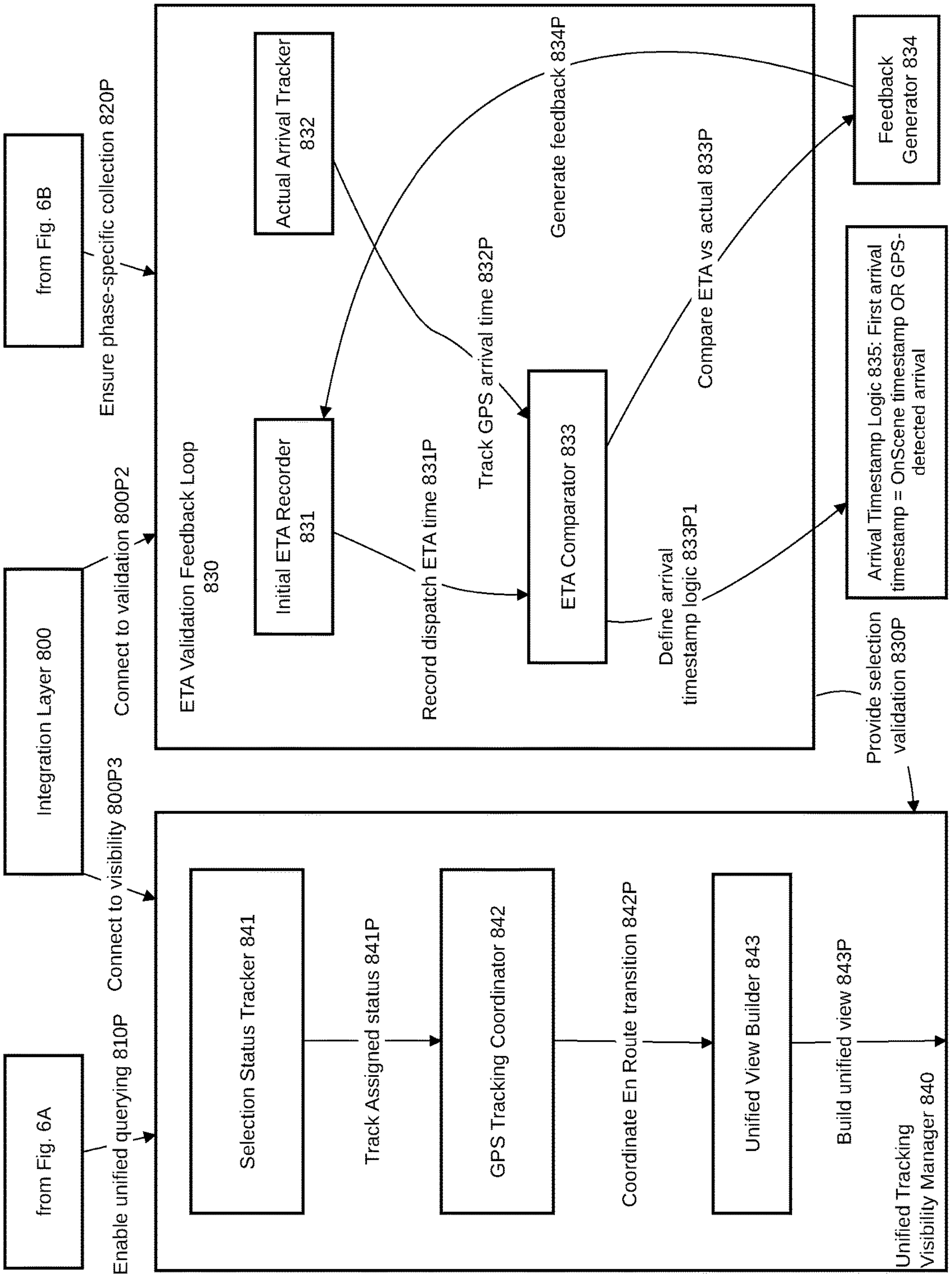
FIG. 6C illustrates a third portion of a detailed block diagram of an Integration Layer showing ETA validation feedback loop and unified tracking visibility management components in accordance with an embodiment.
Figure 7A:
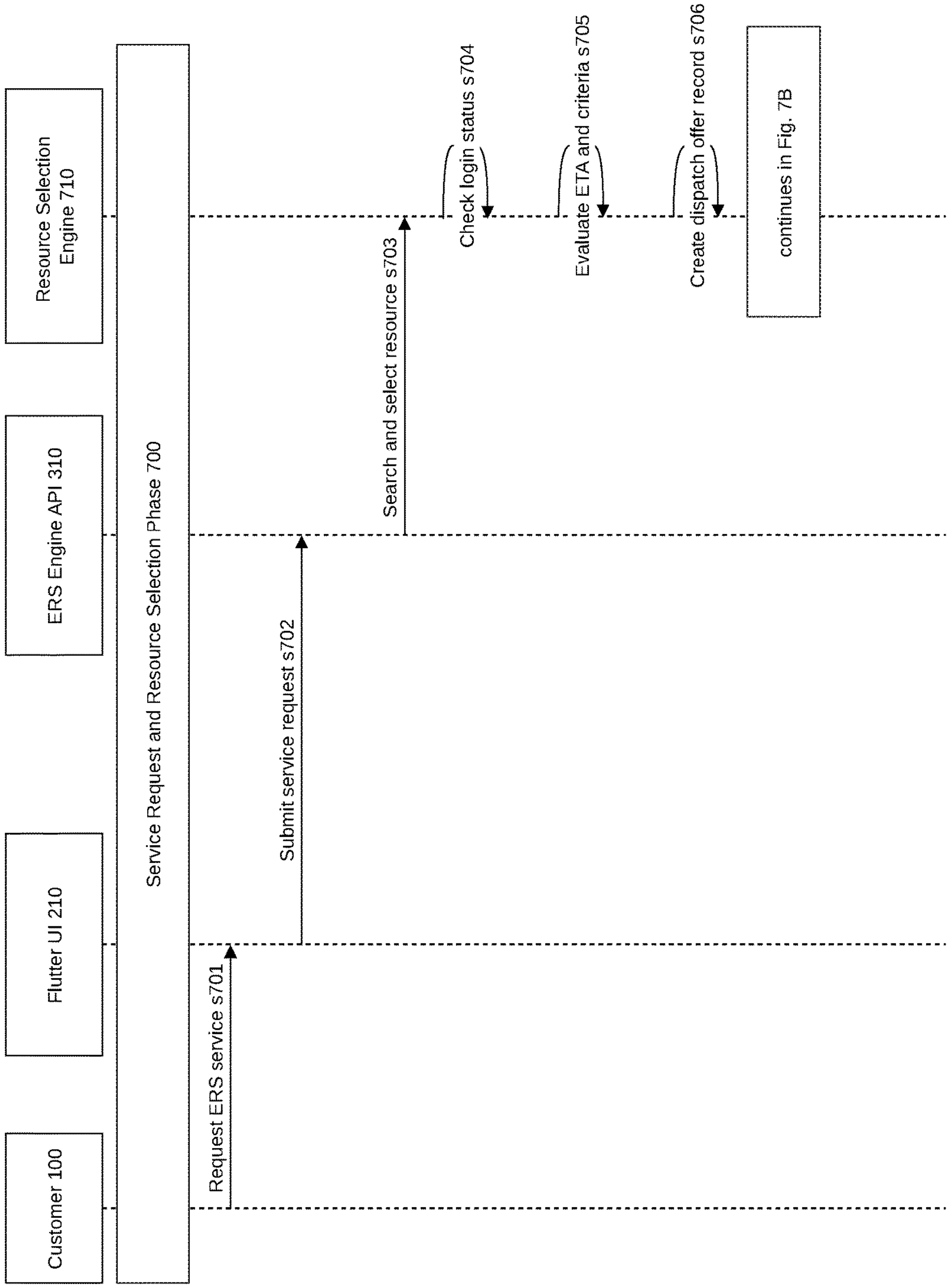
FIG. 7A illustrates a first portion of a sequence diagram showing the service request and resource selection phase of the service delivery workflow in accordance with an embodiment.
Figure 7B:
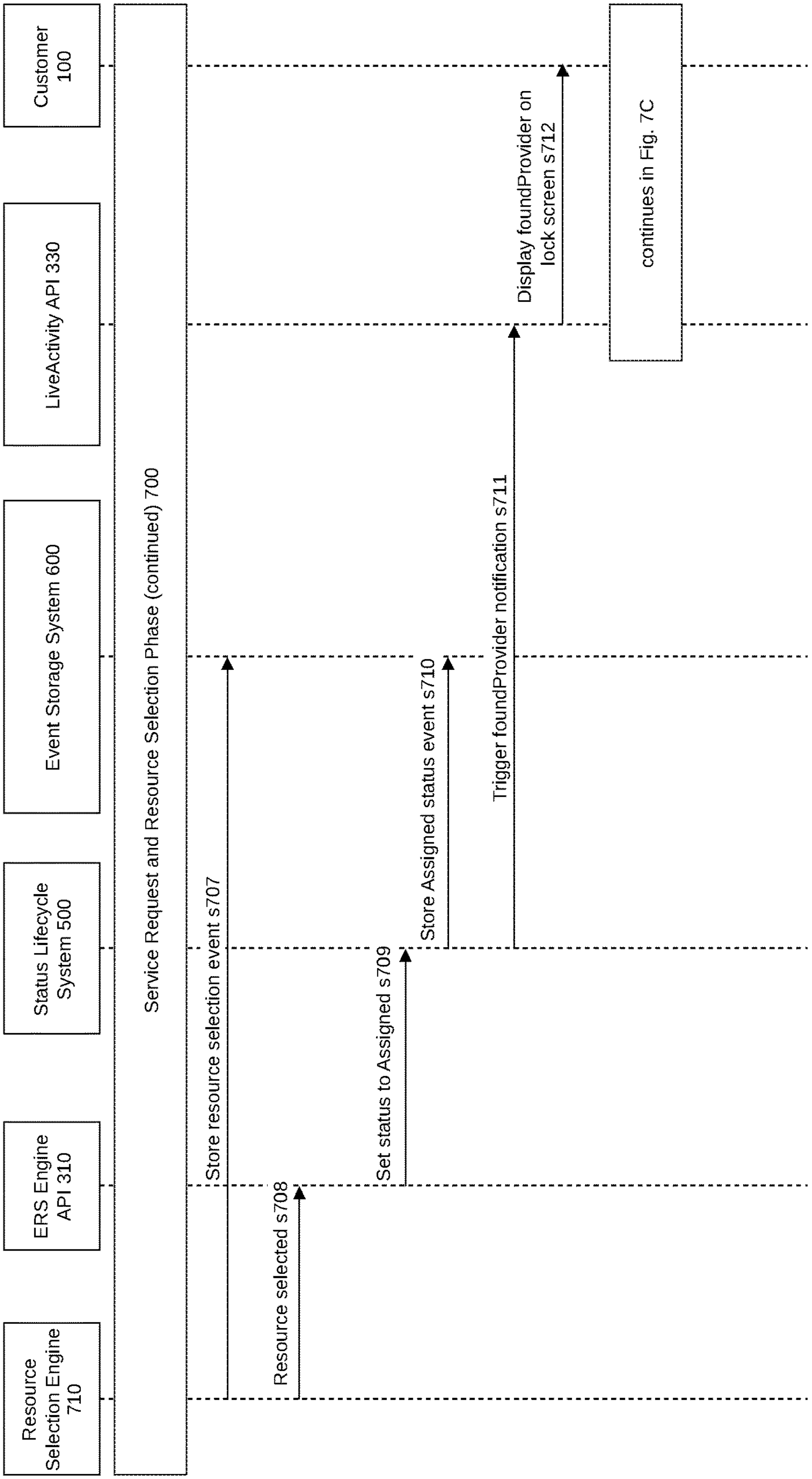
FIG. 7B illustrates a second portion of a sequence diagram showing resource selection completion and assigned status notification of the service delivery workflow in accordance with an embodiment.
Figure 7C:
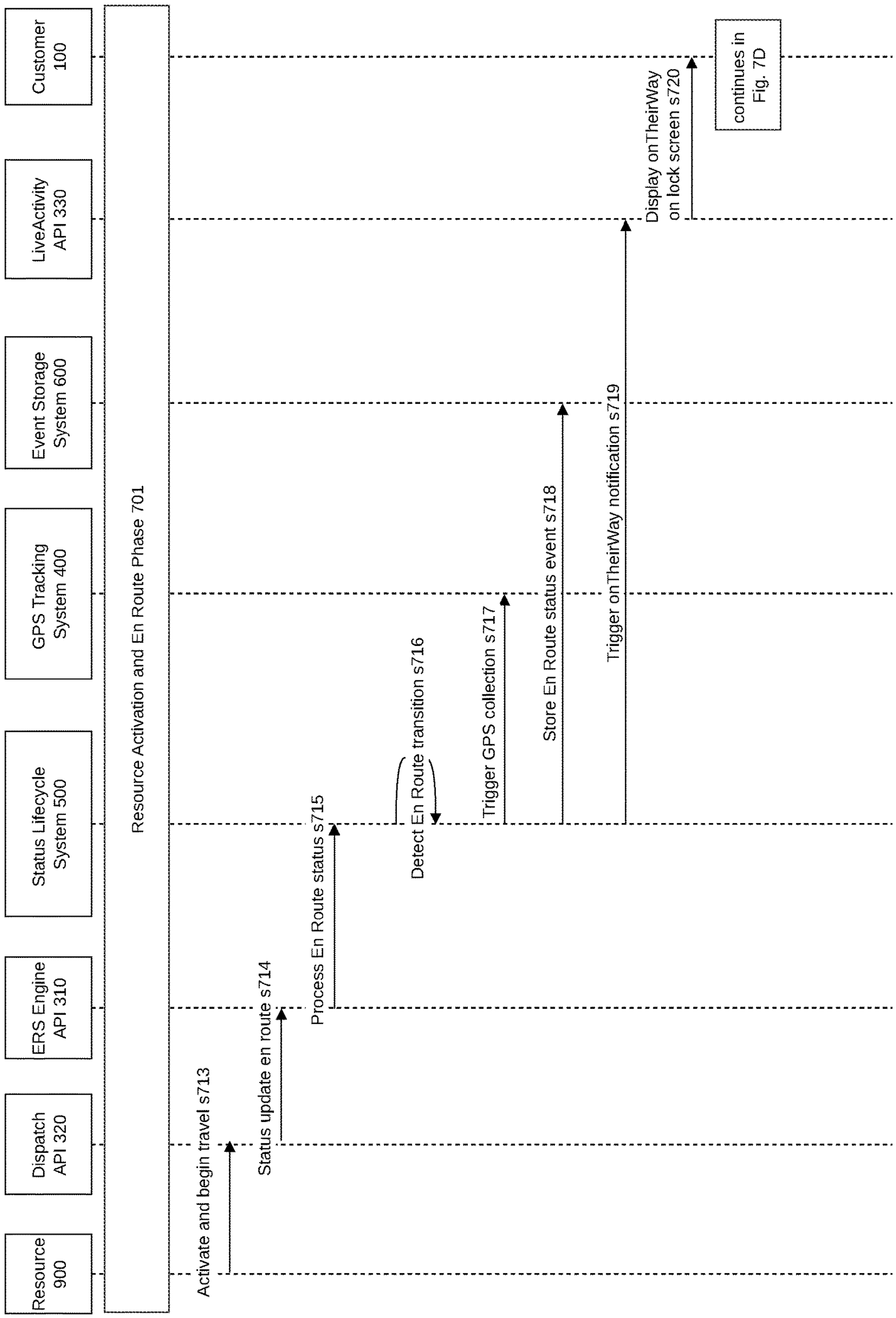
FIG. 7C illustrates a third portion of a sequence diagram showing resource activation and en route phase of the service delivery workflow in accordance with an embodiment.
Figure 7D:
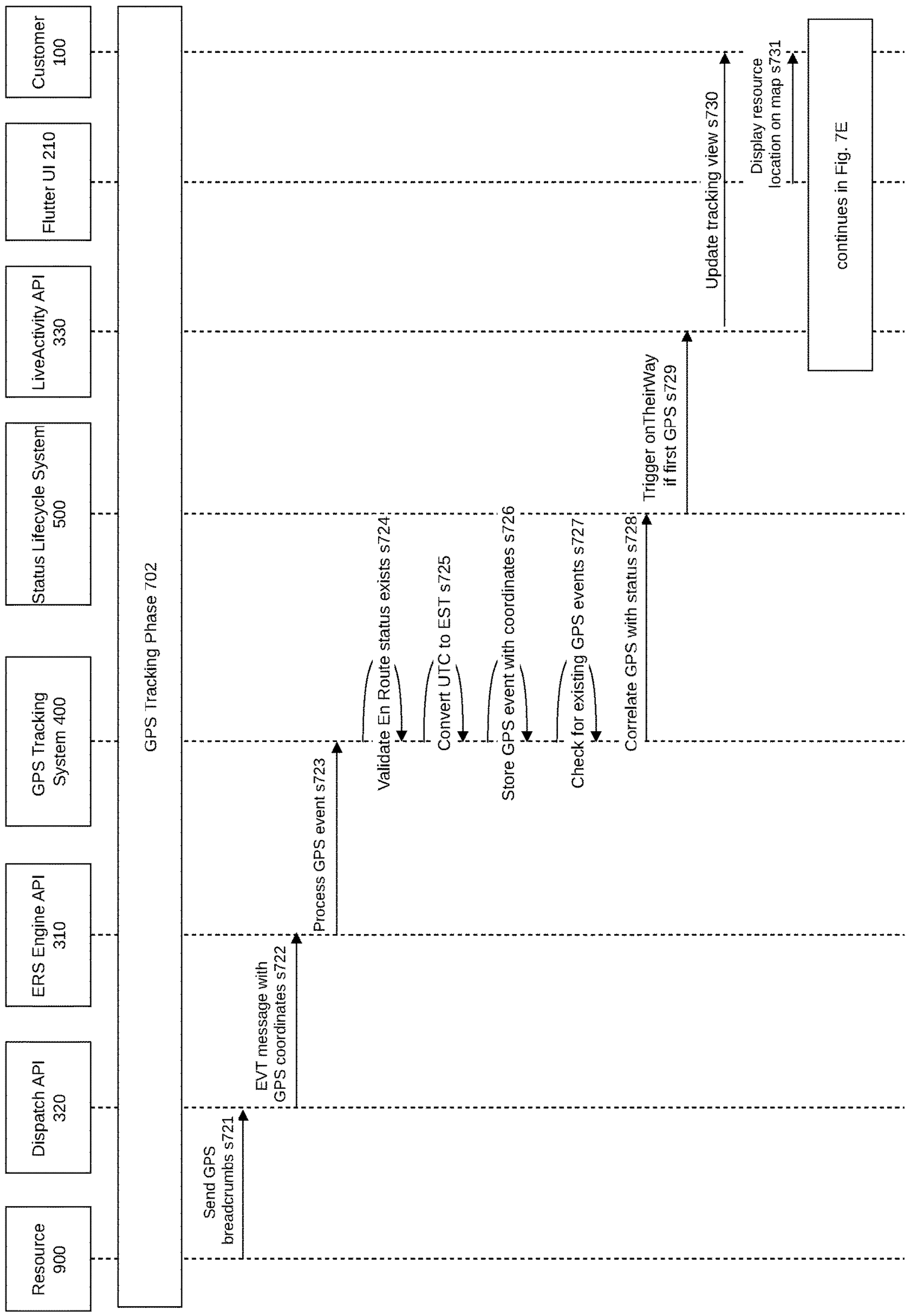
FIG. 7D illustrates a fourth portion of a sequence diagram showing GPS tracking phase of the service delivery workflow in accordance with an embodiment.
Figure 7E:
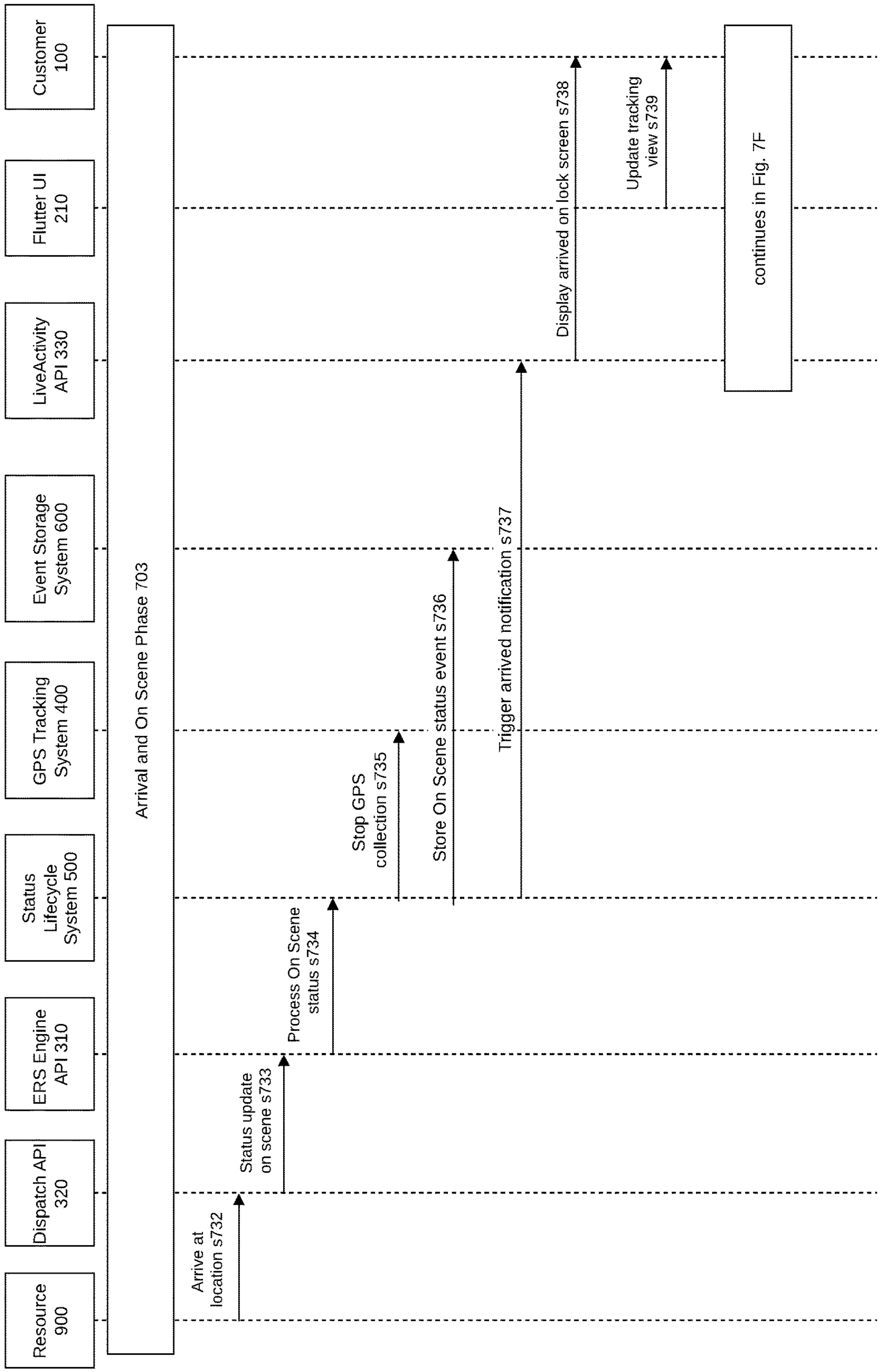
FIG. 7E illustrates a fifth portion of a sequence diagram showing arrival and on scene phase of the service delivery workflow in accordance with an embodiment.
Figure 7F:
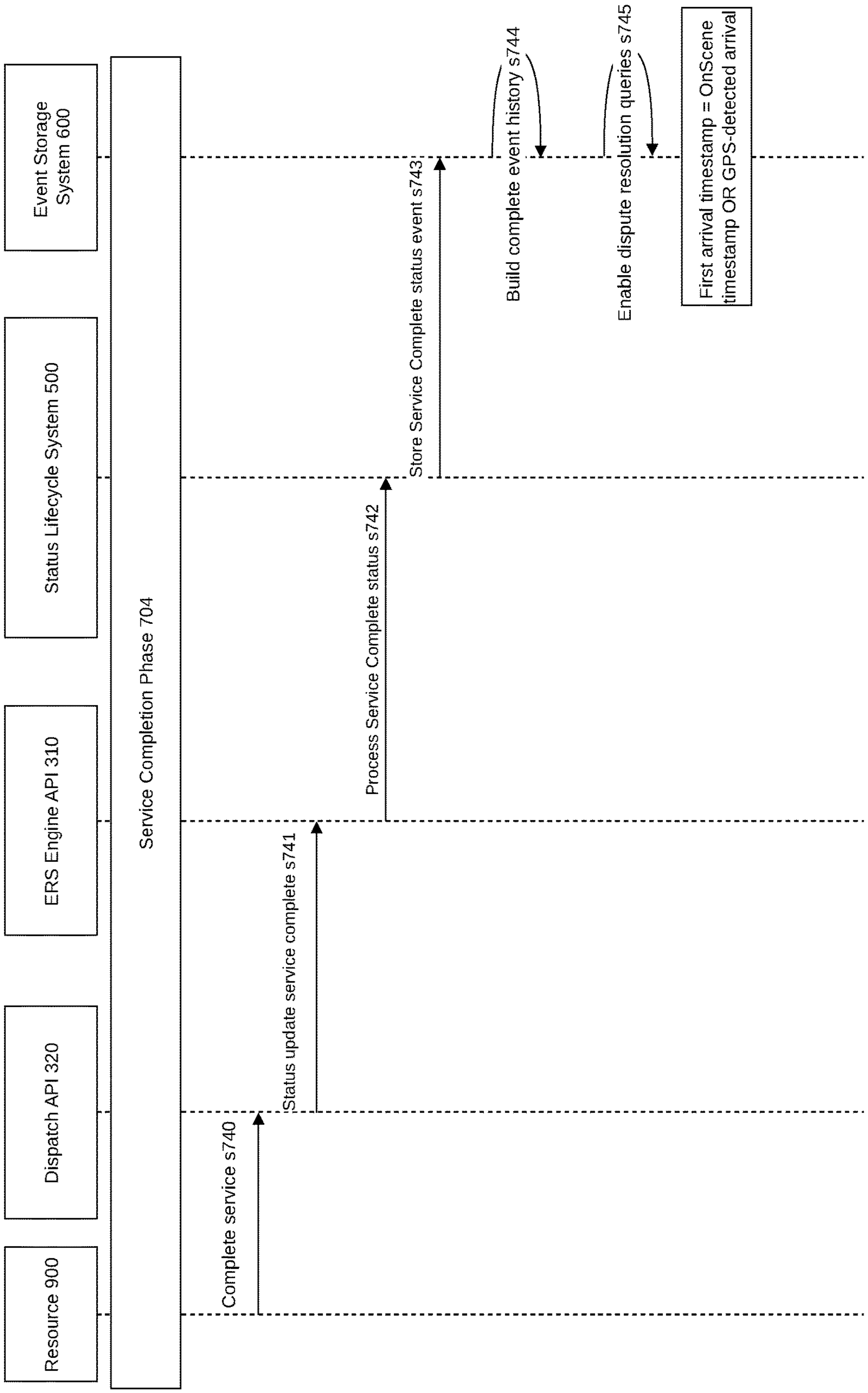
FIG. 7F illustrates a sixth portion of a sequence diagram showing service completion phase of the service delivery workflow in accordance with an embodiment.

Referring now to FIGS. 6A-C, the Integration Layer 800 is illustrated in greater detail in accordance with an embodiment. The Integration Layer 800 may be configured to link resource selection events with GPS tracking events, coordinate status transitions with GPS collection, validate ETA accuracy, and provide unified tracking visibility. The Integration Layer 800 may perform "Connect to linking 800P" operations to connect to the Resource Selection to GPS Tracking Linker 810 subsystem, "Connect to triggering 800P1" operations to connect to the Status-Triggered GPS Collection 820 subsystem, "Connect to validation 800P2" operations to connect to the ETA Validation Feedback Loop 830 subsystem, and "Connect to visibility 800P3" operations to connect to the Unified Tracking Visibility Manager 840 subsystem.

The Integration Layer 800 may comprise four functional subsystems: Resource Selection to GPS Tracking Linker 810, Status-Triggered GPS Collection 820, ETA Validation Feedback Loop 830, and Unified Tracking Visibility Manager 840.

The Resource Selection to GPS Tracking Linker 810 subsystem may be configured to link dispatch offer records (such as Ext_RASDispatchOffer records, created during resource selection) to event status records (such as Ext_RASDigitalEventStatus records, created during GPS tracking) in unified storage. The Resource Selection to GPS Tracking Linker 810 may include an Offer-Event Linker 811 that links dispatch offer records to event status records, a Unified Storage Linker 812 that enables querying both resource selection and GPS events together, and an Event Chain Builder 813 that creates complete event chains from resource selection through GPS tracking. The Offer-Event Linker 811 may perform "Link dispatch offer record 811P" operations to establish links between resource selection offers and event records and "Create FK-style link 811P1" operations to create foreign-key style associations between dispatch offer records and event status records. The Unified Storage Linker 812 may perform "Link to event status record 812P" operations to create unified storage relationships and "Enable event chain building 812P1" operations to enable the Event Chain Builder 813 to construct complete event chains. The Event Chain Builder 813 may perform "Build event chain 813P" operations to construct complete event chains spanning from resource selection through GPS tracking to service completion.

The Resource Selection to GPS Tracking Linker 810 may link dispatch offer records (created during resource selection) to event status records (created during GPS tracking) using indexed linking structures (Offer-Event Linker 811, Unified Storage Linker 812), which may enable O(1) navigation from resource selection events to GPS events via indexed links, compared to O(n) sequential scans in conventional systems. This unified linking may enable single-query retrieval of complete service delivery history compared to conventional systems requiring separate queries and application-level correlation, and may reduce database load for dispute resolution queries.

The Status-Triggered GPS Collection 820 subsystem may be configured to correlate GPS events received in structured GPS data messages (such as EVT messages) with status transition events through the unified event storage structure. The Status-Triggered GPS Collection 820 may include a Status Monitor 821 that processes status transitions from structured GPS data messages (such as EVT messages), an en route Detector 822 that identifies when en route status (such as TC_ENROUTE status) is received in structured GPS data messages (such as EVT messages), and a GPS Event Correlator 823 that correlates GPS events with en route status events through the unified event storage structure. The Status Monitor 821 may perform "Process status transitions 821P" operations to process status changes from structured GPS data messages (such as EVT messages). The en route Detector 822 may perform "Detect en route status 822P" operations to identify en route status transitions from StatusType field in structured GPS data messages (such as EVT messages). The GPS Event Correlator 823 may perform "Correlate GPS with status 823P" operations to correlate GPS events received in structured GPS data messages (such as EVT messages) with en route status events through the unified event storage structure, ensuring GPS events are correlated after resource selection and activation.

The linkage between a dispatch offer record and each event status record may be enforced in storage as a foreign-key style association, which may ensure referential integrity so that each event status record references the correct originating offer. The Status-Triggered GPS Collection 820 (Status Monitor 821, en route Detector 822, GPS Event Correlator 823) may correlate GPS events received in structured GPS data messages with status lifecycle transitions (en route status) through the unified event storage structure, using event-driven architecture with O(1) status detection that may enable rapid GPS event correlation upon status transition, compared to substantial delays in polling-based systems. This event-driven correlation may eliminate polling mechanisms, may reduce CPU usage compared to polling-based systems, and may ensure GPS tracking only occurs during the en route to on scene phase, which may reduce unnecessary GPS data collection.

The ETA Validation Feedback Loop 830 subsystem may be configured to compare initial ETA (from resource selection) with actual GPS-tracked arrival time to validate resource selection decisions. The ETA Validation Feedback Loop 830 may include an Initial ETA Recorder 831 that stores ext_DispatchETATime from resource selection, an Actual Arrival Tracker 832 that records GPS-tracked arrival time, an ETA Comparator 833 that compares initial ETA with actual arrival time, a Feedback Generator 834 that generates feedback for improving future resource selection accuracy, and an Arrival Timestamp Logic 835 that defines the logic for determining the first arrival timestamp (using on scene status timestamp or GPS-detected arrival timestamp). The Initial ETA Recorder 831 may perform "Record dispatch ETA time 831P" operations to store initial ETA used in resource selection. The Actual Arrival Tracker 832 may perform "Track GPS arrival time 832P" operations to record actual GPS-tracked arrival time. The ETA Comparator 833 may perform "Compare ETA vs actual 833P" operations to compare initial ETA with actual GPS-tracked arrival time and "Define arrival timestamp logic 833P1" operations to define the logic for determining the first arrival timestamp (using on scene status timestamp or GPS-detected arrival timestamp) in the Arrival Timestamp Logic 835. The Feedback Generator 834 may perform "Generate feedback 834P" operations to create feedback data that flows back to the Initial ETA Recorder 831 to improve future resource selection accuracy and ETA recording. The Arrival Timestamp Logic 835 may be configured to define that the first arrival timestamp equals the on scene status timestamp if an on scene status event exists, or equals the GPS-detected arrival timestamp if no on scene status event exists.

For ETA validation, the system may select a first arrival timestamp as follows: (i) if an on scene status event exists for the dispatch, its timestamp may be used; otherwise (ii) the system may derive a GPS-detected arrival timestamp using the status—GPS correlation logic and geofence/dwell thresholds defined for the service. The ETA Validation Feedback Loop 830 (Initial ETA Recorder 831, Actual Arrival Tracker 832, ETA Comparator 833, Feedback Generator 834) may compare initial ETA (stored as dispatch ETA time during resource selection) with actual GPS-tracked arrival time, using indexed queries on dispatch identifier fields that may perform O(1) lookups enabling rapid ETA comparison. This feedback mechanism may calculate ETA accuracy metrics and may enable continuous improvement in resource selection algorithms based on actual GPS-tracked performance data, which may improve resource selection accuracy over time compared to static selection algorithms in conventional systems.

The Unified Tracking Visibility Manager 840 subsystem may be configured to coordinate resource selection status with GPS tracking for unified customer view. The Unified Tracking Visibility Manager 840 may include a Selection Status Tracker 841 that monitors Assigned status from resource selection, a GPS Tracking Coordinator 842 that coordinates en route transition with GPS collection, and a Unified View Builder 843 that creates seamless tracking view from resource selection through completion. The Selection Status Tracker 841 may perform "Track Assigned status 841P" operations to monitor resource selection status. The GPS Tracking Coordinator 842 may perform "Coordinate en route transition 842P" operations to coordinate status transitions with GPS collection. The Unified View Builder 843 may perform "Build unified view 843P" operations to create seamless tracking visibility that spans from the moment a resource is automatically selected through service completion.

To implement the Integration Layer 800, one may utilize the unified event storage structure that links dispatch offer records (such as Ext_RASDispatchOffer records, created during resource selection) to event status records (such as Ext_RASDigitalEventStatus records, created during GPS tracking). The system processes status transitions from structured GPS data messages (such as EVT messages) and correlates GPS events received in structured GPS data messages (such as EVT messages) with en route status events through the unified event storage structure, compares initial ETA (such as ext_DispatchETATime) with actual GPS-tracked arrival time for validation, and coordinates resource selection status with GPS tracking to provide unified tracking visibility spanning from resource selection through completion.

Alternative implementations may utilize different linking approaches (separate linking tables), different triggering mechanisms (direct resource selection triggers), or different validation methods (separate validation systems). The integrated approach may provide superior tracking visibility and validation capabilities compared to separated approaches.

The Integration Layer 800 provides significant technical improvements in system integration and query performance. The unified event storage linking resource selection to GPS tracking may enable single-query retrieval of complete service delivery history (resource selection through GPS tracking to service completion), representing a reduction in query time compared to conventional systems requiring multiple queries and application-level correlation. The status-GPS correlation uses event-driven architecture with direct status detection from structured GPS data messages (such as EVT messages) that may enable rapid GPS event correlation upon status transition, compared to delays in polling-based systems, may reduce CPU usage compared to polling-based GPS collection systems. The unified linking structure may eliminate complex join operations across resource selection and GPS tracking schemas, may reduce database load for dispute resolution queries. The integrated workflow may reduce system complexity by eliminating application-level correlation logic that adds processing overhead per dispatch in conventional systems. These improvements may enable real-time unified tracking visibility spanning from resource selection through completion, which is not achievable with conventional systems that store resource selection and GPS tracking in separate, unlinked tables requiring complex correlation logic.

Service Delivery Sequence

Referring now to FIGS. 7A-F, a sequence diagram illustrating the complete service delivery workflow is shown in accordance with an embodiment. FIGS. 7A-F show the temporal flow of operations from service request through resource selection, GPS tracking, status transitions, and service completion. The sequence diagrams include a Customer 100 that requests emergency roadside services, a Resource 900 (such as service provider) that performs service delivery, and phase indicators (Service Request and Resource Selection Phase 700, Resource Activation and En Route Phase 701, GPS Tracking Phase 702, Arrival and On Scene Phase 703, and Service Completion Phase 704) that identify distinct phases of the service delivery workflow.

At s701, the service delivery sequence begins with a Customer 100 requesting emergency roadside service (such as ERS service) through the Flutter UI 210. At s702, the Flutter UI 210 submits the service request to the emergency roadside service dispatch system Engine API 310 (such as ERS Engine API), which coordinates resource selection through the Resource Selection Engine 710, at s703. At s704-s706, the Resource Selection Engine 710 performs internal operations. Specifically, the internal operations include checking login status at s704, evaluating ETA and criteria at s705, and creating Ext_RASDispatchOffer records at s706. At s707, the Resource Selection Engine 710 stores resource selection events in the Event Storage System 600 and notifies the emergency roadside service dispatch system Engine API 310 that a resource has been selected at s708.

At s709, the emergency roadside service dispatch system Engine API 310 sets status to Assigned through the Status Lifecycle System 500. At s710, the Status Lifecycle System 500 stores Assigned status events in the Event Storage System 600 and triggers foundProvider mobile operating system notification framework notifications (such as LiveActivity notifications) through the mobile operating system notification framework API 330 (such as LiveActivity API) at s711. At s712, the mobile operating system notification framework API 330 displays foundProvider notifications on customer device lock screens, providing mobile-native status updates without requiring app interaction.

When the Resource activates and begins travel, the Resource sends status updates to the dispatch API integration system 320, at s713 (such as Dispatch API), which forwards status updates (such as TC_ENROUTE status updates) to the emergency roadside service dispatch system Engine API 310, at s714. At s715, the emergency roadside service dispatch system Engine API 310 processes en route status through the Status Lifecycle System 500, which detects the en route transition, at s716, and triggers GPS collection in the GPS Tracking System 400, at s717. At s718, the Status Lifecycle System 500 stores en route status events in the Event Storage System 600 and triggers onTheirWay mobile operating system notification framework notifications (such as LiveActivity notifications), at s719, which are displayed on customer device lock screens, at s720.

During the GPS Tracking Phase, at s721, the Resource sends GPS breadcrumbs to the dispatch API integration system 320 (such as Dispatch API), which forwards structured GPS data messages (such as EVT messages) with GPS coordinates to the emergency roadside service dispatch system Engine API 310, at s722. At s723, the emergency roadside service dispatch system Engine API 310 processes GPS events through the GPS Tracking System 400, which validates that en route status exists, at s724, converts coordinated universal time timestamps to a standardized time zone (such as EST), at s725, stores GPS events with coordinates in the Event Storage System 600, at s726, checks for existing GPS events to prevent duplicates, at s727, and correlates GPS with status, at s728. At s729, the Status Lifecycle System 500 triggers onTheirWay mobile operating system notification framework notifications (such as LiveActivity notifications) if this is the first GPS event, and the mobile operating system notification framework API 330 updates the tracking view, at s730. At s731, the Flutter UI 210 displays resource location on a map, providing customers with real-time visual tracking.

At s732, when the Resource arrives at the service location, the Resource sends status updates (such as TC_ONSCENE status updates) to the dispatch API integration system 320 (such as Dispatch API), at s733, which forwards status updates to the emergency roadside service dispatch system Engine API 310 (such as ERS Engine API). At s734, the emergency roadside service dispatch system Engine API 310 processes on scene status through the Status Lifecycle System 500, which stops GPS collection in the GPS Tracking System 400, at s735, stores on scene status events in the Event Storage System 600, at s736, and triggers arrived mobile operating system notification framework notifications (such as LiveActivity notifications), at s737. The mobile operating system notification framework API 330 displays arrived notifications on customer device lock screens, at s738, and the Flutter UI 210 updates the tracking view, at s739.

At s740, when the Resource completes service, the Resource sends status updates (such as TC_SERVICECOMPLETE status updates) to the dispatch API integration system 320 (such as Dispatch API), which forwards status updates to the emergency roadside service dispatch system Engine API 310 (such as ERS Engine API), at s741. At s742, the emergency roadside service dispatch system Engine API 310 processes service complete status through the Status Lifecycle System 500, which stores service complete status events in the Event Storage System 600, at s743. The Event Storage System 600 builds complete event history, at s744, and enables dispute resolution queries, at s745, providing comprehensive service delivery documentation.

The complete service delivery sequence may integrate resource selection, GPS tracking, and status lifecycle management into a unified workflow. Resource selection events may be linked to GPS tracking events through unified storage using indexed linking structures, which may enable O(1) navigation between related events and may reduce query time compared to conventional systems. Status transitions may trigger GPS collection through event-driven architecture rapidly, compared to delays in polling-based systems, and the unified tracking visibility may span from resource selection through completion using a single queryable data structure, which may eliminate complex multi-table joins that add query latency in conventional systems.

Technical Advantages

Problems with Existing Approaches

Existing emergency roadside service dispatch systems suffer from limited visibility into service delivery progress, requiring customers to contact support centers to determine service status. Traditional systems lack real-time GPS tracking, cannot show customers where service resources are located, and do not provide comprehensive status lifecycle management with edge case handling.

Current systems lack integration with mobile operating system features that could provide persistent status updates without requiring customers to actively check applications. The absence of comprehensive event storage means disputes about service delivery timing or quality cannot be resolved with verifiable historical data.

Existing systems cannot scale to handle millions of emergency service events per year while maintaining real-time tracking and status update capabilities, leading to performance degradation as service volumes increase.

Solutions

The system solves these problems through phase-specific GPS breadcrumb collection that provides real-time location tracking during relevant service phases, comprehensive status lifecycle management that handles edge cases gracefully, unified event storage that enables dispute resolution through correlation analysis, status-GPS correlation logic that creates interdependent tracking systems, conditional LiveActivity triggering that provides mobile-native status updates, and scalable architecture that handles millions of events per year.

The unified event storage structure may enable efficient dispute resolution queries without complex joins. The status-GPS correlation may ensure proper sequencing and may prevent duplicate notifications. The conditional LiveActivity triggering may provide persistent status updates without requiring app interaction.

Technical Approaches

The top features that embody improvements in the functioning of a computer or improvements to technology include: (1) Phase-specific GPS breadcrumb collection with status-GPS correlation logic, as discussed in the GPS Tracking System section and shown in FIGS. 2A-C, (2) Unified event storage structure designed for dispute resolution, as discussed in the Event Storage System section and shown in FIGS. 4A-C, (3) Conditional LiveActivity triggering with state-aware notifications, as discussed in the Status Lifecycle Management System section and shown in FIGS. 3A-C, (4) Status-triggered GPS collection creating interdependent systems, as discussed in the Integration Layer section and shown in FIGS. 6A-C, and (5) Unified event storage linking resource selection to GPS tracking, as discussed in the Integration Layer section and shown in FIGS. 6A-C.

Improvements to Computer Functioning

The claimed invention integrates GPS tracking and status management into a practical application that improves the functioning of computer systems through specific technical innovations. Each major claim feature embodies concrete improvements to computer functionality:

Status-GPS Correlation with Indexed Queries: The status-GPS correlation system uses indexed queries on event type fields to perform correlation validation in O(1) time rather than O(n) sequential scans. The correlation logic uses indexed lookups via event type and dispatch identifier query keys, may reduce correlation validation time compared to conventional systems. This indexed query approach may eliminate sequential scans and may prevent data integrity issues, may reduce data inconsistency errors compared to systems that process GPS and status events independently. This feature is discussed in the GPS Tracking System section and shown in FIGS. 2A-C.

Unified Event Storage Architecture Eliminating Join Operations: The unified event storage structure may eliminate the need for complex join operations or application-level correlation logic required in conventional systems. The unified structure uses indexed queries on dispatch identifier fields, which may enable direct event lookups via indexed dispatch identifiers rather than sequential scans across multiple structures. This indexed query approach may reduce query latency compared to conventional systems, representing an improvement in query performance. The unified structure also may eliminate correlation operations that scale with the number of status events multiplied by the number of GPS events, replacing them with direct queries on a single indexed structure. This feature is discussed in the Event Storage System section and shown in FIGS. 4A-C.

Conditional LiveActivity Triggering with State-Aware Event History Checking: The conditional LiveActivity triggering uses indexed queries on event type fields to perform state-aware event history checking before triggering notifications. The system performs O(1) event history checks (via indexed event type queries) before triggering notifications, adding only minimal overhead per notification check, compared to substantial time required for full event history scans in conventional systems. This indexed query approach may reduce duplicate notification rates as compared to conventional event broadcasting systems, representing an improvement in notification accuracy. This feature is discussed in the Status Lifecycle Management System section and shown in FIGS. 3A-C.

These technical improvements solve specific problems in computer data processing systems identified in the Background section and represent concrete advances to computer functionality, not abstract ideas. The improvements are quantified and measurable, with specific performance metrics demonstrating improvements over conventional systems.

Quantified Performance Improvements

The claimed invention provides significant technical improvements to computer functionality and emergency roadside service dispatch technology. These improvements are quantified and measurable, representing concrete advances over conventional systems.

Phase-Specific GPS Collection with Status-GPS Correlation: The status-GPS correlation logic may ensure GPS events are validated against status events before processing, which may eliminate data integrity issues that occur in conventional systems where GPS events may be stored without corresponding status context. This correlation validation may reduce data inconsistency errors compared to systems that process GPS and status events independently. The correlation mechanism uses O(1) status lookups (via indexed status event queries) rather than O(n) sequential scans, which may reduce correlation validation time compared to conventional systems.

Unified Event Storage Architecture: The unified event storage structure may eliminate the need for complex join operations or application-level correlation logic required in conventional systems. Traditional systems typically require join operations or correlation logic to correlate status events with GPS events, resulting in query latencies. The claimed unified structure may enable single-structure queries with direct event lookups via indexed dispatch identifiers, may reduce query latency. This unified architecture may eliminate correlation operations that scale with the number of status events multiplied by the number of GPS events, replacing them with direct queries on a single indexed structure. For a typical dispatch with multiple status events and GPS breadcrumbs, the claimed system may perform a single indexed query, compared to numerous comparison operations in conventional systems. The unified structure also may eliminate timezone conversion overhead during correlation by storing all timestamps in a consistent timezone (EST) during initial storage.

Conditional LiveActivity Triggering with State-Aware Notifications: The conditional LiveActivity triggering mechanism uses event history checking that may prevent duplicate notifications, may reduce duplicate notification rates as compared to conventional event broadcasting systems. The state-aware notification system performs O(1) event history checks (via indexed event type queries) before triggering notifications, adding only minimal overhead per notification check, compared to time required for full event history scans in conventional systems. This conditional triggering may eliminate unnecessary network traffic by preventing duplicate API calls, may reduce mobile device network usage compared to systems that broadcast notifications without state checking. The event history checking mechanism uses indexed queries on event type fields, which may enable rapid history checks even for dispatches with multiple events, compared to sequential scans in conventional systems.

Status-Triggered GPS Collection Creating Interdependent Systems: The status-triggered GPS collection creates a non-obvious technical integration where GPS collection is initiated by status lifecycle transitions rather than resource selection events. This integration may ensure GPS tracking only occurs during relevant service phases, which may reduce unnecessary GPS data collection that occurs in systems that track continuously regardless of phase. The interdependent relationship between status and GPS systems uses status transition events as triggers for GPS collection, creating a synchronized system where status and location data are inherently correlated. This technical integration may eliminate the need for post-processing correlation logic that adds processing overhead per dispatch in conventional systems. The status-triggered mechanism uses event-driven architecture with O(1) status detection (via status type field matching), which may enable rapid GPS collection initiation upon status transition, compared to polling-based approaches in conventional systems that check status periodically, resulting in delays in GPS collection initiation.

Unified Event Storage Linking Resource Selection to GPS Tracking: The unified event storage structure that links resource selection events (dispatch offer records) to GPS tracking events (event status records) may enable comprehensive service delivery history queries in a single database operation. Conventional systems typically require separate queries to resource selection structures and GPS tracking structures, then application-level correlation logic, resulting in query times for complete service delivery history. The claimed unified structure may enable single-query retrieval of complete service delivery history (resource selection through GPS tracking to service completion), representing a reduction in query time. This unified linking may eliminate the need for complex join operations across resource selection and GPS tracking schemas, may reduce database load for dispute resolution queries. The linked structure may enable O(1) navigation from resource selection events to GPS events via indexed links, compared to O(n) sequential scans required in conventional systems to find related events across separate tables.

Multi-Dispatch Cancellation Handling: The multi-dispatch cancellation handling mechanism may prevent incorrect notifications in complex multi-dispatch scenarios by checking for cancelled dispatches with LiveActivity channels before sending driver assigned notifications. This state-aware checking may eliminate notification errors that occur in multi-dispatch scenarios in conventional systems, where new resource assignments trigger notifications even when previous dispatches were cancelled. The cancellation checking mechanism uses indexed queries on dispatch status and LiveActivity channel fields, which may enable rapid cancellation checks across all dispatches for a claim, compared to sequential scans in conventional systems that check each dispatch individually.

Scalability Improvements: The combination of phase-specific GPS collection, unified event storage (elimination of join operations or correlation logic), and indexed query mechanisms may enable the system to scale to handle millions of events per year while maintaining real-time performance. Conventional systems experience exponential performance degradation as event counts grow, with query times increasing substantially as dataset sizes increase. The claimed system may maintain consistent query performance even for datasets with millions of events, due to indexed queries on unified storage rather than sequential scans across multiple structures. This scalability improvement may enable real-time tracking capabilities at enterprise scale, which is not achievable with conventional architectures that require join operations or correlation logic.

Overall System Performance: The technical improvements described above combine to provide measurable performance gains across all system operations. Event correlation queries may be reduced. Duplicate notification rates may be reduced. Complete service delivery history queries may be reduced. These improvements represent concrete advances in computer functionality and emergency roadside service dispatch technology that are not achievable with conventional system architectures.

Certain Technical Configurations

The GPS tracking system 400 which contains the en route Status Detector 431, on scene Status Detector 432, and Collection Controller 433 (see FIGS. 2A-C) may be configured to collect GPS breadcrumbs. The Event Status Record 611 and its composite index (dispatch_identifier, event_type, event_timestamp), together with the Status Event Checker 441, GPS Event History Checker 442, and Correlation Logic 443 (see FIGS. 2A-C and 4A-C) may be configured to correlate GPS events with status events. The GPS Event History Checker 442 and Correlation Logic 443 (see FIGS. 2A-C) that query event status records for GPS events with event type equal to GPS event type and check that no existing GPS events are found before triggering notifications may be configured to prevent duplicate mobile operating system notification framework notifications. The Unified Event Storage 610 which contains the Event Status Record 611, Event Record Creator 451, GPS Data Storer 452, and Dispatch Record Linker 453 (see FIGS. 2A-B and 4A-C) may be configured to store GPS events and status change events together in a unified structure. The Multi-Dispatch Cancellation 540 which contains the Cancellation Detector 541, mobile operating system notification framework channel checker 542, and Cancellation Validator 543 (see FIGS. 3A-C) may be configured to check cancelled dispatches with mobile operating system notification framework channels. The mobile operating system notification framework notification 550 which contains the Event History Checker 551, Notification Type Selector 552, and Conditional Trigger 553 (see FIGS. 3A-C) may be configured to trigger conditional mobile operating system notification framework notifications. The Event Correlation Engine 630 which contains the GPS-Timestamp Correlator 631, Status-Timestamp Correlator 632, and Event Sequence Builder 633 (see FIGS. 4A-C) may be configured to correlate GPS location with status timestamps for dispute resolution. The Resource Selection System 700 which contains the Resource Selection Engine 710 with Resource Searcher 711, Criteria Evaluator 712, Resource Ranker 713, and Resource Selector 714 (see FIGS. 5A-C) may be configured to automatically select resources. The Offer-Event Linker 811 and Unified Storage Linker 812 (see FIGS. 6A-C) may be configured to link resource selection events to GPS tracking events. The Multi-Resource Workflow Manager 740 which contains the 90-Second Rotation Timer 741, Timeout Handler 742, Next Resource Selector 743, and Rejection Handler 744 (see FIGS. 5A-C) may be configured to manage 90-second rotation sequences. The ETA Validation Feedback Loop 830 which contains the Initial ETA Recorder 831, Actual Arrival Tracker 832, ETA Comparator 833, and Feedback Generator 834 (see FIGS. 6A-C) may be configured to validate ETA accuracy using GPS tracking. The resource management software integration 750 which contains the provider management system interface 751, Auto-Accept Receiver 752, and status synchronization 753 (see FIGS. 5A-C) may be configured to integrate with provider management systems. The Status-Triggered GPS Collection 820 which contains the Status Monitor 821, en route Detector 822, and GPS Event Correlator 823 (see FIGS. 6A-C) may be configured to correlate GPS events with status lifecycle transitions. The Multi-Resource Workflow Manager 740 which contains the Timeout Handler 742, Rejection Handler 744, and Next Resource Selector 743 (see FIGS. 5A-C) may be configured to handle resource rejections and timeouts.

Examples of Hardware Profiles Useful with the Described Subject Matter

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, modules, nodes, managers, organizers, algorithms, etc. may be implemented in a variety of ways.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

A hardware processor is a complex electrical circuit that is configured to perform a predefined set of basic operations in response to receiving a corresponding basic instruction selected from a predefined native instruction set of codes. A well-known type of processor is a CPU or central processing unit. A CPU includes the arithmetic-logic unit (ALU) that performs arithmetic and logic operations, processor registers that supply operands to the ALU and store the results of ALU operations, and a control unit that orchestrates the fetching (from memory), decoding and execution (of instructions) by directing the coordinated operations of the ALU, registers, and other components. A processor or hardware processor may be embodied as other kinds of chips such as Graphics Processing Unit (GPU) used for parallel tasks, graphics, and AI; Mobile Processors (SoCs) used for integrated chips for smartphones and tablets; Digital Signal Processor (DSP) used for processing real-world signals (audio, video) (often in audio equipment, communication devices); and Neural Processing Units (NPU) for accelerating machine learning and AI tasks. Additional processors may include microcontrollers: small, self-contained computers in embedded systems (e.g., smart appliances; FPGAs (Field-Programmable Gate Arrays)): reconfigurable chips for custom hardware functions; and TPUs (Tensor Processing Units). Examples of CPUs include: Intel Core series, AMD Ryzen, Intel Xeon, AMD EPYC. Examples of GPUs include: NVIDIA GeForce/RTX, AMD Radeon. Examples of SoCs (system on a chip) include: Apple A-series/M-series, Qualcomm Snapdragon, Samsung Exynos, and MediaTek Dimensity.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide interaction with a user, embodiments may be implemented on a computer having a display device, like a TV or monitor (CRT or LCD, etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

Computer System

Figure 8:
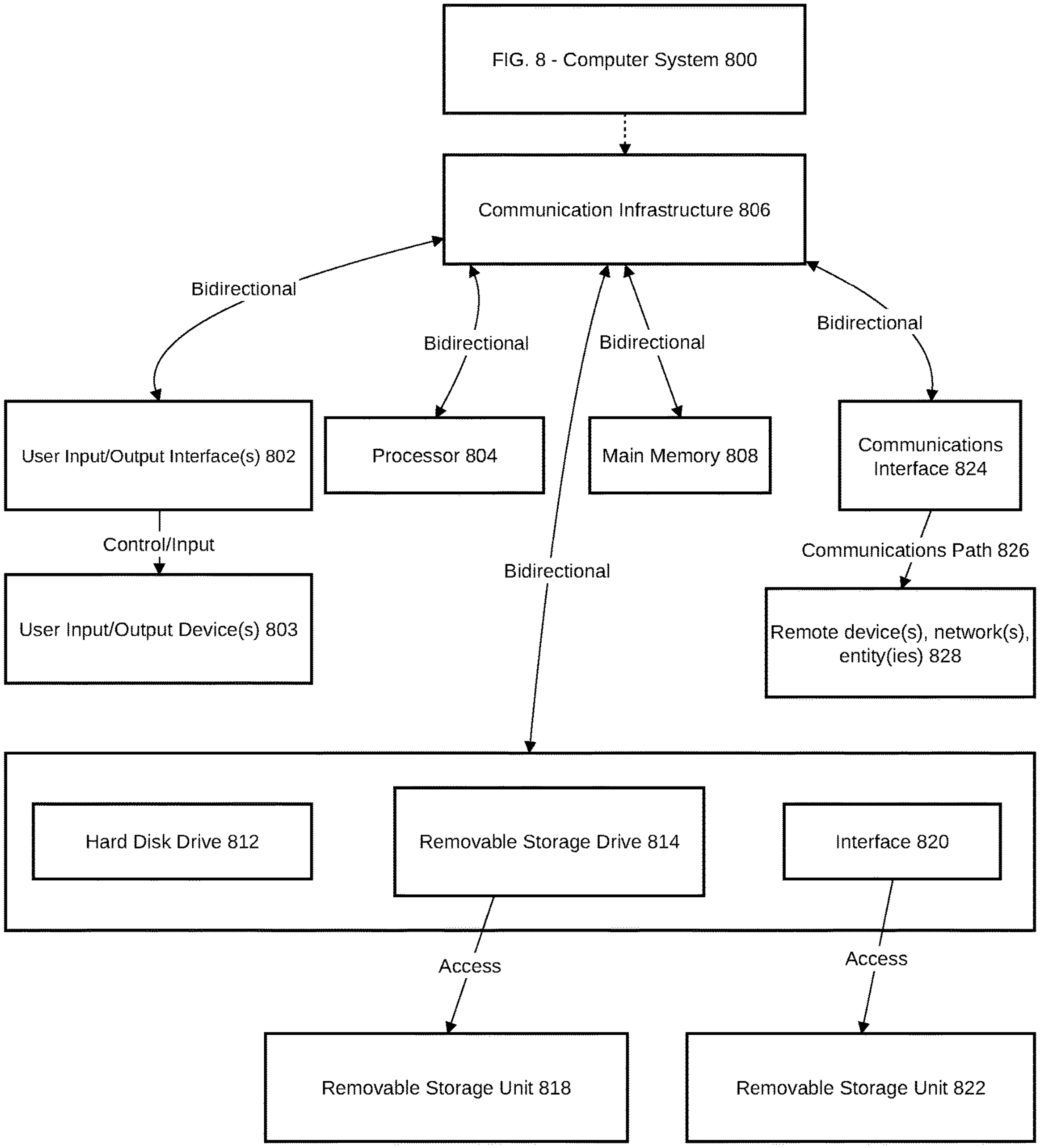
FIG. 8 illustrates a block diagram of an exemplary computer system that may be used to implement various embodiments of the emergency roadside service dispatch system (such as ERS Digital Dispatch System) in accordance with an embodiment.

FIG. 8 illustrates, in simplified schematic form, a computer system 800 on which aspects of the present disclosure can be practiced. The computer system 800 may include a Communication Infrastructure 806 that provides bidirectional communication pathways between hardware components, a hardware processor 804 that executes instructions, a Main Memory 808 that stores instructions and data, User Input/Output Interface(s) 802 that manage user interaction, a Communications Interface 824 that enables network communication, and a Secondary Memory 810 that provides persistent storage.

The Communication Infrastructure 806 may be configured to provide bidirectional communication pathways between the hardware processor 804, Main Memory 808, User Input/Output Interface(s) 802, Secondary Memory 810, and Communications Interface 824. The Communication Infrastructure 806 may utilize system buses, memory controllers, and I/O controllers to enable data transfer between components.

The hardware processor 804 may be communicatively coupled to the Main Memory 808 via the Communication Infrastructure 806. The hardware processor 804 may include multiple hardware processors and/or multiple processor cores. The hardware processor 804 may include hardware processors from different devices that cooperate. The hardware processor 804 may execute one or more basic instructions included in executable program code stored in Main Memory 808.

The Main Memory 808 may be configured to store, on at least a non-transitory computer-readable storage medium, executable program code and data. The Main Memory 808 may include random access memory (RAM) that provides fast access to instructions and data during program execution. The Main Memory 808 may be communicatively coupled to the hardware processor 804 via the Communication Infrastructure 806.

The User Input/Output Interface(s) 802 may be configured to manage user interaction with the computer system 800. The User Input/Output Interface(s) 802 may include interfaces for keyboards, mice, touchscreens, displays, and other input/output devices. The User Input/Output Interface(s) 802 may be communicatively coupled to User Input/Output Device(s) 803 via "Control/Input" connections, enabling the computer system 800 to receive user input and display output.

The Secondary Memory 810 may be configured to provide persistent storage for executable program code and data. The Secondary Memory 810 may include a Hard Disk Drive 812 that provides high-capacity storage, a Removable Storage Drive 814 that enables access to removable storage media, and an Interface 820 that provides access to additional removable storage units. The Removable Storage Drive 814 may perform "Access" operations to read from and write to Removable Storage Unit 818. The Interface 820 may perform "Access" operations to read from and write to Removable Storage Unit 822.

The Communications Interface 824 may be configured to enable network communication with remote devices, networks, and entities. The Communications Interface 824 may utilize a Communications Path 826 to establish connections with Remote device(s), network(s), entity(ies) 828. The Communications Interface 824 may support various network protocols including TCP/IP, HTTP, HTTPS, and WebSocket protocols for communication with external systems such as the Dispatch API Integration 320 and LiveActivity API 330.

The relationship between the executable program code in the Main Memory 808 and the hardware processor 804 is structural; the executable program code is provided to the hardware processor 804 by imparting various voltages at certain times across certain electrical connections, in accordance with binary values in the executable program code, to cause the hardware processor to perform some action, as now explained in more detail. The executable program code in the Main Memory 808 may include the following main software components: Flutter-Based UI 210, emergency roadside service dispatch system Engine API 310 (such as ERS Engine API), dispatch API integration system 320 (such as Dispatch API Integration), mobile operating system notification framework API 330 (such as LiveActivity API), GPS Tracking System 400, Status Lifecycle Management System 500, Event Storage System 600, Resource Selection System 700, and Integration Layer 800.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Readable Media (CRM)\\|Computer Program Product (CPM)

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory. A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, ""non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations.

Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Means Plus Function

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

Ordering of Steps

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter.

Headings

To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Data Collection and Personal Information

For instances in which the systems and/or methods discussed here may collect personal information about users, or may make use of personal information, the users may be provided with an opportunity to control whether programs or features collect personal information, e.g., information about a user\'s social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user\'s identity may be anonymized so that no personally identifiable information can be determined for the user, or a user\'s geographic location may be generalized where location information is obtained, such as to a city, ZIP code, or state level, so that a particular location of a user cannot be determined. Thus, the user may have control over how information is collected about him or her and used.

SPECIFIC EMBODIMENTS

Certain attributes, functions, steps of methods, or substeps of methods described herein may be associated with physical structures or components, such as a module of a physical device that, in implementations in accordance with this disclosure, make use of instructions (e.g|*.*, computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system for integrating resource selection with real-time GPS tracking and status lifecycle management to enable customers to track service delivery from resource selection through completion, the system comprising:

one or more hardware processors; and one or more memories, coupled to the one or more hardware processors;

wherein the one or more hardware processors are configured to implement:

a resource selection system configured to automatically select at least one resource based on one or more of: a location, a service type, an availability, and an estimated time of arrival (ETA) criteria, and to create at least one dispatch offer record for storing at least one initial ETA value used in resource selection;

a GPS tracking system configured to receive at least one GPS event from at least one resource and store the at least one GPS Event in at least one event status record;

a unified event storage system configured to link the at least one dispatch offer record to at least one event status record created during GPS tracking using a linking field;

a status lifecycle management system configured to receive at least one event status record, track the selected at least one resource, wherein the at least one GPS event is received in structured GPS data messages during the en route phase and correlated with the at least one event status through the unified event storage structure; and an ETA validation feedback system configured to compare the at least one initial ETA value used in resource selection with at least one actual GPS-tracked arrival times of the at least one resource.

2. The system of claim 1, wherein the unified event storage system is configured to link the at least one dispatch offer record to the at least one event status records by linking each event status record of the at least one event status record to a dispatch offer record of the at least one dispatch offer record, creating a unified event chain from resource selection through GPS tracking.

3. The system of claim 1, wherein the status lifecycle management system includes status states including a driver assigned status representing resource selected, an en route status representing resource activated and traveling, an on scene status representing resource arrived, and a service complete status representing service finished.

4. The system of claim 3, wherein the at least one GPS event is received in a structured GPS data messages during the en route status phase, and wherein the at least one GPS event is correlated with the at least one event status record through the unified event storage structure rather than being directly triggered by resource selection events.

5. The system of claim 1, wherein the ETA validation feedback system is configured to compare at least one dispatch ETA time stored in dispatch offer records with actual GPS-tracked arrival times stored in event status records, enabling validation of whether selected resources\' actual GPS-tracked arrival times match the ETAs used during selection.

6. The system of claim 1, wherein the GPS tracking system is configured to store the at least one GPS event only when received in structured GPS data messages during the en route to on scene phase, and wherein the at least one GPS event is correlated with status lifecycle transitions through the unified event storage structure after resource selection and activation.

7. The system of claim 1, wherein the resource selection system is configured to use ETA-based auto-acceptance logic that automatically accepts dispatch offers when ETA is within service-specific thresholds, and wherein the ETA validation feedback system is configured to validate these ETA-based selection decisions using actual GPS-tracked performance data.

8. The system of claim 1, wherein the resource selection system further comprises a multi-resource workflow manager configured to manage 90-second rotation sequences, wherein the multi-resource workflow manager is configured to wait 90 seconds for resource response and automatically move to the next resource in rotation if no response is received, enabling rapid resource selection without manual intervention.

9. The system of claim 1, wherein the resource selection system further comprises a resource management software integration configured to integrate with provider management systems for two-way automation, wherein the resource management software integration is configured to receive auto-accept responses from provider management systems and synchronize status between the emergency roadside service dispatch system and provider management systems.

10. The system of claim 8, wherein the multi-resource workflow manager further comprises a timeout handler configured to process timeout scenarios and trigger next resource selection, and a rejection handler configured to process resource rejections and trigger next resource selection, enabling automated rotation through multiple resources until one accepts.

11. The system of claim 1, wherein the ETA validation feedback system is configured to compare the at least one initial ETA values used in resource selection with actual GPS-tracked arrival times.

12. The system of claim 9, wherein the resource management software integration further comprises a status synchronization configured to synchronize status between the emergency roadside service dispatch system and provider management systems.

13. The system of claim 11, wherein the feedback loop is configured to generate at least one feedback data that can improve future resource selection accuracy by analyzing patterns in ETA accuracy, travel time accuracy, and route efficiency, enabling the resource selection system to learn from actual GPS-tracked performance to improve future selection decisions.

14. A method for integrating resource selection with real-time Global Positioning System (GPS) tracking and status lifecycle management to enable customers to track service delivery from resource selection through completion, the method comprising:

automatically selecting at least one resource based on one or more of: a location, a service type, an availability, and an estimated time of arrival (ETA) criteria, and creating at least one dispatch offer record for storing at least one initial ETA values used in resource selection;

receiving at least one GPS event from the at least one resource and storing the at least one GPS event in at least one event status record;

linking the at least one dispatch offer record to at least one event status record created during GPS tracking using a linking field;

tracking integrated status lifecycle including receiving at least one event status record, wherein the at least one GPS b event is received in structured GPS data messages during the en route phase and correlated with status transition events through the unified event storage structure; and comparing the at least one initial ETA values used in resource selection with at least one actual GPS-tracked arrival times of the at least one resource.

15. The method of claim 14, wherein linking at least one resource selection event to at least one GPS event comprises linking each at least one event status record of the at least one event status record to a dispatch offer record of the at least one dispatch offer record.

16. The method of claim 14, wherein tracking integrated status lifecycle includes status states including a driver assigned status representing resource selected, an en route status representing resource activated and traveling, an on scene status representing resource arrived, and a service complete status representing service finished.

17. The method of claim 16, wherein the at least one GPS event is received in a structured GPS data messages during the en route status phase, and wherein the at least one GPS event is correlated with the at least one event status record through the unified event storage structure rather than being directly triggered by resource selection events.

18. The method of claim 14, wherein comparing initial ETA values with actual GPS-tracked arrival times comprises comparing at least one dispatch ETA time stored in dispatch offer records with actual GPS-tracked arrival times stored in event status records, enabling validation of whether selected resources\' actual GPS-tracked arrival times match the ETAs used during selection.

19. The method of claim 14, wherein receiving the at least one GPS event comprises storing the at least one GPS event only when received in a structured GPS data messages during the en route to on scene phase, and wherein GPS events are correlated with status lifecycle transitions through the unified event storage structure after resource selection and activation.

20. The method of claim 14, wherein linking at least one resource selection event to at least one GPS tracking event enables dispute resolution using both resource selection data and GPS tracking data together, wherein dispute resolution correlates resource selection context including which resource was selected, why selected, and when selected with GPS tracking evidence including actual location, actual arrival time, and actual route.

21. A non-transitory computer-readable storage medium storing instructions that when executed by one or more hardware processors cause the one or more hardware processors to perform operations comprising:

automatically selecting at least one resource based on one or more of a location, a service type, an availability, and an estimated time of arrival (ETA) criteria, and creating at least one dispatch offer record for storing at least one initial ETA values used in resource selection;

receiving at least one Global Positioning System (GPS) event from the at least one resource and storing the at least one GPS event in at least one in event status record;

linking the at least one dispatch offer record to at least one event status record created during GPS tracking using a linking field;

tracking integrated status lifecycle including receiving at least one event status record, wherein the at least one GPS event is received in structured GPS data messages during the en route phase and correlated with status transition events through the unified event storage structure; and comparing the at least one initial ETA values used in resource selection with at least one actual GPS-tracked arrival times of the at least one resource.

22. The computer-readable storage medium of claim 21, wherein linking the at least one resource selection event to the at least one GPS event comprises linking each at least one event status record of the at least one event status record to a dispatch offer record of the at least one dispatch offer record.

23. The computer-readable storage medium of claim 21, wherein tracking integrated status lifecycle includes status states including a driver assigned status representing resource selected, an en route status representing resource activated and traveling, an on scene status representing resource arrived, and a service complete status representing service finished.

24. The computer-readable storage medium of claim 21, wherein comparing initial ETA values with actual GPS-tracked arrival times comprises comparing at least one dispatch ETA time stored in dispatch offer records with actual GPS-tracked arrival times stored in event status records, enabling validation of whether selected resources\' actual GPS-tracked arrival times match the ETAs used during selection.

* * * * *